(12) United States Patent
Lowe et al.

(10) Patent No.: US 11,710,024 B2
(45) Date of Patent: *Jul. 25, 2023

(54) DI CAPACITIVE EMBEDDED METAL CARD

(71) Applicant: CompoSecure, LLC, Somerset, NJ (US)

(72) Inventors: Adam Lowe, Somerset, NJ (US); Michele Logan, Madison, NJ (US); Dori Skelding, North Plainfield, NJ (US); Syeda Hussain, Somerset, NJ (US)

(73) Assignee: Composecure, LLC, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,506

(22) Filed: Apr. 7, 2022

(65) Prior Publication Data
US 2022/0230044 A1    Jul. 21, 2022

Related U.S. Application Data

(63) Continuation of application No. 16/983,395, filed on Aug. 3, 2020, now Pat. No. 11,301,743, which is a
(Continued)

(51) Int. Cl.
*G06K 19/06* (2006.01)
*G06K 19/077* (2006.01)
(Continued)

(52) U.S. Cl.
CPC ....... *G06K 19/07792* (2013.01); *G06K 19/02* (2013.01); *G06K 19/0723* (2013.01); *G06K 19/07794* (2013.01)

(58) Field of Classification Search
CPC ......... G06K 19/07749; G06K 19/0723; G06K 19/077; G06K 19/07745
(Continued)

(56) References Cited

U.S. PATENT DOCUMENTS

| 3,802,101 A | 4/1974 | Scantlin |
| 4,737,620 A | 4/1988 | Mollet et al. |
| (Continued) | | |

FOREIGN PATENT DOCUMENTS

| CA | 2347818 A1 | 5/2000 |
| CA | 2860909 A1 | 8/2013 |
| (Continued) | | |

OTHER PUBLICATIONS

Non Final Office Action for U.S. Appl. No. 17/168,382, dated Oct. 17, 2022, 66 pages.
(Continued)

*Primary Examiner* — Jamara A Franklin
(74) *Attorney, Agent, or Firm* — RatnerPrestia

(57) ABSTRACT

A transaction card having a metal layer, an opening in the metal layer for a transponder chip, and at least one discontinuity extending from an origin on the card periphery to a terminus in the opening. The card has a greater flex resistance than a card having a comparative discontinuity with the terminus and the origin the same distance from a line defined by a first long side of the card periphery in an absence of one or more strengthening features. Strengthening features include a discontinuity wherein one of the terminus or the origin are located relatively closer to the first long side of the card periphery than the other, a plurality of discontinuities wherein fewer than all extend from the card periphery to the opening, a self-supporting, non-metal layer disposed on at least one surface of the card, or one or more ceramic reinforcing tabs surrounding the opening.

23 Claims, 81 Drawing Sheets

Related U.S. Application Data continuation of application No. 15/928,813, filed on Mar. 22, 2018, now Pat. No. 10,762,412.

(60) Provisional application No. 62/623,936, filed on Jan. 30, 2018.

(51) Int. Cl.
  *G06K 19/02* (2006.01)
  *G06K 19/07* (2006.01)

(58) Field of Classification Search
  USPC .................................................. 235/487, 492
  See application file for complete search history.

(56) References Cited

U.S. PATENT DOCUMENTS

| | | |
|---|---|---|
| 5,013,900 A | 5/1991 | Hoppe |
| 5,048,179 A | 9/1991 | Shindo et al. |
| 5,350,553 A | 9/1994 | Gläser et al. |
| 5,463,953 A | 11/1995 | Kaspers et al. |
| 5,574,309 A | 11/1996 | Papapietro et al. |
| 5,598,032 A | 1/1997 | Fidalgo |
| 5,681,356 A | 10/1997 | Barak et al. |
| 5,774,339 A | 6/1998 | Ohbuchi et al. |
| D405,450 S | 2/1999 | Niitsu |
| 5,935,497 A | 8/1999 | Rose |
| 5,962,840 A | 10/1999 | Haghiri-Tehrani et al. |
| 6,065,681 A | 5/2000 | Trueggelmann |
| 6,188,580 B1 | 2/2001 | Huber et al. |
| 6,724,103 B2 | 4/2004 | Parrault |
| 6,817,532 B2 | 11/2004 | Finkelstein |
| D529,955 S | 10/2006 | Allard et al. |
| 7,237,724 B2 | 7/2007 | Singleton |
| D573,182 S | 7/2008 | Ricketts et al. |
| 7,701,350 B2 | 4/2010 | Sakama et al. |
| 7,762,470 B2 | 7/2010 | Finn et al. |
| 7,823,777 B2 | 11/2010 | Varga et al. |
| D632,735 S | 2/2011 | McGrane et al. |
| 7,936,273 B2 | 5/2011 | Kobayashi et al. |
| 7,954,228 B2 | 6/2011 | Kobayashi et al. |
| 8,128,000 B2 | 3/2012 | Forster |
| 8,141,786 B2 | 3/2012 | Bhandarkar et al. |
| 8,174,454 B2 | 5/2012 | Mayer |
| 8,226,013 B2 | 7/2012 | Phillips et al. |
| 8,248,240 B2 | 8/2012 | Osaki et al. |
| 8,261,997 B2 | 9/2012 | Gebhart |
| 8,448,872 B2 | 5/2013 | Droz |
| 8,519,905 B2 | 8/2013 | Tanaka et al. |
| 8,608,082 B2 | 12/2013 | Le Garrec et al. |
| 8,622,311 B2 | 1/2014 | Hamedani et al. |
| 8,698,633 B2 | 4/2014 | Kobayashi et al. |
| 8,725,589 B1 | 5/2014 | Skelding et al. |
| 8,786,510 B2 | 7/2014 | Coleman et al. |
| 8,789,762 B2 | 7/2014 | Finn et al. |
| 8,978,987 B2 | 3/2015 | Scarlatella |
| 9,000,619 B2 | 4/2015 | Kato et al. |
| 9,058,547 B2 | 6/2015 | Oh et al. |
| 9,099,789 B1 | 8/2015 | Modro |
| 9,251,458 B2 | 2/2016 | Finn et al. |
| 9,320,186 B2 | 4/2016 | Droz |
| 9,390,364 B2 | 7/2016 | Finn et al. |
| 9,390,366 B1 | 7/2016 | Herslow et al. |
| 9,475,086 B2 | 10/2016 | Finn et al. |
| D771,186 S | 11/2016 | Canaday et al. |
| 9,489,613 B2 | 11/2016 | Finn et al. |
| 9,622,359 B2 | 4/2017 | Finn et al. |
| 9,634,391 B2 | 4/2017 | Finn et al. |
| 9,697,459 B2 | 7/2017 | Finn et al. |
| 9,721,200 B2 | 8/2017 | Herslow et al. |
| D797,188 S | 9/2017 | Hendrick |
| 9,760,816 B1 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,898,699 B2 | 2/2018 | Herslow et al. |
| D812,137 S | 3/2018 | Daniel et al. |
| 9,941,572 B2 | 4/2018 | Liu et al. |
| 10,032,099 B2 | 7/2018 | Mosteller |
| 10,089,570 B2 | 10/2018 | Herslow et al. |
| 10,140,569 B2 | 11/2018 | Kang et al. |
| 10,147,999 B2 | 12/2018 | Wang et al. |
| 10,193,211 B2 | 1/2019 | Finn et al. |
| 10,339,434 B2 | 7/2019 | Cox |
| D864,293 S | 10/2019 | Lowe et al. |
| 10,445,627 B1 | 10/2019 | Sexi et al. |
| 10,583,683 B1 | 3/2020 | Ridenour et al. |
| 2003/0102541 A1 | 6/2003 | Gore et al. |
| 2005/0087609 A1 | 4/2005 | Martin |
| 2006/0102729 A1 | 5/2006 | Gandel et al. |
| 2006/0226240 A1 | 10/2006 | Singleton |
| 2007/0034700 A1 | 2/2007 | Poidomani et al. |
| 2007/0075312 A1 | 4/2007 | Chin et al. |
| 2007/0290048 A1 | 12/2007 | Singleton et al. |
| 2008/0001759 A1 | 1/2008 | Kobayashi et al. |
| 2009/0039154 A1 | 2/2009 | Williams et al. |
| 2011/0024036 A1 | 2/2011 | Benato |
| 2011/0315779 A1 | 12/2011 | Bidin et al. |
| 2012/0044693 A1 | 2/2012 | Hatase et al. |
| 2012/0201994 A1 | 8/2012 | Michalk |
| 2012/0206869 A1 | 8/2012 | Droz |
| 2013/0062875 A1 | 3/2013 | Le Loarer et al. |
| 2013/0102113 A1 | 4/2013 | Yang |
| 2013/0228628 A1 | 9/2013 | Bona et al. |
| 2013/0247432 A1 | 9/2013 | Droz |
| 2013/0255078 A1 | 10/2013 | Cox |
| 2013/0255079 A1 | 10/2013 | Maijala et al. |
| 2013/0299593 A1 | 11/2013 | Glidden |
| 2014/0158773 A1 | 6/2014 | Blum |
| 2014/0279555 A1 | 9/2014 | Guillaud |
| 2014/0283978 A1 | 9/2014 | Droz |
| 2014/0353384 A1 | 12/2014 | Hoegerl et al. |
| 2014/0361086 A1 | 12/2014 | Finn et al. |
| 2015/0021403 A1 | 1/2015 | Finn et al. |
| 2015/0097040 A1 | 4/2015 | Rampetreiter et al. |
| 2015/0129665 A1 | 5/2015 | Finn et al. |
| 2015/0136858 A1 | 5/2015 | Finn et al. |
| 2015/0180229 A1 | 6/2015 | Herslow |
| 2015/0206047 A1 | 7/2015 | Herslow et al. |
| 2015/0235063 A1 | 8/2015 | Loussert |
| 2015/0235122 A1 | 8/2015 | Finn et al. |
| 2015/0239202 A1 | 8/2015 | Purdy et al. |
| 2015/0269474 A1 | 9/2015 | Finn et al. |
| 2015/0269477 A1 | 9/2015 | Finn et al. |
| 2015/0278675 A1 | 10/2015 | Finn et al. |
| 2015/0339564 A1 | 11/2015 | Herslow et al. |
| 2016/0110639 A1 | 4/2016 | Finn et al. |
| 2016/0180212 A1 | 6/2016 | Herslow et al. |
| 2016/0203399 A1 | 7/2016 | Cox |
| 2016/0229081 A1 | 8/2016 | Williams et al. |
| 2016/0365644 A1 | 12/2016 | Finn et al. |
| 2017/0017871 A1 | 1/2017 | Finn et al. |
| 2017/0077589 A1 | 3/2017 | Finn et al. |
| 2017/0106572 A1 | 4/2017 | Cepress et al. |
| 2017/0243099 A1 | 8/2017 | Kluge |
| 2017/0243104 A1 | 8/2017 | Cox |
| 2017/0262749 A1 | 9/2017 | Cox |
| 2017/0270398 A1 | 9/2017 | Mathieu et al. |
| 2017/0308785 A1 | 10/2017 | Kim et al. |
| 2017/0316300 A1 | 11/2017 | Herslow et al. |
| 2017/0316303 A1 | 11/2017 | Pachler et al. |
| 2017/0323193 A1 | 11/2017 | Kitney et al. |
| 2018/0068212 A1 | 3/2018 | Wiliiams et al. |
| 2018/0123221 A1 | 5/2018 | Finn et al. |
| 2018/0157954 A1 | 6/2018 | Herslow et al. |
| 2018/0204105 A1 | 7/2018 | Herslow et al. |
| 2018/0307962 A1 | 10/2018 | Lowe et al. |
| 2018/0339503 A1 | 11/2018 | Finn et al. |
| 2018/0341846 A1 | 11/2018 | Finn et al. |
| 2018/0341847 A1 | 11/2018 | Finn et al. |
| 2018/0349751 A1 | 12/2018 | Herslow et al. |
| 2019/0050706 A1 | 2/2019 | Lowe |
| 2019/0114526 A1 | 4/2019 | Finn et al. |
| 2019/0130242 A1 | 5/2019 | Fu et al. |

(56) References Cited

U.S. PATENT DOCUMENTS

| | | |
|---|---|---|
| 2019/0156073 A1 | 5/2019 | Finn et al. |
| 2019/0156994 A1 | 5/2019 | Cox |
| 2019/0197381 A1 | 6/2019 | Cox |
| 2019/0204812 A1 | 7/2019 | Cox |
| 2019/0206161 A1 | 7/2019 | Cox |
| 2019/0236434 A1 | 8/2019 | Lowe |
| 2019/0279065 A1 | 9/2019 | Cox |
| 2019/0300695 A1 | 10/2019 | Cox |

FOREIGN PATENT DOCUMENTS

| | | |
|---|---|---|
| CN | 100397406 C | 6/2008 |
| CN | 101281618 A | 10/2008 |
| CN | 101375647 A | 2/2009 |
| CN | 103153640 A | 6/2013 |
| CN | 106599977 A | 12/2016 |
| DE | 19703122 C1 | 5/1998 |
| DE | 19848193 01 | 11/1999 |
| DE | 19934434 A1 | 2/2001 |
| DE | 10132893 A1 | 1/2003 |
| DE | 102007016777 A1 | 10/2008 |
| DE | 102008053582 B3 | 4/2010 |
| EP | 0277854 A1 | 8/1988 |
| EP | 0426406 A2 | 5/1991 |
| EP | 1884889 A2 | 2/2008 |
| EP | 2133828 A2 | 12/2009 |
| EP | 2722193 A1 | 4/2014 |
| EP | 2765648 A1 | 8/2014 |
| EP | 3009964 A1 | 4/2016 |
| JP | 61222715 A | 10/1986 |
| JP | 63072596 A | 4/1988 |
| JP | 6399995 A | 5/1988 |
| JP | 63185688 A | 8/1988 |
| JP | 63239097 A | 10/1988 |
| JP | 021397 A | 1/1990 |
| JP | 02055198 A | 2/1990 |
| JP | 03205197 A | 9/1991 |
| JP | 0412240 B | 3/1992 |
| JP | 0564861 A | 3/1993 |
| JP | 07501758 A | 2/1995 |
| JP | 08123928 A | 5/1996 |
| JP | 08276459 A | 10/1996 |
| JP | 09311921 A | 12/1997 |
| JP | 09315053 A | 12/1997 |
| JP | 10291392 A | 11/1998 |
| JP | 1111056 A | 1/1999 |
| JP | 2001155275 A | 6/2001 |
| JP | 2003234615 A | 8/2003 |
| JP | 2004094561 A | 3/2004 |
| JP | 2004509537 A | 3/2004 |
| JP | 2004252802 A | 9/2004 |
| JP | 2005251176 A | 9/2005 |
| JP | 2007021830 A | 2/2007 |
| JP | 2008052721 A | 3/2008 |
| JP | 2012067467 A | 4/2012 |
| JP | 2016071683 A | 5/2016 |
| JP | 2017508333 A | 3/2017 |
| KR | 20010080890 A | 8/2001 |
| KR | 20140117614 A | 10/2014 |
| KR | 20170061572 A | 6/2017 |
| KR | 20170120524 A | 10/2017 |
| TW | 201723933 A | 7/2017 |
| WO | 9809252 A1 | 3/1998 |
| WO | 0223674 A2 | 3/2002 |
| WO | 2008105582 A1 | 9/2008 |
| WO | 2013110625 A1 | 8/2013 |
| WO | 2014149926 A1 | 9/2014 |
| WO | 2015071017 A1 | 5/2015 |
| WO | 2015071086 A1 | 5/2015 |
| WO | 2015144261 A1 | 10/2015 |
| WO | 2016020067 A1 | 2/2016 |
| WO | 2016046184 A1 | 3/2016 |
| WO | 2016073473 A1 | 5/2016 |
| WO | 2017007468 A1 | 1/2017 |
| WO | 2017090891 A1 | 6/2017 |
| WO | 2017177906 A1 | 10/2017 |
| WO | 2018022755 A1 | 2/2018 |
| WO | 2018132404 A1 | 7/2018 |
| WO | 2018138432 A1 | 8/2018 |

OTHER PUBLICATIONS

Singapore Written Opinion for Application No. 11202002064S, dated Jul. 6, 2022, 5 pages.
Japanese Notice of Reasons for Rejection for Japanese Application No. 2020-513769, dated Jul. 5, 2022 with translation, 15 pages.
Japanese Notice of Reasons for Rejection for Japanese Application No. 2021-003355, dated Oct. 11, 2022 with translation, 7 pages.
Chinese Office Action for Chinese Application No. 201780046491. 5, dated Jul. 5, 2021, with translation, 16 pages.
Indian Examination Report for Indian Application No. 202017013311, dated Jul. 8, 2021, with translation, 6 pages.
Australian Examination Report for Australian Application No. 2019213838, dated Jun. 29, 2021, 8 pages.
Japanese Notice of Reasons for Rejection for Japanese Application No. 2020-541522, dated May 31, 2021 with translation, 7 pages.
Non Final Office Action for U.S. Appl. No. 17/128,427, dated Jun. 29, 2021, 53 pages.
Non Final Office Action for U.S. Appl. No. 17/101,092, dated Feb. 17, 2022, 26 pages.
Non Final Office Action for U.S. Appl. No. 17/128,427, dated Dec. 15, 2021, 20 pages.
Taiwan Office Action for Taiwan Application No. 110102065, dated Dec. 1, 2021, with Search Report, 6 pages. 2021.
Ex Parte Quayle Office Action for U.S. Appl. No. 29/732,684, dated Aug. 18, 2021, 52 pages.
Ex Parte Quayle Office Action for U.S. Appl. No. 29/732,679, dated Sep. 15, 2021, 42 pages.
Ex Parte Quayle Office Action for U.S. Appl. No. 29/732,680, dated Sep. 15, 2021, 57 pages.
Ex Parte Quayle Office Action for U.S. Appl. No. 29/732,682, dated Sep. 15, 2021, 56 pages.
Ex Parte Quayle Office Action for U.S. Appl. No. 29/732,683, dated Sep. 15, 2021, 72 pages.
Non Final Office Action for U.S. Appl. No. 17/101,092, dated Sep. 16, 2021, 54 pages.
Non Final Office Action for U.S. Appl. No. 17/101,096, dated Oct. 15, 2021, 59 pages.
Taiwan Office Action for Taiwan Application No. 109117975, dated Sep. 24, 2021, with translation, 22 pages.
Final Office Action for U.S. Appl. No. 17/128,427, dated Oct. 5, 2021, 16 pages.
Non Final Office Action for U.S. Appl. No. 16/124,711, dated May 1, 2020, 31 pages.
Korean Office Action for Korean Application No. 10-2019-7005614, dated Apr. 17, 2020, with translation, 14 pages.
International Preliminary Report on Patentability for International Application No. PCT/US2018/052832, dated Apr. 21, 2020, 9 pages.
International Preliminary Report on Patentability for International Application No. PCT/US2018/049899, dated Mar. 10, 2020, 8 pages.
Japanese Notice of Reasons for Rejection for Japanese Application No. 2019-504037, dated Mar. 10, 2020 with translation, 7 pages.
International Search Report and Written Opinion for International Application No. PCT/US2019/014656, dated Apr. 1, 2019, 16 pages.
Third Party Submission Under 37 CFR 1.290, filed in U.S. Appl. No. 15/928,813, Concise Description of Relevance, dated Oct. 15, 2019,13 pages.
Third Party Submission Under 37 CFR 1.290, filed in U.S. Appl. No. 15/928,813, Concise Description of Relevance, dated Nov. 1, 2019, 8 pages.
Third Party Submission Under 37 CFR 1.290, filed in U.S. Appl. No. 15/928,813, Concise Description of Relevance, dated Oct. 27, 2019, 13 pages.

(56) References Cited

OTHER PUBLICATIONS

International Preliminary Report on Patentability for International Application No. PCT/US2017/043954, dated Jan. 29, 2019, 6 pages.
International Search Report and Written Opinion for International Application No. PCT/US2017/043954, dated Oct. 5, 2017, 6 pages.
Non Final Office Action for U.S. Appl. No. 16/441,363, dated Aug. 8, 2019, 23 pages.
Final Office Action for U.S. Appl. No. 16/164,322, dated Apr. 11, 2019, 20 pages.
Extended European Search Report for European Application No. 17835207.6, dated Mar. 10, 2020, 12 pages.
International Search Report and Written Opinion for International Application No. PCT/US2019/056704, dated Dec. 18, 2019, 11 pages.
Non Final Office Action for U.S. Appl. No. 29/663,230, dated Jul. 25, 2019, 19 pages.
Chen et al., "A Metallic RFID Tag Design for Steel-Bar and Wire-Rod Management Application in the Steel Industry", Progress in Electromagnetics Research, PIER 91, 2009, pp. 195-212.
International Search Report and Written Opinion for International Application No. PCT/US2020/034661, dated Sep. 1, 2020, 16 pages.
European Communication Pursuant to Article 94(3) for European Application No. 17835207.6, dated Oct. 23, 2020, 6 pages.
Non Final Office Action for U.S. Appl. No. 16/783,504, dated Oct. 15, 2020, 38 pages.
Final Office Action for U.S. Appl. No. 16/124,711, dated Aug. 7, 2020, 18 pages.
Japanese Decision of Final Rejection for Japanese Application No. 2019-504037, dated Oct. 6, 2020, with translation, 5 pages.
Non Final Office Action for U.S. Appl. No. 15/928,813, dated Apr. 15, 2020, 51 pages.
Korean Notice to File a Response for Korean Application No. 30-2020-0042662, dated Sep. 12, 2020 with translation, 3 pages.
Non Final Office Action for U.S. Appl. No. 16/427,864, dated Nov. 4, 2020, 56 pages.
Notice of Allowance for U.S. Appl. No. 16/783,504, dated Nov. 13, 2020, 12 pages.
Non Final Office Action for U.S. Appl. No. 16/751,285, dated Jan. 25, 2021, 51 pages.
Singapore Written Opinion for Application No. 11202003431Y, dated Apr. 22, 2021, 7 pages.
International Search Report and Written Opinion for International Application No. PCT/US2021/013796, dated May 11, 2021, 13 pages. 2021.
Japanese Notice of Termination of Pretrial Reexamination for Japanese Application No. 2019-504037, dated May 18, 2021, with translation, 2 pages.
Japanese Report of Pretrial Reexamination of Japanese Application No. 2019-504037, dated May 12, 2021, with translation, 5 pages.
Japanese Notice of Reasons for Rejection for Japanese Application No. 2020-522026, dated May 25, 2021 with translation, 8 pages.
Canadian Examination Report for Canadian Application No. 3,088,900, dated Apr. 8, 2021, 6 pages.
International Preliminary Report on Patentability for International Application No. PCT/US2019/056704, dated Apr. 14, 2021, 7 pages.
Non Final Office Action for U.S. Appl. No. 16/320,597, dated Apr. 13, 2021, 74 pages.
Chinese Office Action for Chinese Application No. 201880080975.6, dated Dec. 22, 2022 with translation, 19 pages.
Chinese Office Action for Chinese Application No. 201880065325.4, dated Mar. 8, 2023 with translation, 35 pages.
Japanese Notice of Reasons for Rejection for Japanese Application No. 2021-570892, dated May 9, 2023 with translation, 18 pages.

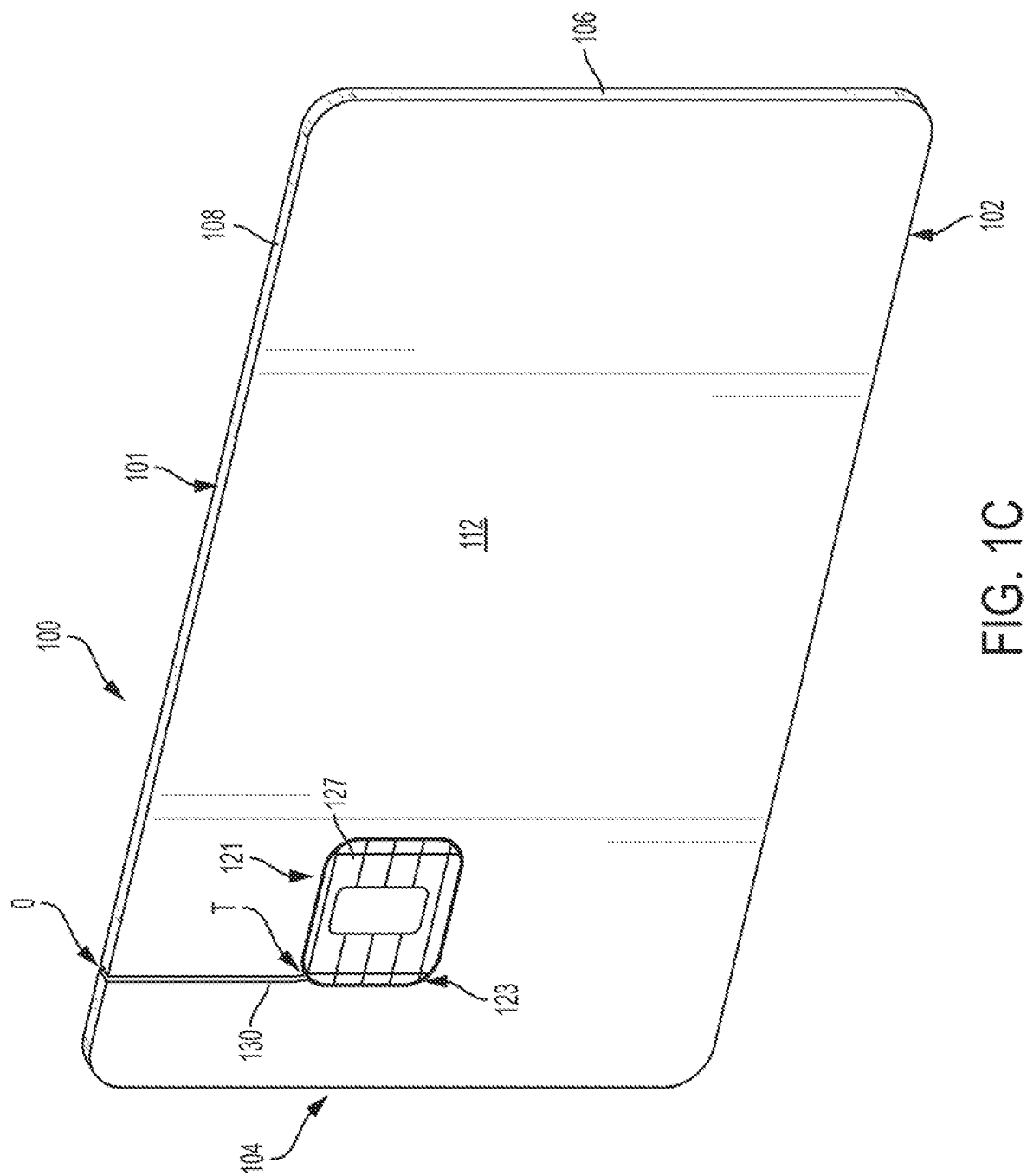

DI CAPACITIVE EMBEDDED METAL CARD

CROSS REFERENCE TO RELATED APPLICATIONS

This application is a continuation of U.S. application Ser. No. 16/983,395, filed Aug. 3, 2020 (status: allowed), which is a continuation of U.S. application Ser. No. 15/928,813, filed Mar. 22, 2018 (status: granted as U.S. Pat. No. 10,762,412), which claims priority from U.S. Provisional Application Ser. No. 62/623,936, titled DI CAPACITIVE EMBEDDED METAL CARD, filed Jan. 30, 2018, all of which are incorporated by reference herein in their entirety.

BACKGROUND OF THE INVENTION

Cards, such as identification cards, transponder cards, and transaction cards, such as credit cards, debit cards, sometimes referred to as smart cards, are well known in the art, some embodiments of which may comprise one or more metal layers. An exemplary such card is shown in U.S. Pat. No. 8,725,589, incorporated herein by reference. It is also well known to embed a microchip or payment module in transaction cards, including in metal cards. Some embedded payment modules, referred to as "dual interface" modules, have contacts disposed on one side of the card and configured to interface with a card reader, and a radio frequency identification (RFID) antenna for communicating inductively with a card reader. In a metal environment, such as a metal card, it may be necessary to provide a booster antenna or amplifier to improve performance of the communication interface with the card reader.

In particular, it is known to use the metal frame of the card itself as such an antenna or amplifier, with the metal enclosure that surrounds the payment module chip having a discontinuity or "slit" in the metal. U.S. Pat. No. 8,608,082 ('082 patent) to Le Garrec et al. and U.S. Pat. No. 9,812,782 (and others), to Finn et al., incorporated herein by reference, disclose metal cards with such a discontinuity in the form of a slit emanating from a mounting location of the RFID chip in the card to a peripheral edge of the card. The concept of a metal, card-shaped, non-contact antenna having a slit, for RFID signal amplification in a metal environment, is also described generally in the literature, such as at "A Metallic RFID Tag Design for Steel-Bar and Wire-Rod Management Application in the Steel Industry," *Progress In Electromagnetics Research* (*PIER*) Vol. 91 (2009).

The '082 patent characterizes the metal frame of the card as an amplifier for amplifying the gain of the near-field communication antenna electrically connected to the microcircuit associated with the payment module, the amplifier comprising "an electrically conductive element electrically insulated from the microcircuit and from the antenna, of generally annular shape," which in some embodiments forms a ring that is broken at least once.

The Finn patents refer to the payment module as a "transponder chip module (TCM) comprising an RFID chip (IC) and a module antenna" and describes the amplifier formed by the card body as a "coupling frame" having "an electrical discontinuity comprising a slit or non-conductive stripe."

Regardless of the nomenclature used, metal "slit" cards may have some disadvantages. In particular, embodiments in which a single slit extends from a midpoint of one edge of the module pocket to the periphery of the card in a straight horizontal line that is the shortest path from the pocket to the periphery provides little resistance to flexure of the card at the discontinuity. Metal cards may still have one or more layers over the metal layer. As disclosed in the Finn Patent, ". . . a coupling frame (CF) [may] partially surround [] a planar antenna (PA) structure on a chip carrier tape (CCT) with a slit (or slot, or gap) extending from an inner edge of the coupling frame (CF) to an outer edge thereof. . . Multiple slits may be provided in a single coupling frame (CF). Multiple coupling frames, each having slits may be provided." For a card in which the one or more layers is plastic, the plastic may start to wear or whiten because of such flexure. Thus, there is a need in the art for designs that provide better resistance to card flexure and the potential wear induced thereby. Although Finn proposes some alternative constructions, there is still a need in the art for constructions that provide improved functionality and aesthetics.

SUMMARY OF THE INVENTION

One aspect of the invention comprises a transaction card comprising a metal layer, an opening in the metal layer to receive a transponder chip module, and at least one discontinuity. The discontinuity comprises a gap extending from a front surface of to a back surface of the metal layer and having a width. The discontinuity extends from an origin on the card periphery to a terminus in the opening for the transponder chip. The card has a greater resistance to flexure than a card having a discontinuity of the same gap width in which the terminus and the origin are the same distance from a line defined by a first long side of the card periphery in an absence of one or more strengthening features. One strengthening feature comprises a single discontinuity wherein one of the terminus or the origin are located relatively closer to the first long side of the periphery than the other. Another strengthening feature comprises a plurality of discontinuities, each having a length, wherein fewer than all of the plurality of discontinuities extend from the card periphery to the opening. Another strengthening feature comprises a self-supporting non-metal layer disposed on at least one surface of the card. Still another strengthening feature comprises one or more ceramic reinforcing tabs disposed on one or both surfaces of the card, surrounding the opening. The card may have one or any combination of the foregoing strengthening features.

In general, the opening in the metal layer has a first edge parallel and relatively closest to a first short side of the card periphery and aligned with a first portion of the card periphery. A second edge of the opening is parallel and relatively closest to a first long side of the periphery. A third edge of the opening is parallel and relatively closest to a second long side of the periphery. The first edge of the opening is relatively closer to the short side of the periphery than the second edge is to the long side of the periphery. The second edge of the opening is relatively closer to the first long side of the periphery than the third edge is to the second long side of the card periphery. The edges of the opening define corners. The opening may be a stepped opening having a first open area defined in the first surface of the card and a second open area defined in the second surface of the card, wherein the first open area is greater than the second open area.

Another aspect of the invention comprises a transaction card having a metal layer, an opening in the metal layer, and a discontinuity, wherein the discontinuity defines a path from in which one of the terminus or the origin are located relatively closer to the first long side of the periphery than the other.

In some embodiments, the short side of the card periphery has a region aligned with the first edge of the opening, and the origin is located on the periphery outside the aligned region. The terminus may be located at the one corner of the opening, or relatively closer to one corner than to an adjacent corner defined by a common edge.

In some embodiments, the path of the discontinuity comprises at least two changes in direction of 90 degrees or more. At least a portion of the path of the discontinuity may define a stairstep geometry comprising more than two changes in direction of 90 degrees, or a portion of the path of the discontinuity may define a sawtooth geometry comprising more than two changes in direction of more than 90 degrees, or a combination thereof. In embodiments wherein the path of the discontinuity comprises at least one change in direction of more than 90 degrees and at least one change in direction of 90 degrees, the path may have a micro stairstep geometry and a macro sawtooth geometry, comprising at least a first plurality of more than two changes in direction of 90 degrees leading to a first change in direction of more than 90 degrees and a second plurality of more than two changes in direction of 90 degrees leading to a second change in direction of more than 90 degrees. Discontinuities with a stairstep geometry may have a rise greater than the run, or vice versa. Discontinuities with a stairstep geometry may have a curved radius at each change of direction.

In some embodiments, the path of the discontinuity has at least one section of curved geometry, including embodiments in which the path of the discontinuity has one or more changes in direction greater than or equal to 90 degrees, wherein at least one change in direction has a curved geometry. The discontinuity may have, for example, a sinusoidal shape comprising at least two changes in direction of more than 90 degrees.

The discontinuity may extend from the first short side of the periphery to the second edge of the opening or from the first or second long side of the periphery to the opening. The first and second edges of the opening may be said to define a first corner of the opening and the first and third edges of the opening to define a second corner of the opening. In some embodiments, the discontinuity extends from the first edge in a location relatively closer to the second corner than the first corner and terminates in the short side of the periphery in a location relatively closer to the first corner than the second corner. In other embodiments, the discontinuity extends from the opening in a location relatively closer to the first corner than the second corner and terminates in the short side of the periphery in a location relatively closer to the first corner than the second corner.

The card may comprise a transponder chip module disposed in the opening, in which case the metal layer comprises a booster antenna or amplifier for the transponder chip module. The card may have a first non-metal layer, such as a plastic or ceramic layer, disposed on a first surface of the metal layer. A ceramic layer may comprise a ceramic coating wherein the gap defined by the discontinuity is at least partially filled with the ceramic coating. The non-metal layer may comprise a decorative layer comprising one of wood or leather. A second non-metal layer may be disposed on a second surface of the metal layer. In one embodiment, the first non-metal layer comprises a ceramic layer and the second non-metal layer comprises a plastic layer. The discontinuity may be optically visible from one or both surfaces of the card, or may not be optically visible from at least one surface of the card.

Another aspect of the invention comprises a transaction card comprising a metal layer having an front surface and a back surface; and a plurality of discontinuities in the metal layer wherein fewer than all of the plurality of discontinuities extend from the periphery to the opening. At least one of the plurality of discontinuities may have a length equal to a shortest length from the opening to the periphery. At least two of the plurality of discontinuities may be parallel to one another.

Another aspect of the invention is a method for making a transaction card as described herein. The method comprises providing the metal layer, creating the opening in the metal layer sized to accommodate the transponder chip module, and creating the discontinuity, wherein one of the terminus or the origin is located relatively closer to the long side of the periphery than the other, and disposing the transponder chip module in the opening. The discontinuity may be formed prior to creating the opening for the transponder chip module. The method may comprise creating the one or more discontinuities having an endpoint located inside the boundary of the opening. The method may comprise creating a stepped opening having a first portion with a first open area, and a second portion having a second open area greater than the first open area. The method may comprise creating the first portion of the opening from the front surface of the card, and creating the second portion of the opening from the back surface of the card. The discontinuity may be formed using a laser. The method may further comprise at least partially filling the gap defined by the discontinuity with a non-metal material. At least one non-metal layer may be disposed on the front surface or the back surface of the metal layer, such as by adhesive bonding, or wherein the non-metal layer comprises a ceramic layer, by spray coating the ceramic layer onto the metal layer. Spray coating the ceramic layer onto the metal layer may comprise at least partially filling the gap with the ceramic coating.

Another aspect of the invention may comprising providing a card as described herein having a non-metal layer comprising a ceramic layer having a color, further comprising creating with a laser one or more permanent markings on the ceramic layer having a different color than the ceramic layer color. Creating the one or more permanent markings on the ceramic layer may comprise removing an overlying ceramic layer to reveal an underlying layer having a different color, which the underlying layer may be the metal layer or an underlying ceramic layer having a different color than an outermost ceramic layer.

Another aspect of the invention comprises a card having a metal layer as described herein, having at least one non-metal layer comprising a self-supporting layer, such as a self-supporting layer comprising polyimide or a fiberglass reinforced layer comprising an epoxy, such as FR4.

BRIEF DESCRIPTION OF THE DRAWINGS

FIG. 1C is a perspective view illustration of the exemplary metal layer of a card having the discontinuity and opening as depicted in FIG. 1B, after insertion of the payment module.

DETAILED DESCRIPTION OF THE INVENTION

Figure 6:
FIG. 6 is a plan view illustration of the bottom side of the card of FIG. 1C.
Figure 7:
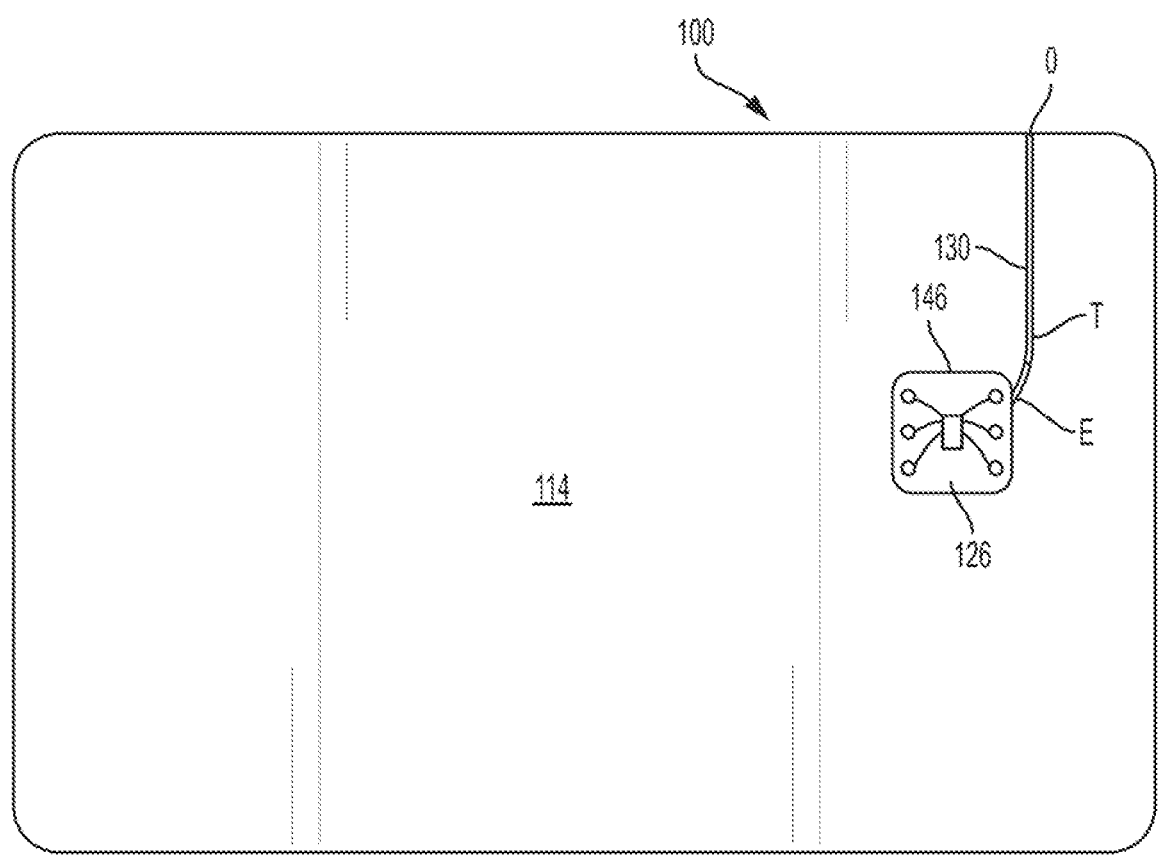
FIG. 7 is a plan view illustration of the back surface of the card of FIG. 1C.

FIGS. 1A-7 show an exemplary transaction card or portion of a card 100, having a card periphery 101 defined by left side 104 (also depicted in FIG. 3), right side 106 (also depicted in FIG. 4), top side 108 (also depicted in FIG. 5), and bottom side 102 (also depicted in FIG. 6). Left side 104 and right side 106 are parallel to one another, and top side 108 and bottom side 102 are parallel to each other. Sides 104 and 106 may be referred to as the "relatively shorter" sides and sides 108 and 102 referred to as the "relatively longer" sides. The portion of the card illustrated in FIG. 1C is a metal layer 100 having a front surface 112 (also depicted in FIG. 2) and a back surface 114 (also depicted in FIG. 7). It should be understood that the terms "front" and "back" are used herein for differentiation of the opposite surfaces, and no particular significance is intended by the use of these terms. Similarly the terms right and left and top and bottom are used to refer to the sides that form the periphery of the card, which terms are oriented from a view of the front surface of a card as depicted in, e.g., FIG. 2, but again, this terminology is for ease of description only. Similarly, the term "side" is used herein to refer to the sides that form periphery of the card, and the term "edge" is used to refer to the edges of the boundary of the opening, but the use of these terms is intended only for differentiation, without specific significance to the terminology used.

Figure 1A:
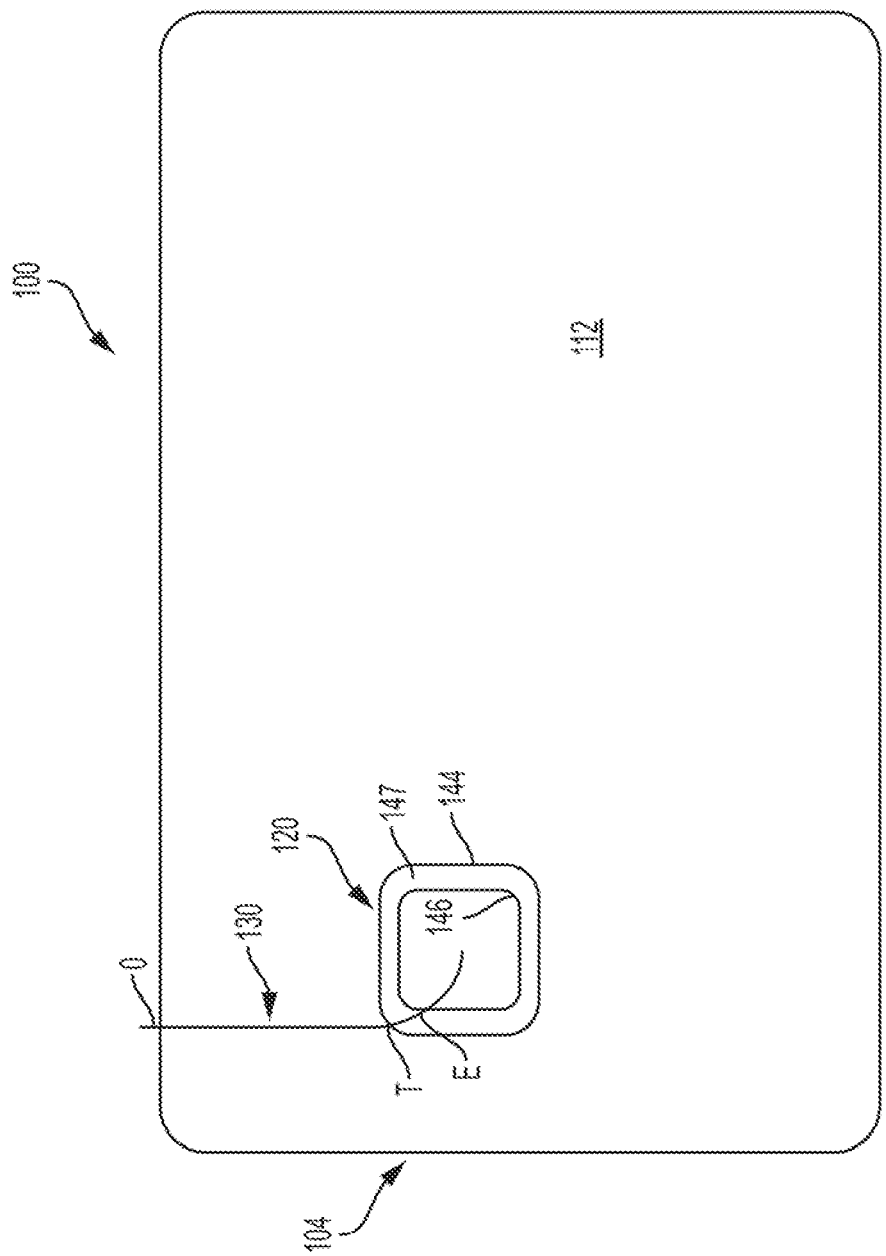
FIG. 1A is a schematic view illustration of a machine tool path for creating a discontinuity in a metal layer relative to boundaries of upper and lower portions of a transponder chip opening in the metal layer.
Figure 1B:
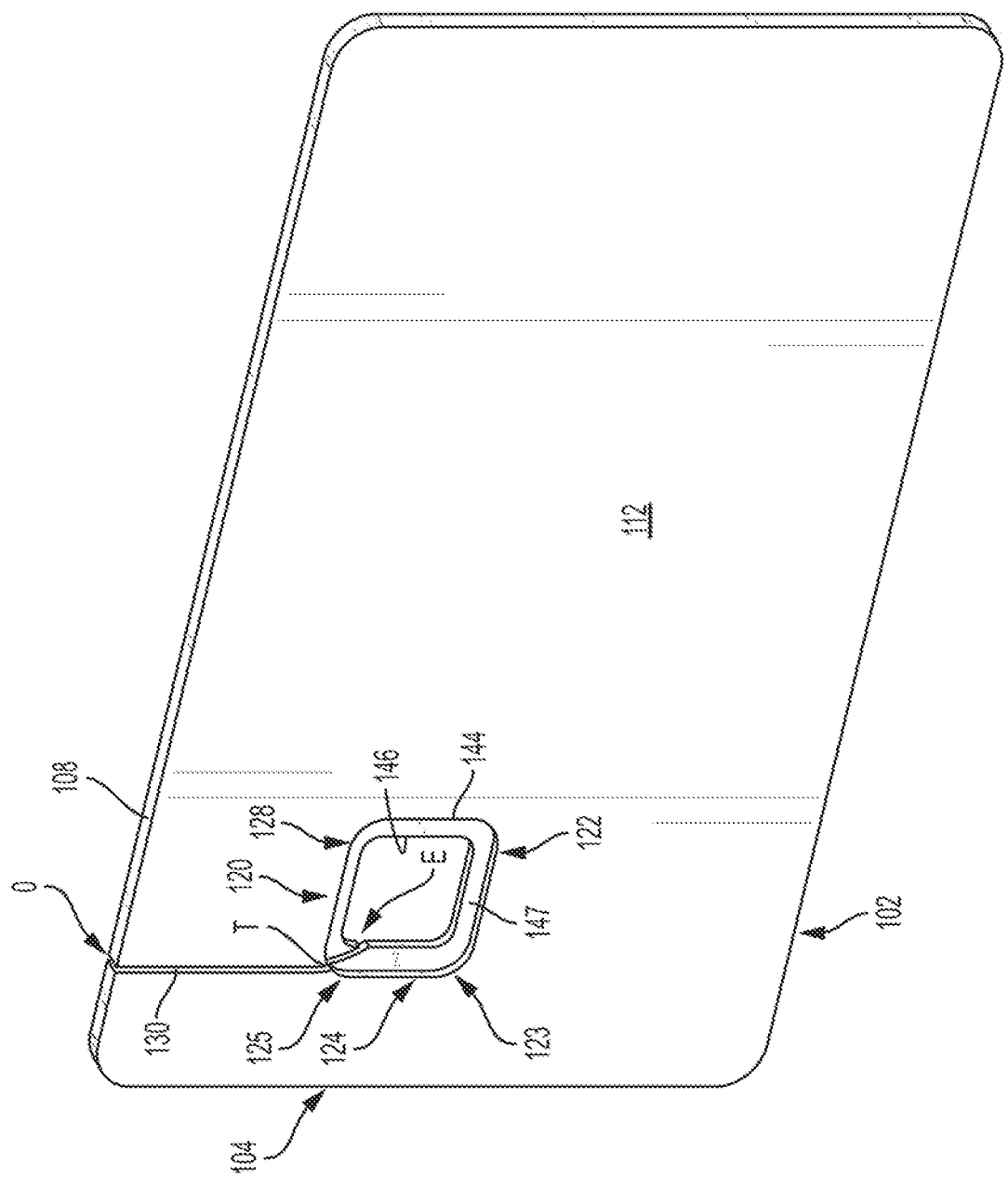
FIG. 1B is a perspective view illustration of a metal layer created in accordance with FIG. 1A, viewed from the front, upper, right side, showing the opening and discontinuity prior to insertion of a transponder chip into the transponder chip opening.
Figure 2:
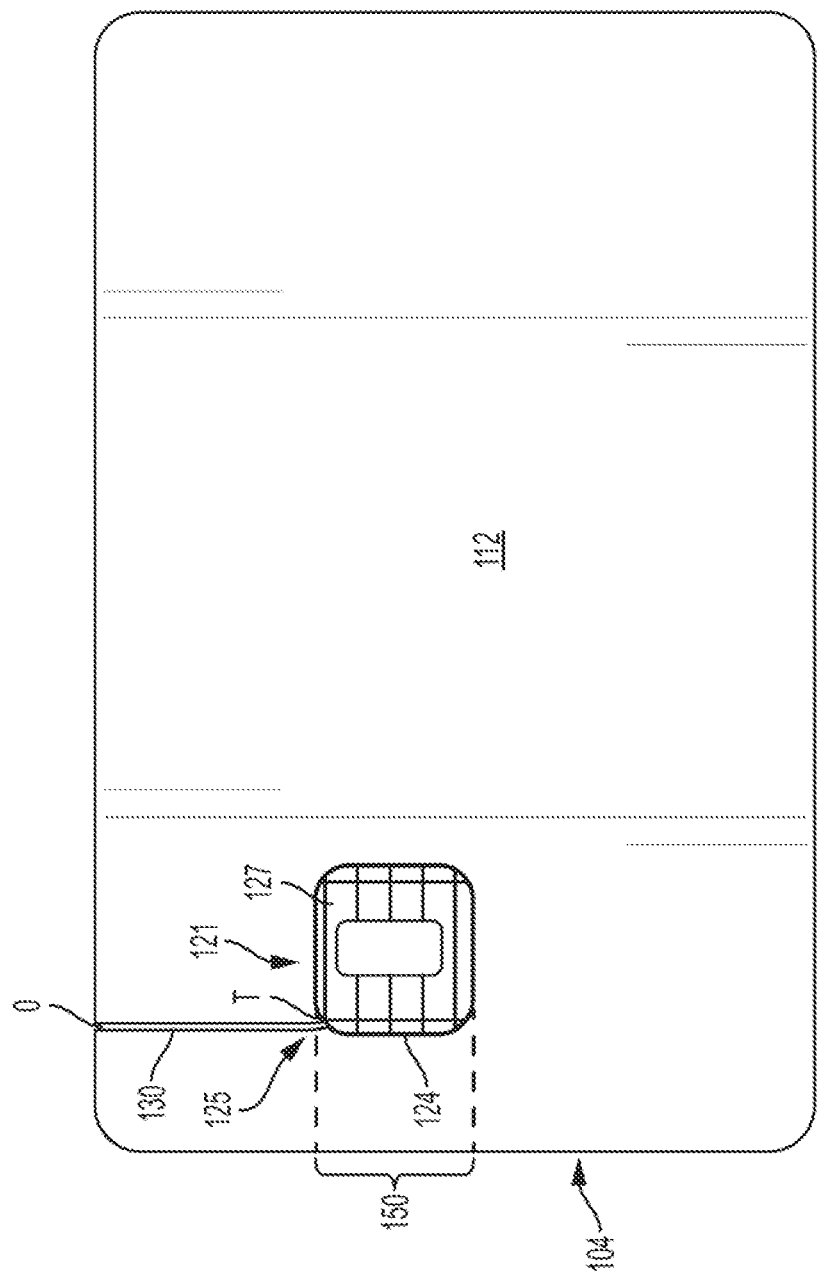
FIG. 2 is a plan view illustration of the front surface of the card of FIG. 1C.
Figure 3:
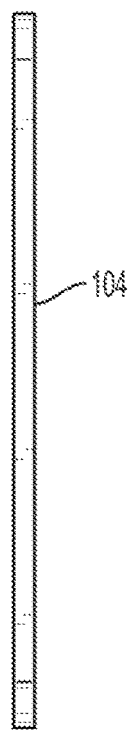
FIG. 3 is a plan view illustration of the left side of the card of FIG. 1C.
Figure 4:
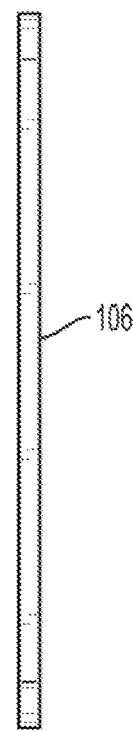
FIG. 4 is a plan view illustration of the right side of the card of FIG. 1C.
Figure 5:
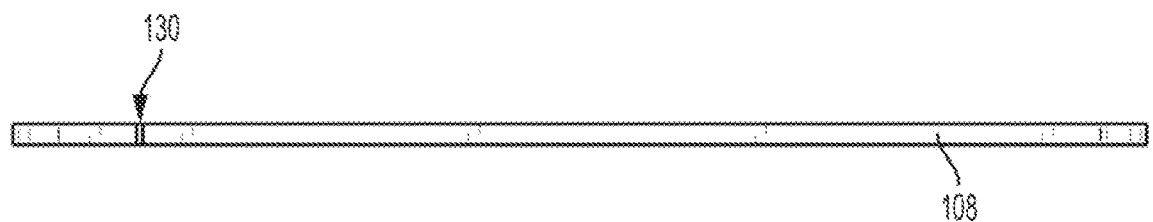
FIG. 5 is a plan view illustration of the top side of the card of FIG. 1C.

As depicted in FIGS. 1B, 1C and 2, an opening 120 in the metal layer 100 is sized to accommodate a transponder chip module 121 having a front surface 127 and a back surface 126 (as shown in FIG. 3). The details of the transponder chip module are not a claimed feature of the invention and are shown for illustrative purposes only. Although an 8-pin module is shown, the transponder may have fewer or more contacts, such as for example, a 6-pin module. Those of skill in the art will recognize that any number of different transponder chip designs are available and may be used in an exemplary card.

As shown in more detail in FIG. 1B, the opening has a left edge 124 parallel and relatively closest to the left short side 104 of the card periphery 101, a second edge 128 parallel and relatively closest to the top side 108 of the card periphery, a third edge 122 parallel and relatively closest to the bottom side 102 of the card periphery. Left edge 124 is relatively closer to the left side 104 of the card periphery than the top edge 128 is to the top side 108 of the periphery, and the top edge 128 is relatively closer to the top side 108 of the periphery than the bottom edge 122 is to the bottom side 102 of the card periphery. The edges of the opening 120 define corners (e.g. a top left corner 125 formed by edge 124 and edge 128 and a bottom left corner 123 formed by edge 124 and edge 122).

A discontinuity or slit 130 in metal layer 100 comprises a gap in the metal layer extending from the front surface 112 to the back surface 114 of the metal layer 100. The terms "discontinuity" and "slit" may be used interchangeably herein. The discontinuity defines a path from an origin (O) at the card periphery and terminating at a terminus (T) in the periphery of the opening. In the embodiment shown in FIGS. 1A-C, the terminus is located relatively closer to corner 125 than to the adjacent corner 123 defined by common edge 124. Most if not all of the other inventive embodiments depicted herein show the terminus located relatively closer to one corner than the other corner defined by the common edge. This is in contrast to prior art designs that depict the slit terminating in a location at a midpoint between adjacent corners 123 and 125.

As depicted in FIGS. 1A and 1B, the opening and the discontinuity reflect an intermediate step in the manufacture of the card. Opening 120, as depicted, is a stepped pocket opening that defines an overall area having an outer boundary 144 and an inner boundary 146. An upper portion (open to the front surface of the card) of the stepped pocket opening has an open area defined by the outer boundary 144. A lower portion of the pocket (open to the back surface of the card) has an area defined by inner boundary 146, wherein the area of the lower portion of the pocket is less than the area of the upper portion of the pocket. The wall between the inner boundary and the outer boundary along the direction of the thickness of the card defines a ledge 147 between the inner boundary and wall of the upper pocket and having a surface parallel to the upper and lower surfaces of the card. It should be understood that as used herein, the term "parallel" as used in connection with any and all comparative features is intended to mean parallel within a desired tolerance, but may include features that are not precisely parallel. The discontinuity is depicted as having an endpoint E located on the inner boundary 146.

Figure 32:
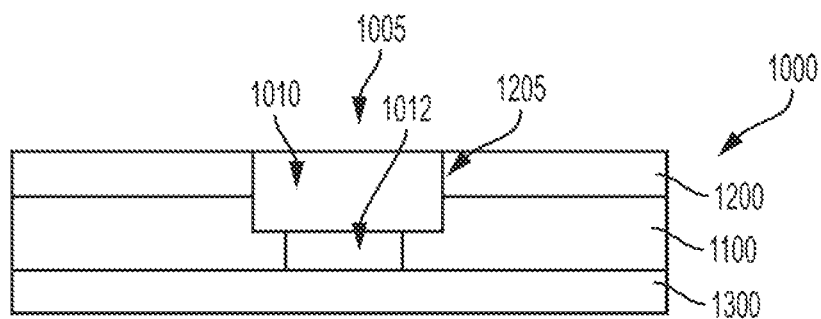
FIG. 32 is a cross sectional illustration of an exemplary card embodiment showing exemplary optional layers over and under the metal layer.

FIG. 1A depicts a "tool path and milling boundary view" of the card of FIGS. 1B and 1C. FIG. 1A schematically reflects discontinuity 130 as a line showing a tool path for the cutter (e.g. laser) for generating the discontinuity. Thus, the line 130 in FIG. 1A extends past the origin O on the periphery of the card and past the endpoint E on the inner boundary of the opening. The manufacturing boundary lines corresponding to the opening depict the locations of the inner boundary 146 and outer boundary 144 of the upper and lower pockets generated by the pocket-making process, which may be performed by milling tools, etching tools, lasers, and the like. Sequentially, during manufacture of the card, the discontinuity may first be cut in the metal layer, such as with a laser, along a line including origin O and endpoint E and which may extend past both origin O and endpoint E to ensure a complete cut through the metal layer. Then the upper and lower pockets are milled. Thus, although depicted in the tool path view of FIG. 1A with the endpoint of the discontinuity located inside the inner boundary 146, in a completed metal layer, such as is shown in FIG. 1B, the discontinuity actually ends at the inner boundary 146 at point E, but from the front of the card as depicted in FIG. 1C, the discontinuity is only visible to the edge of the outer boundary 144 at point T, because of the payment module inserted in the opening. Because only the inner boundary 146 extends through the back surface 114 of the metal layer, the discontinuity 130 extends to the endpoint E on the back of the card. It should be understood that the design of the transponder chip depicted herein only illustrates an exemplary contact pattern, and the invention is not limited to any particular pattern. It should also be understood that although the discontinuity 130, the inner boundary 146, and the back surface of the module 126 are depicted on the back of the metal layer in FIG. 7, layers over the back surface of the card may fully or partially obscure visibility of the discontinuity, the transponder chip, and the opening, depending upon the nature and opacity of the back layer. In general, the opening and transponder chip are typically obscured from view by an opaque member or portion of a layer, but some portion of the discontinuity may be detectible from the back side, if viewed closely and if an optional back layer of the card is not fully opaque. It should further be understood that the contacts on the top surface 127 of the transponder module are preferably flush with the outermost front surface of the card. If the metal layer is the top layer, the contacts will be flush with the front surface of the metal layer. If another layer, such as a clear plastic layer or a ceramic layer, are disposed on top of the metal layer, however, such as depicted in FIG. 32, the contacts will be mounted flush with the top layer 1200.

After creating the discontinuity, the opening may be cut by first milling the lower portion and then milling the upper portion, or vice versa. The lower portion may be milled from the back surface of the card, and the upper portion from the front surface of the card (although both portions may be milled from the front surface). In some embodiments, a non-conductive material may be provided in the opening by any of the methods described in U.S. Pat. No. 9,390,366, incorporated herein by reference. When the payment module is eventually mounted in the opening, an upper portion of the module rests on ledge 147 and the integrated circuit on the back of the module is disposed in the lower portion. The geometry of the lower portion of the pocket (e.g. defined by boundary 146 in FIGS. 1A and 1B), specifically its length (X dimension—parallel to the long sides 102, 108 of the metal layer) and width (Y dimension—parallel to the short sides

104, 106 of the metal layer) in the plane coextensive with the back surface of the card, has an impact on RF performance. For example, acceptable ranges of performance for a 6-pin payment module may have X and Y dimensions preferably in a range of 3-10 mm, more preferably X=7.9 mm to 8.9 mm and Y=4.5 mm to 6.0 mm, and most preferably 7.9 mm×5.3 mm. For an 8-pin payment module, acceptable ranges of performance may have X and Y dimensions preferably in the range of 7 mm to 10 mm, and more preferably in the range of 7.5 mm to 9.5 mm. The size of the gap in the discontinuity may also impact performance, with the gap size preferably less than 1 mm, more preferably less than 0.5 mm, and most preferably about 0.1 mm, plus or minus 0.05 mm. The invention is not limited to any particular discontinuity gap size or dimensions of the lower portion of the pocket, however. In the embodiment depicted in FIGS. 1A-2, the left side 104 of the card has a region 150 (shown in FIG. 2 only, to reduce clutter) that is aligned with (e.g. coextensive with and parallel to) the left edge 124 of the opening 120/transponder module 121, and the origin (O) for the discontinuity is located on card periphery 101 outside region 150. In the embodiment depicted in FIG. 1, the terminus is located at corner 125.

Depicted in FIGS. 8A-31A are various other slit configurations, each of which can be characterized in numerous ways and may have certain features. Each FIG. 8A, 9A, etc. depicts the manufacturing path or boundary lines associated with each slit design. For the illustrations of the manufacturing path lines, the line 802, 902, etc. corresponding to the slit as depicted corresponds to the tool path for the cutter (e.g. laser) for generating the discontinuity. The manufacturing boundary lines corresponding for the opening depicts the inner (e.g. 804, 904) and outer (e.g. 806, 906) boundaries of the upper and lower pockets generated by the pocket-making tools, which may be milling tools, etching tools, lasers, and the link. The finished metal layers of the cards, in each case, however, conform to the designs as shown in FIGS. 8B-8F, 9B-9F, etc., in which, for example, FIGS. 8B, 9B, etc. depict the front view perspective views of the metal layer of the respective cards, FIGS. 8C, 9C, etc. depict front surface views, FIGS. 8D, 9D, etc. depict top (or bottom) side views, FIGS. 8E, 9E, etc. depict left side views, and FIGS. 8F, 9F, etc. depict back surface views. As should be understood, the one of the top side view or bottom side view depicted is selected to show the side of the card on which the origin (O) of each discontinuity is located, whereas the one of the top or bottom side view not depicted is essentially identical to FIG. 6. Likewise, the right side view for all of the aforementioned embodiments is essentially identical to the side view depicted in FIG. 4.

It should also be understood that FIGS. 8A-F to 31A-F depict only the metal layer of the exemplary cards. The metal layer may have one or more layers disposed over the front surface or the back surface of the card, and each additional layer may cover the entire surface or only a portion of the surface. The metal layer itself may comprise a composite of multiple metal layers, including embodiments in which at least one layer comprises a different metal than another. The additional layers may comprise, for example, any of the layers described in U.S. Published Pat. App. No. US20150339564A1 and/or US20170316300A1, incorporated herein by reference in their entireties. A preferred embodiment may comprise a ceramic coating on the front surface of the metal card and a plastic layer on the back surface of the card.

Figure 8A:
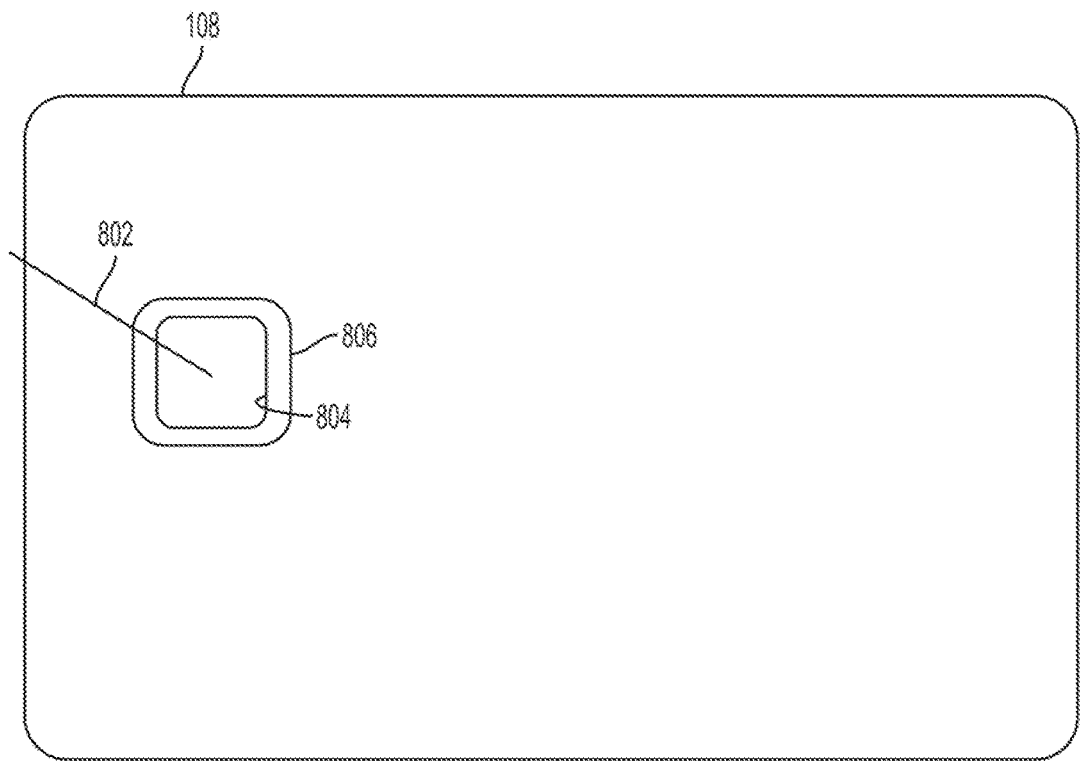
FIG. 8A is a schematic view illustration of a machine tool path for a discontinuity relative to boundaries of upper and lower portions of the transponder chip opening for another exemplary card embodiment.
Figure 8B:
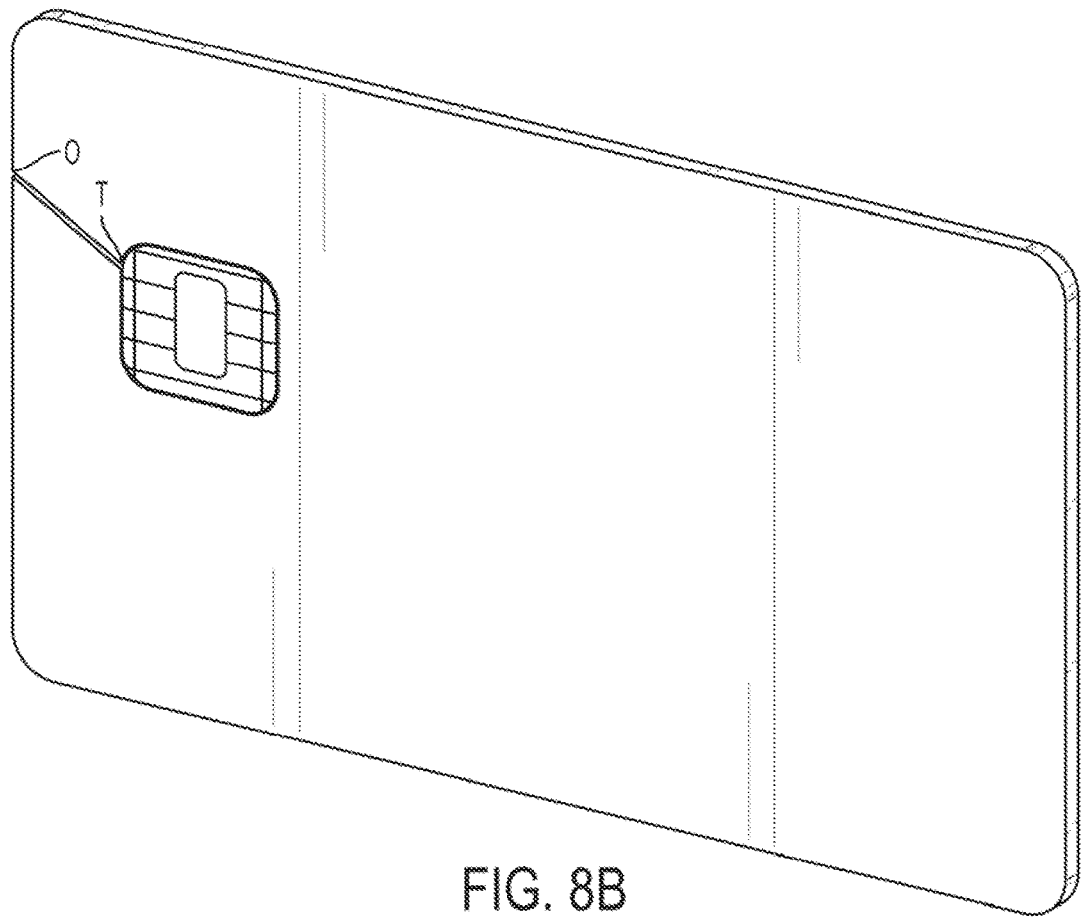
FIGS. 8B-8F are perspective and plan view illustrations of the front surface, top side, left side, back surface, respectively, of an exemplary card having the discontinuity depicted in FIG. 8A.
Figure 8C:
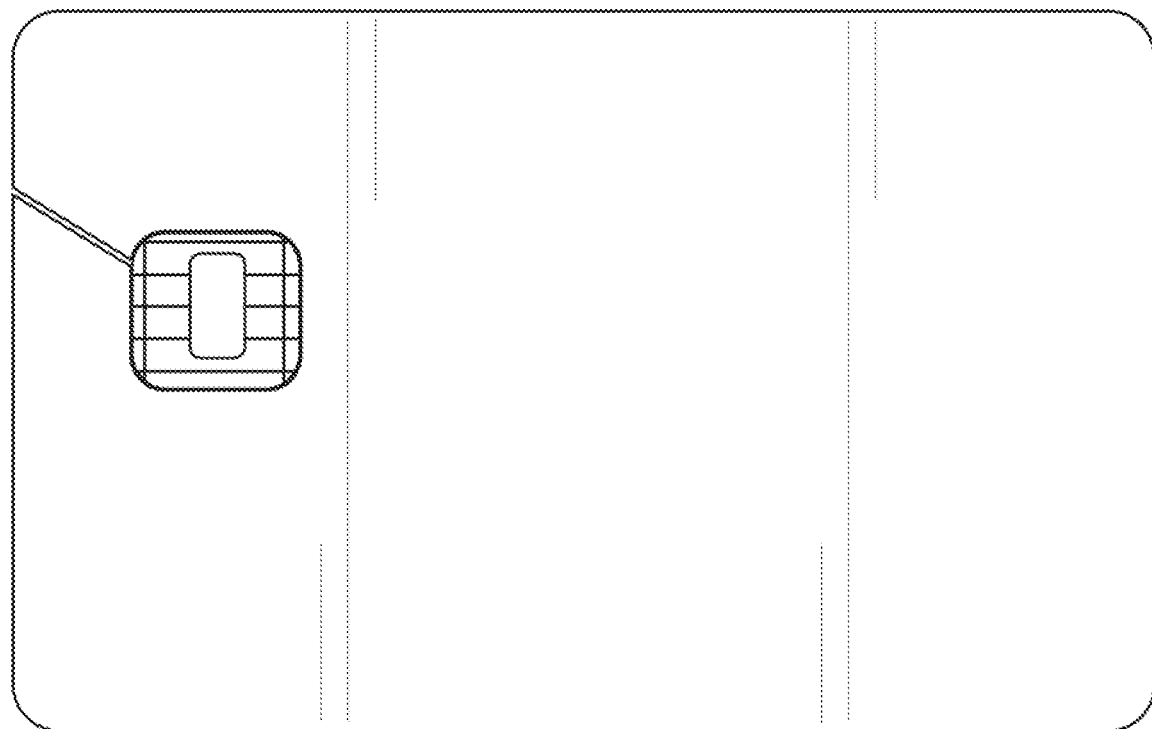
Figure 8D:
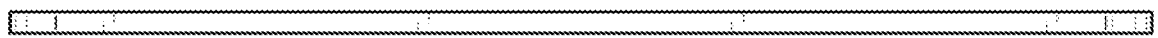
Figure 8E:
Figure 8F:
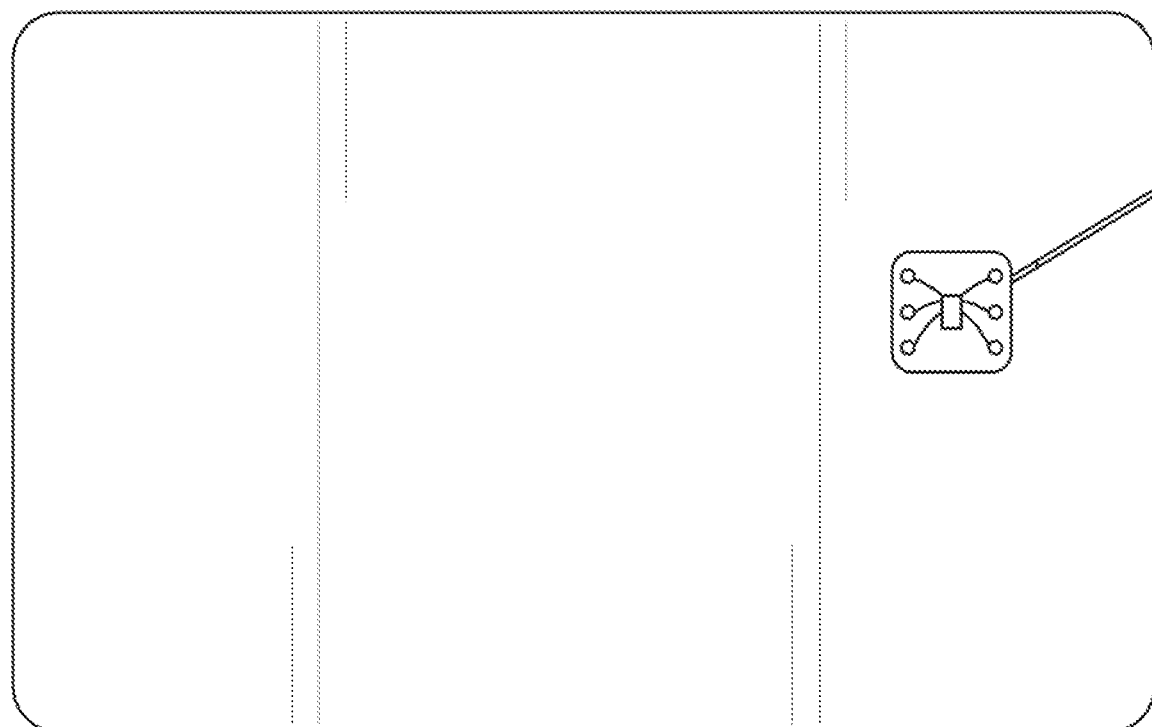

Referring now to the slit configuration depicted in FIG. 8A, the origin (O) is located relatively closer to the line defined by the top side 108 than the terminus (T). This characterization is also true of the slit configuration depicted in FIG. 1, in which the origin (O) is located on the top side 108. The location of the origin relatively closer to the line defined by the top side of the periphery than the terminus is also true of at least the designs depicted in FIGS. 9A, 10A, 12A, 14A-17A, 19A-21A, 30A, and 31A. In other designs, the location of the terminus is located relatively closer to the line defined by the top side 108, such as in the slit designs depicted in FIGS. 22A-24A. The term "line defined by the top side" refers to the imaginary line in space along which the top side 108 lies. Because the cards have rounded corners, the distance from the origin to the line defined by top side 108 is measured from intersection of the line defined by the top side 108 and the line defined by the left side 104, which point is not actually physically present as part of a metal layer having standard rounded corners. Thus in each of the foregoing exemplary embodiments, one of the terminus or the origin are located relatively closer to one long side of the periphery than the other. In other embodiments (e.g. FIGS. 11A, 18A, others) the terminus and the origin may be located approximately the same distance from the top or bottom sides.

It should be understood that although the term "origin" and "terminus," although representative of one method of constructing the discontinuity in which the cut line begins at or before the origin and extends in the direction of and beyond the terminus as further described herein, the use of these terms does not imply a specific manufacturing method or direction of the cut for forming the discontinuity. Furthermore, although referred to as a "terminus," as explained elsewhere herein, the terminus is only the location where the discontinuity meets the opening on the top surface of the card, and the discontinuity actually extends further inward to the periphery of the opening in the back surface of the card. Finally, although the front, upper left of the card is traditionally the location for the contacts, relative to what a consumer considers the "front" of a finished card containing the card branding, card number, and the like, it should be understood that in other embodiments, the contacts may be located in a mirror image position on the lower back right of the card and provide equivalent functionality, with the discontinuity similarly located relative to the back surface of the card as depicted herein relative to the front surface. Thus, the "front" and "back" surfaces of the card, as used herein, are relative to the disposition of the transponder module and do not necessarily reflect a traditional "front" or "back" as those terms might be used by a consumer in receipt of the final card. Of course, the location of the contacts is dictated by the arrangement of card readers that read the cards via a physical connection, and it should be understood that the location of the transponder chip relative to the periphery of the card is not limited by the invention.

Figure 9A:
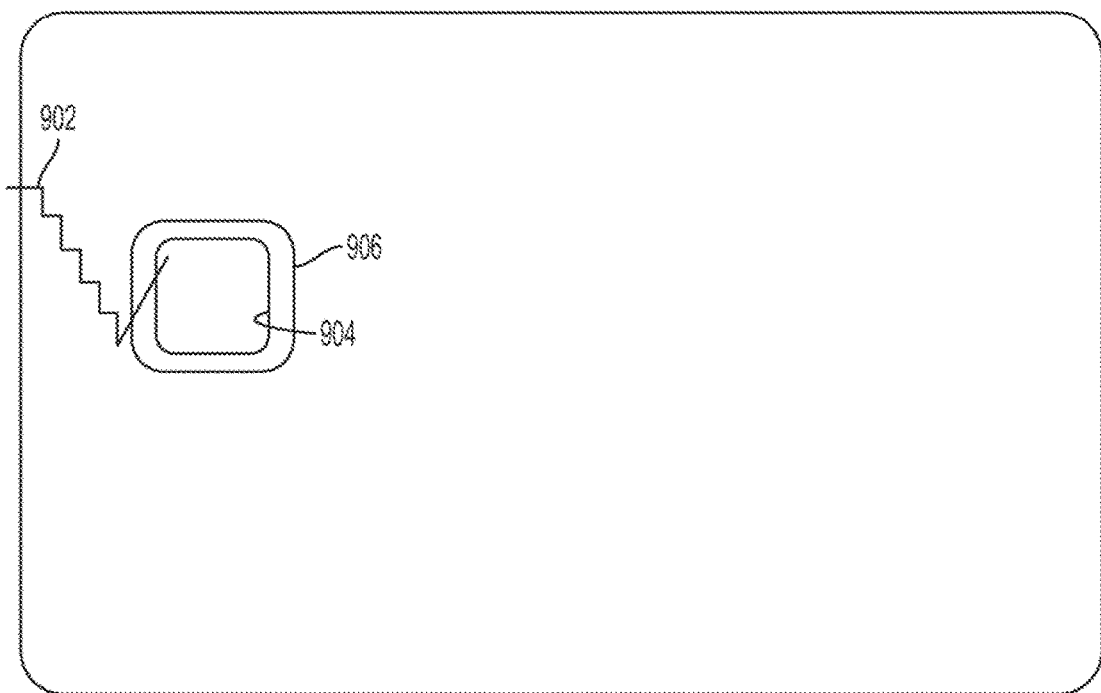
FIG. 9A is a schematic view illustration of a machine tool path for a discontinuity having a stairstep geometry relative to boundaries of upper and lower portions of the transponder chip opening for another exemplary card embodiment.
Figure 9B:
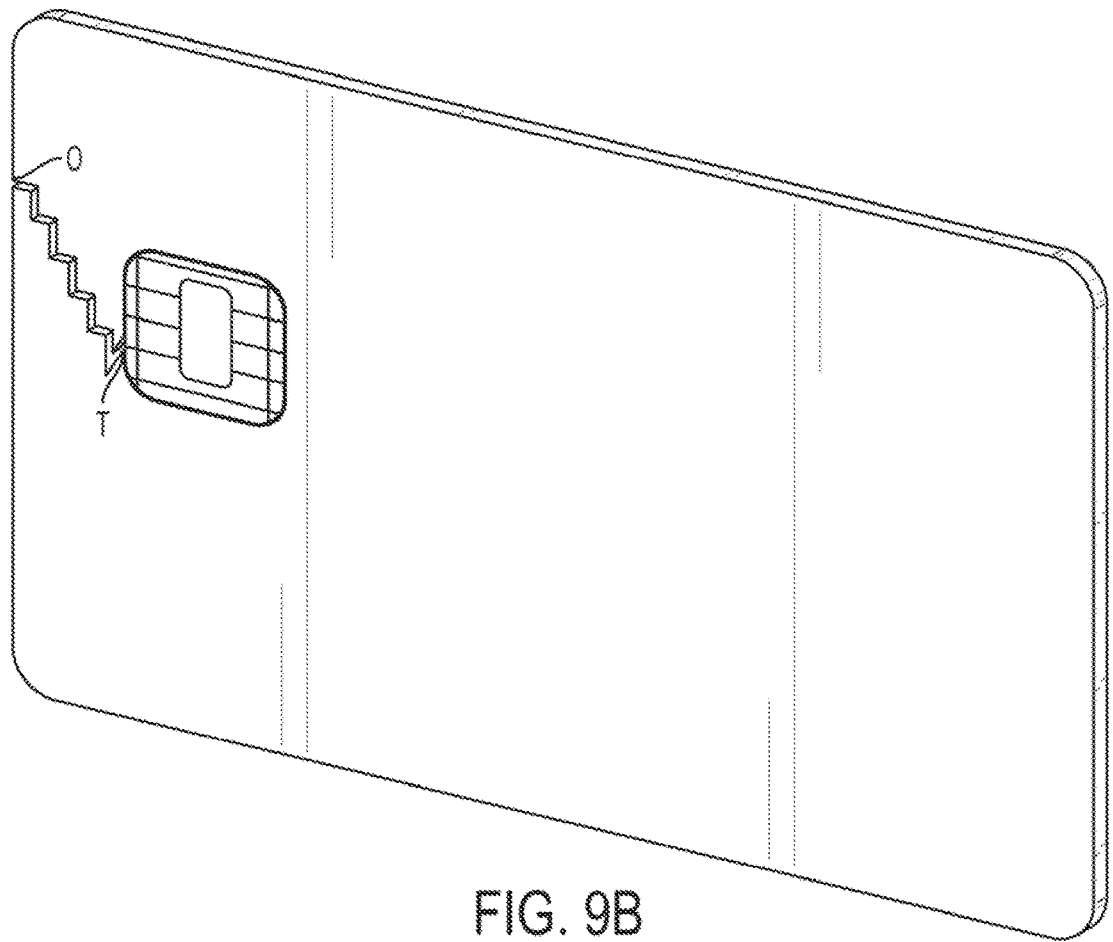
FIGS. 9B-9F are perspective and plan view illustrations of the front surface, top side, left side, back surface, respectively, of an exemplary card having the discontinuity depicted in FIG. 9A.
Figure 9C:
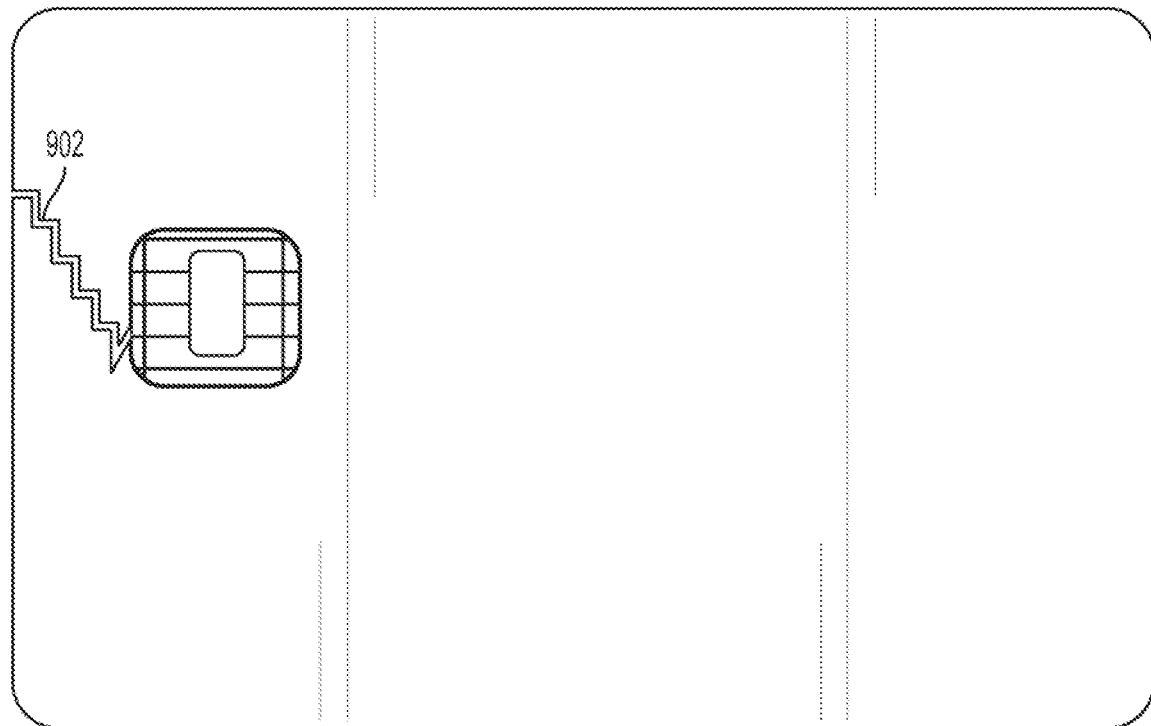
Figure 9D:
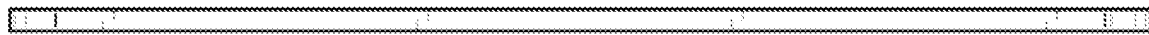
Figure 9E:
Figure 9F:
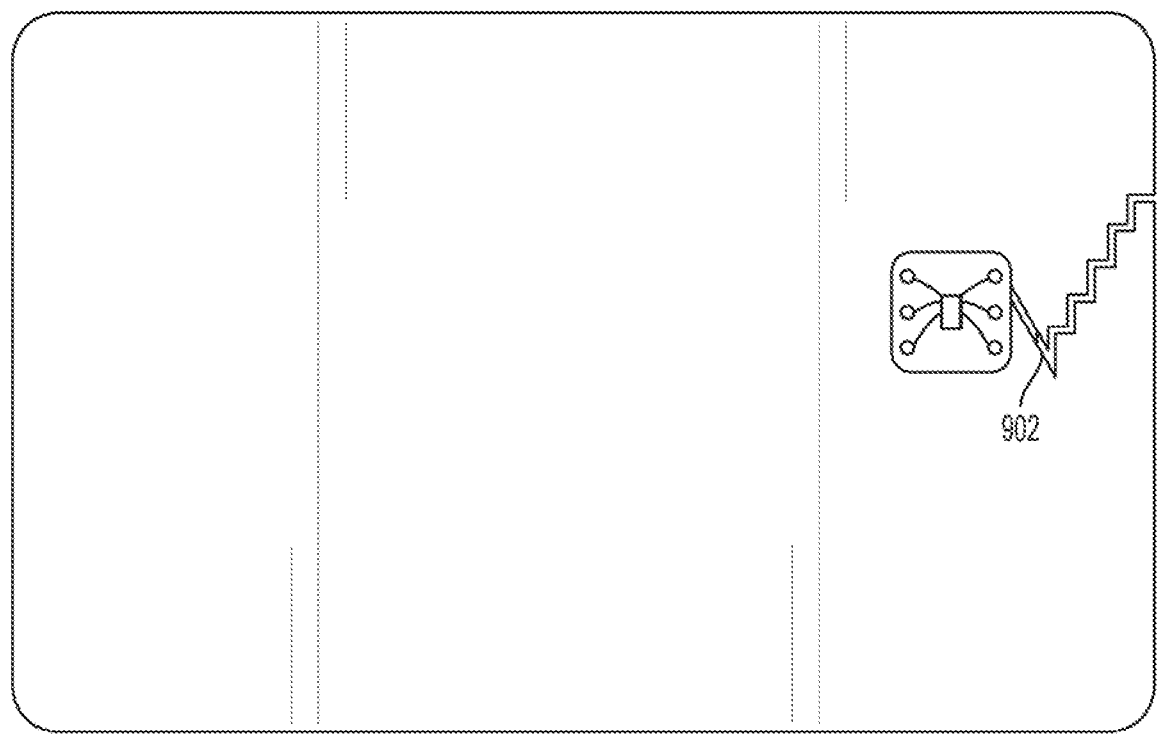
Figure 19A:
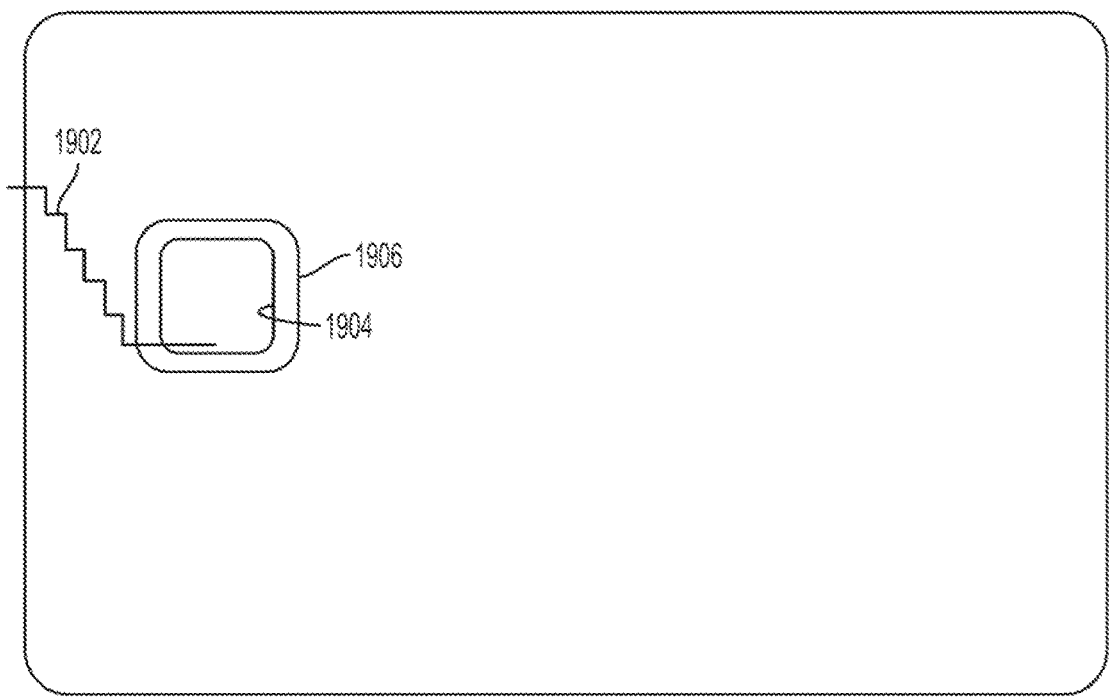
FIG. 19A is a schematic view illustration of a machine tool path for a discontinuity having a stairstep geometry relative to boundaries of upper and lower portions of the transponder chip opening for another exemplary card embodiment.
Figure 19B:
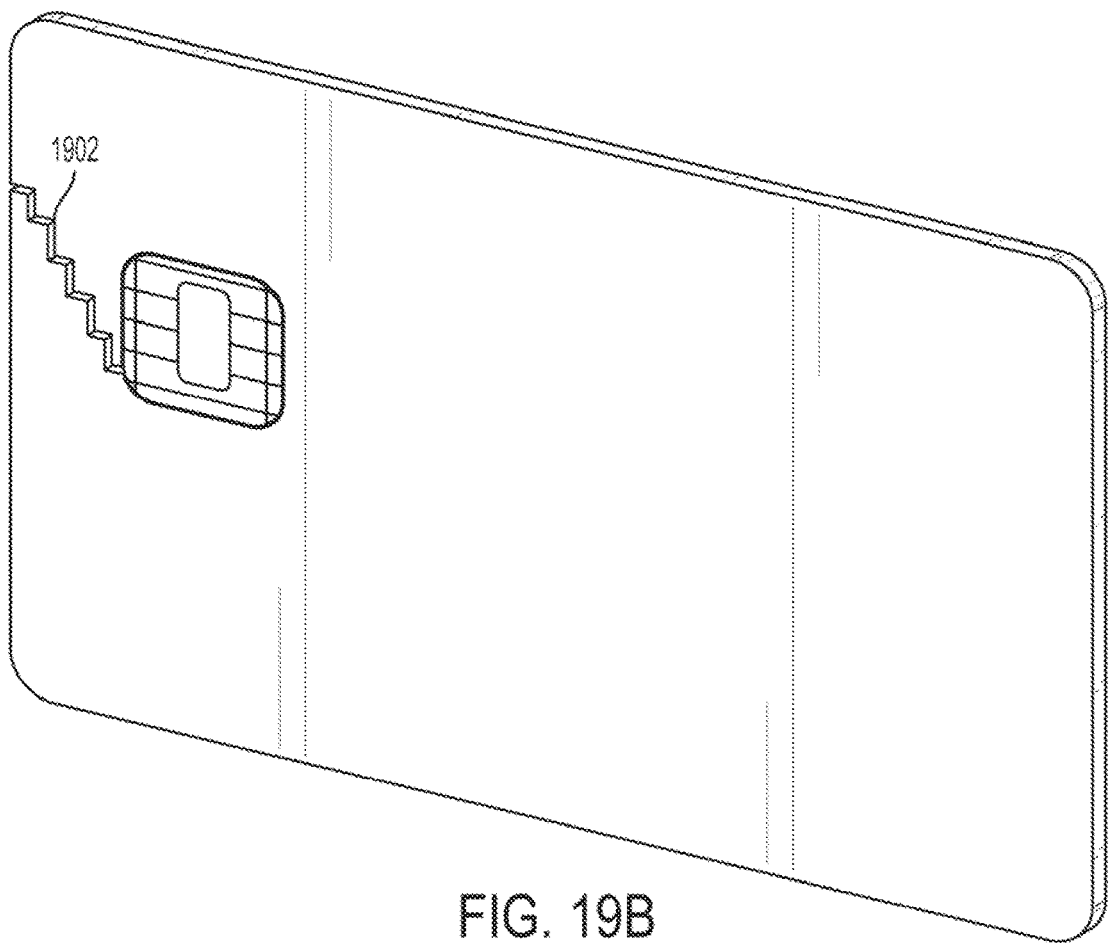
FIGS. 19B-19F are a perspective view (B) and plan view illustrations of the front surface (C), top side (D), left side (E), and back surface (F), respectively, of an exemplary card having the discontinuity depicted in FIG. 19A.
Figure 19C:
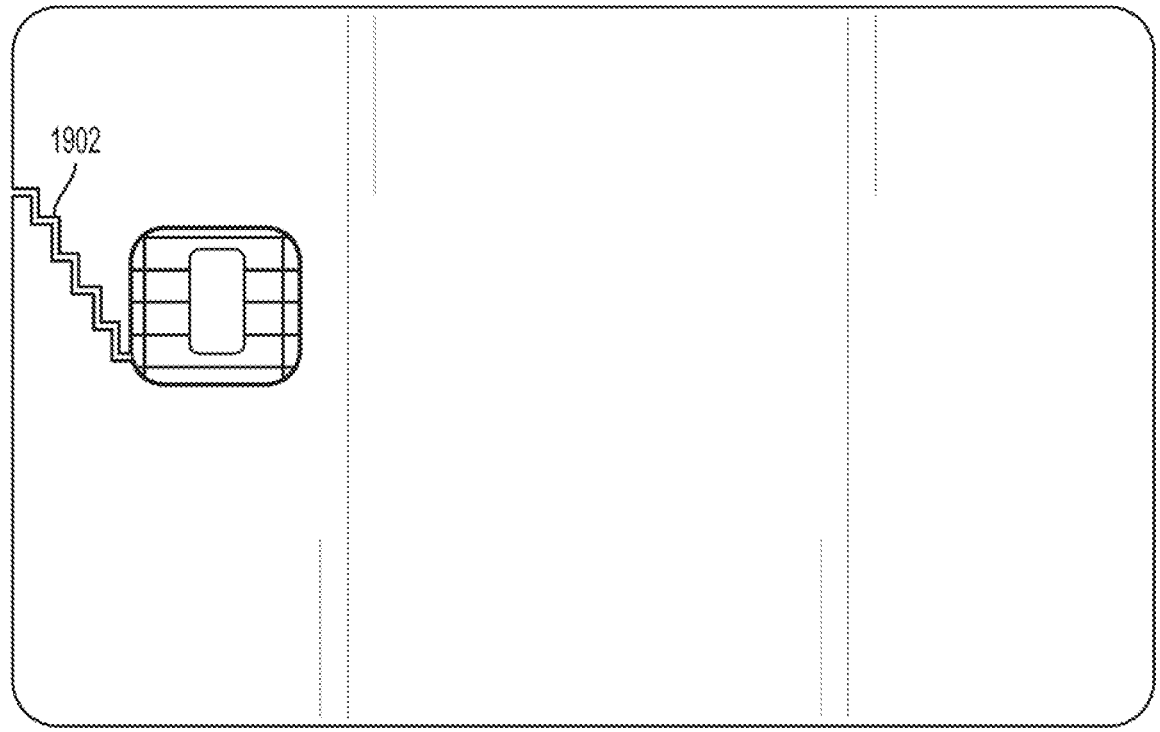
Figure 19D:
Figure 19E:
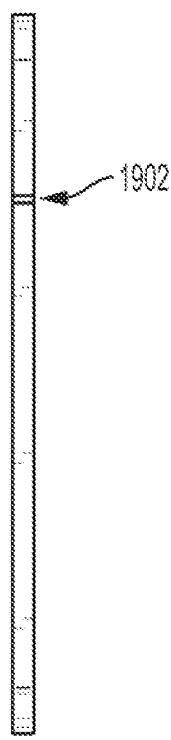
Figure 19F:
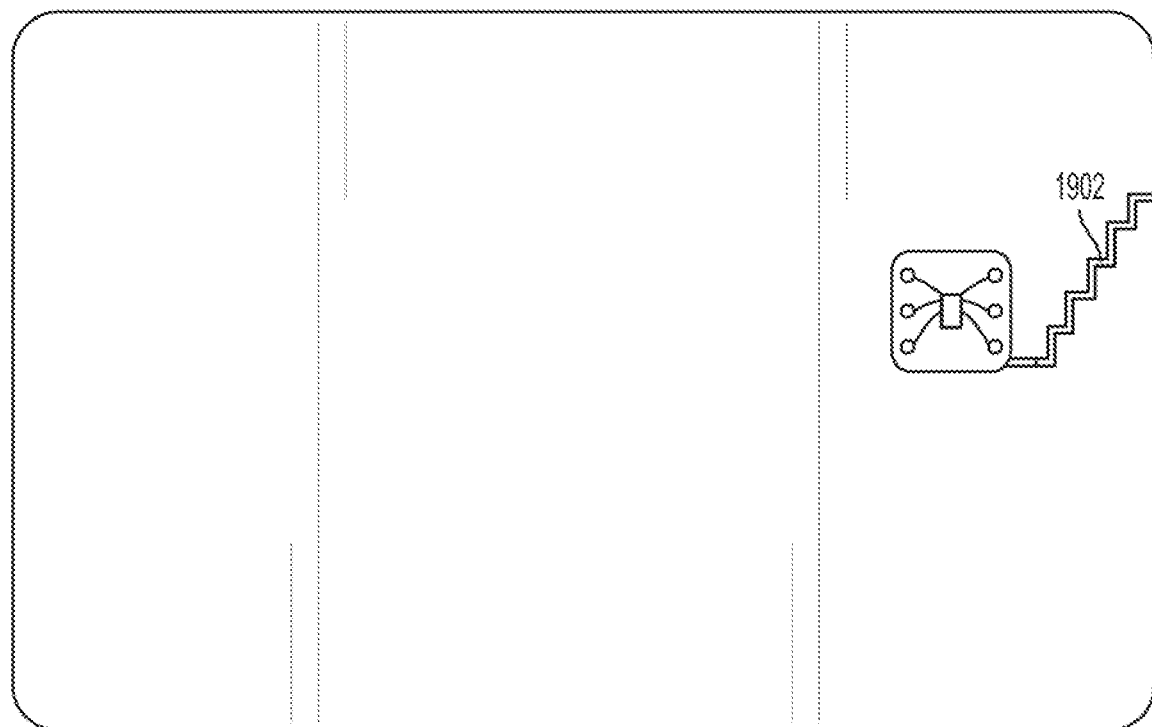
Figure 20A:
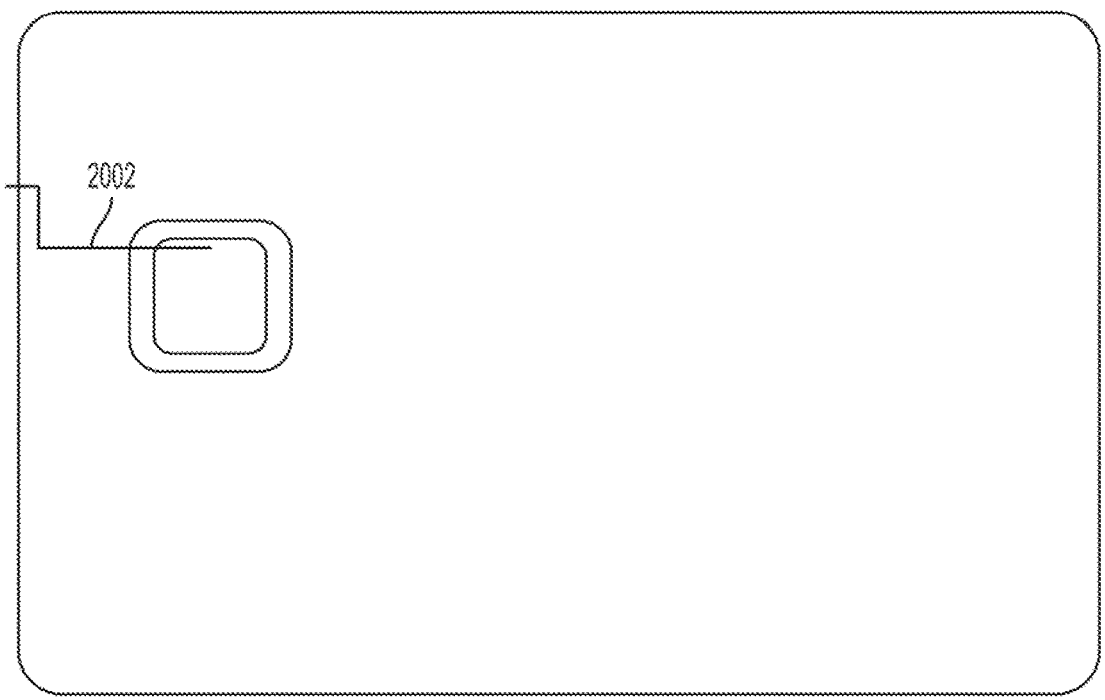
FIG. 20A is a schematic view illustration of a machine tool path for a discontinuity having a single stairstep geometry relative to boundaries of upper and lower portions of the transponder chip opening for another exemplary card embodiment.
Figure 20B:
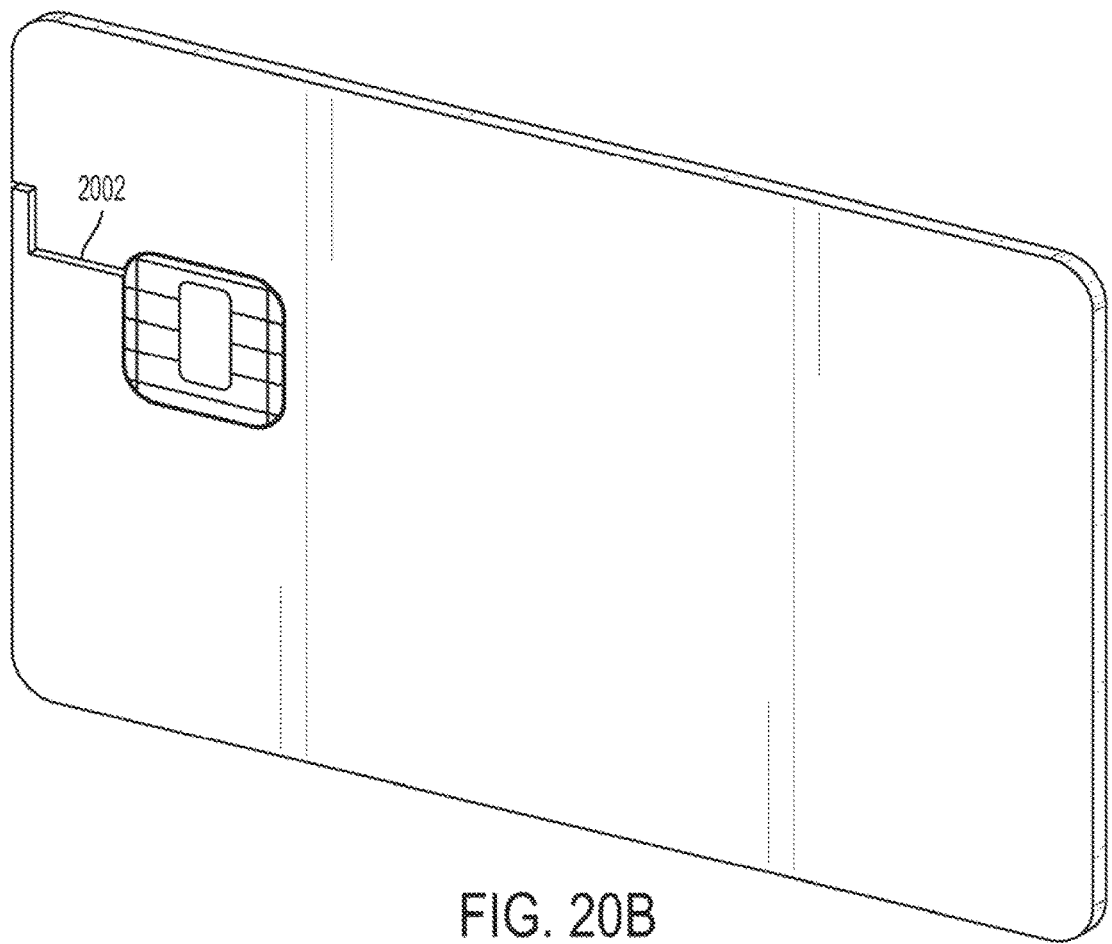
FIGS. 20B-20F are a perspective view (B) and plan view illustrations of the front surface (C), top side (D), left side (E), and back surface (F), respectively, of an exemplary card having the discontinuity depicted in FIG. 20A.
Figure 20C:
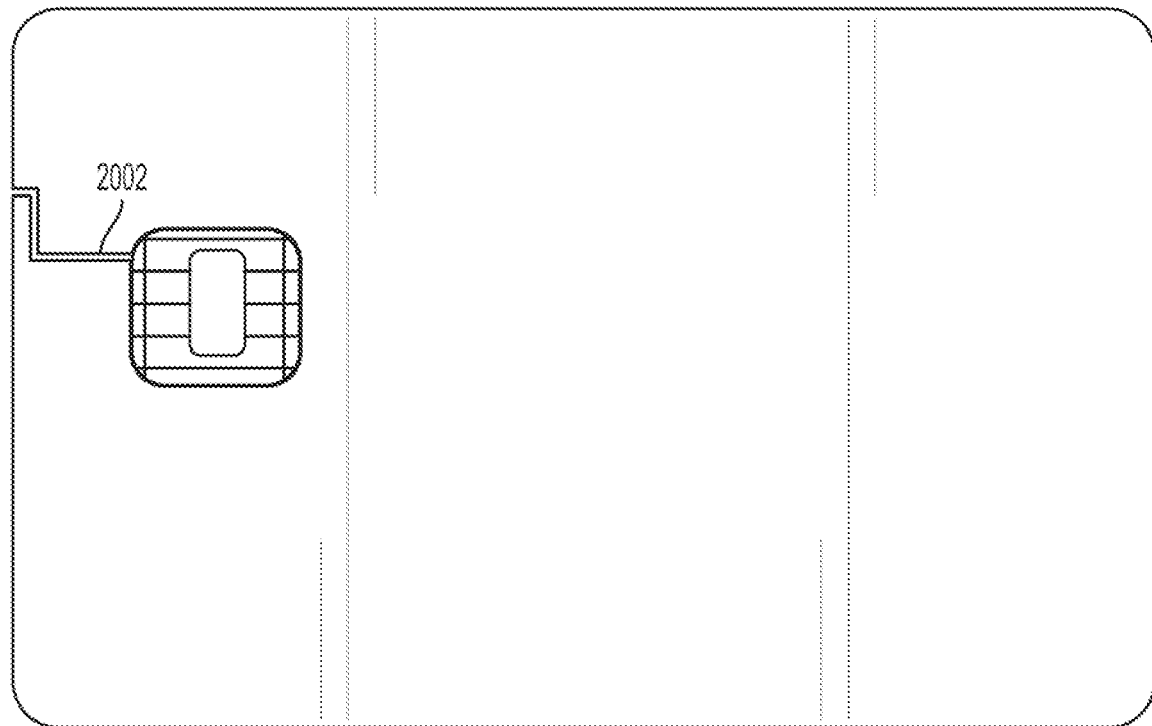
Figure 20D:
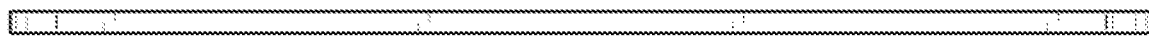
Figure 20E:
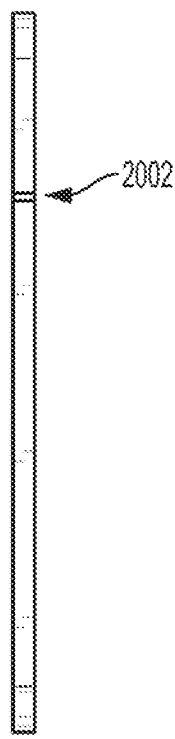
Figure 20F:
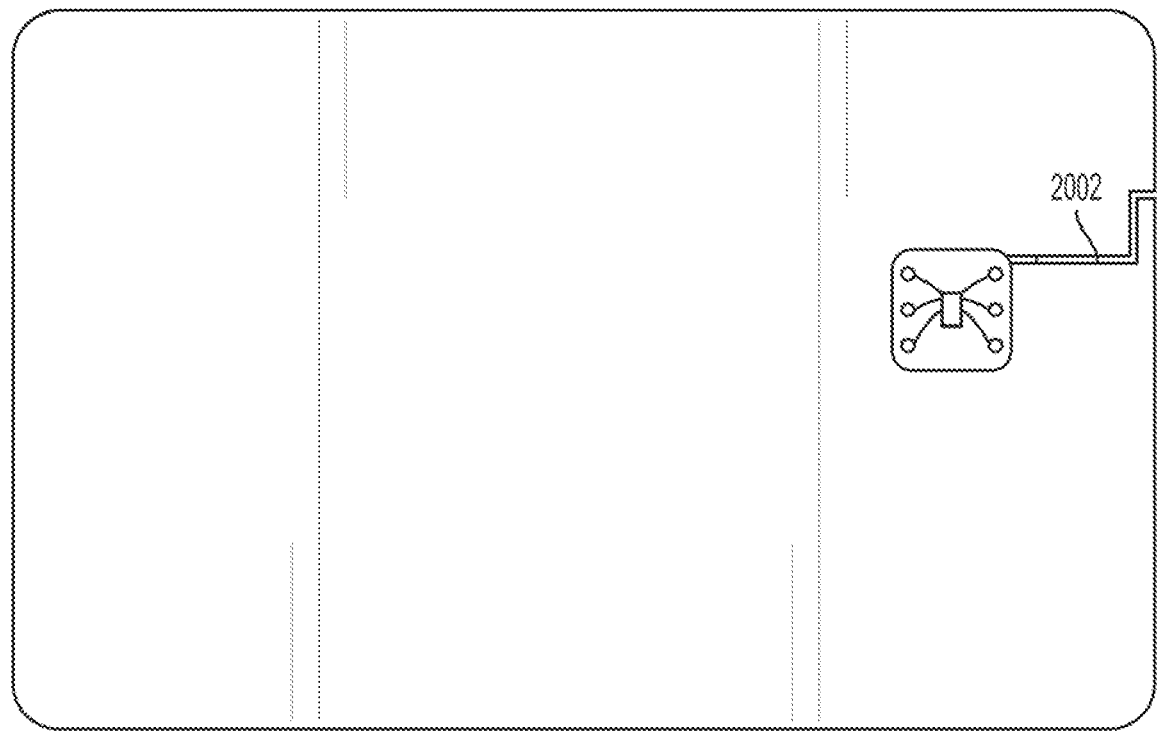
Figure 21A:
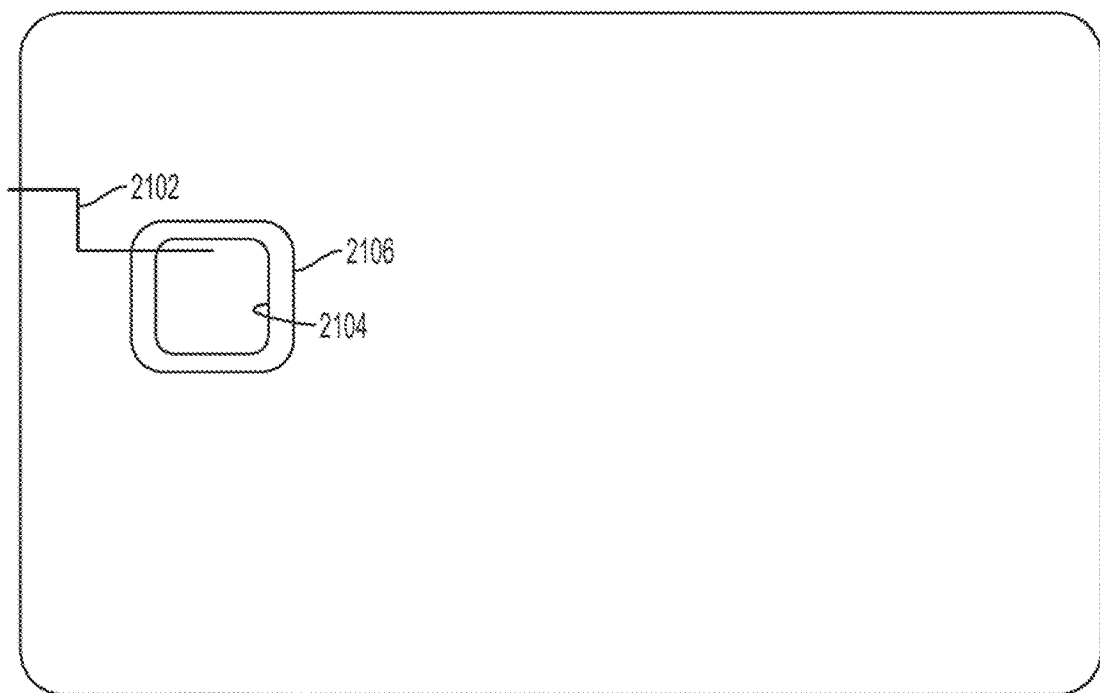
FIG. 21A is a schematic view illustration of a machine tool path for a discontinuity having a single stairstep geometry relative to boundaries of upper and lower portions of the transponder chip opening for another exemplary card embodiment.
Figure 21B:
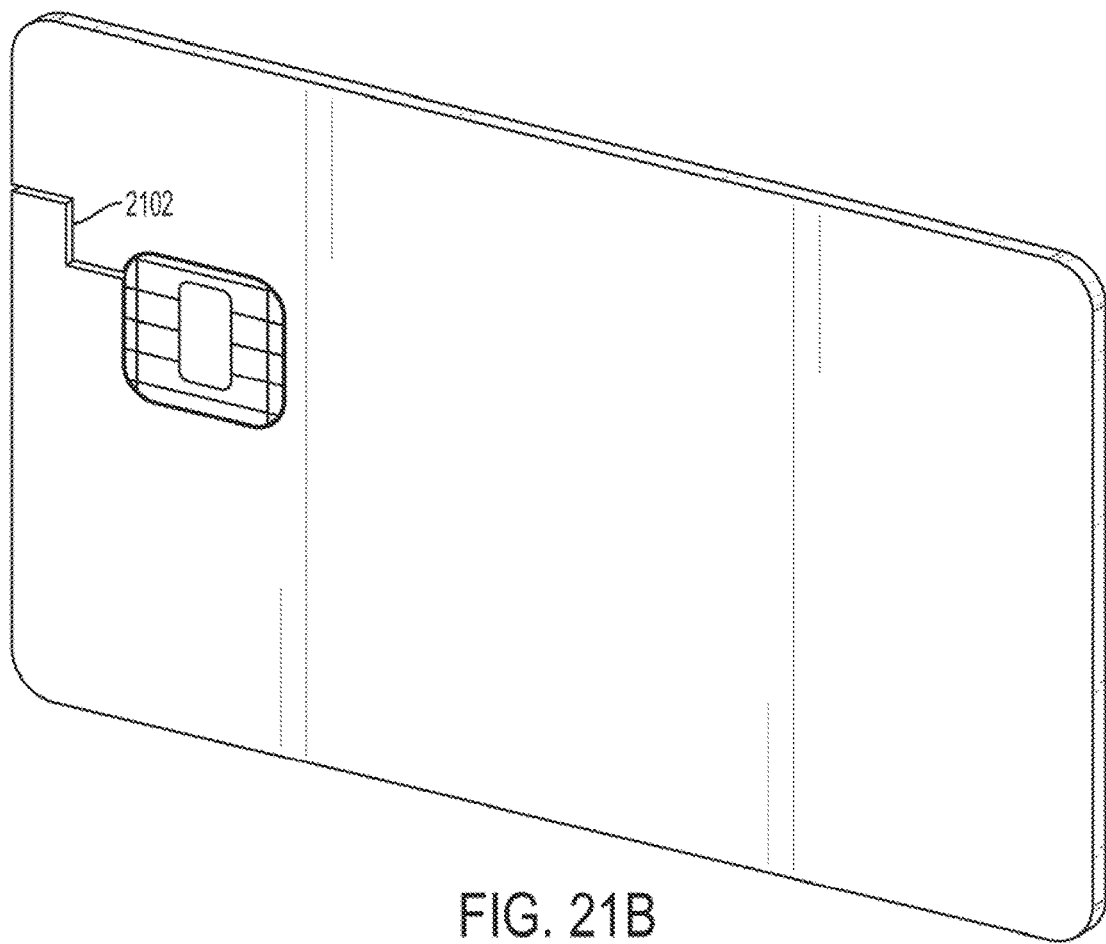
FIGS. 21B-21F are a perspective view (B) and plan view illustrations of the front surface (C), top side (D), left side (E), and back surface (F), respectively, of an exemplary card having the discontinuity depicted in FIG. 21A.
Figure 21C:
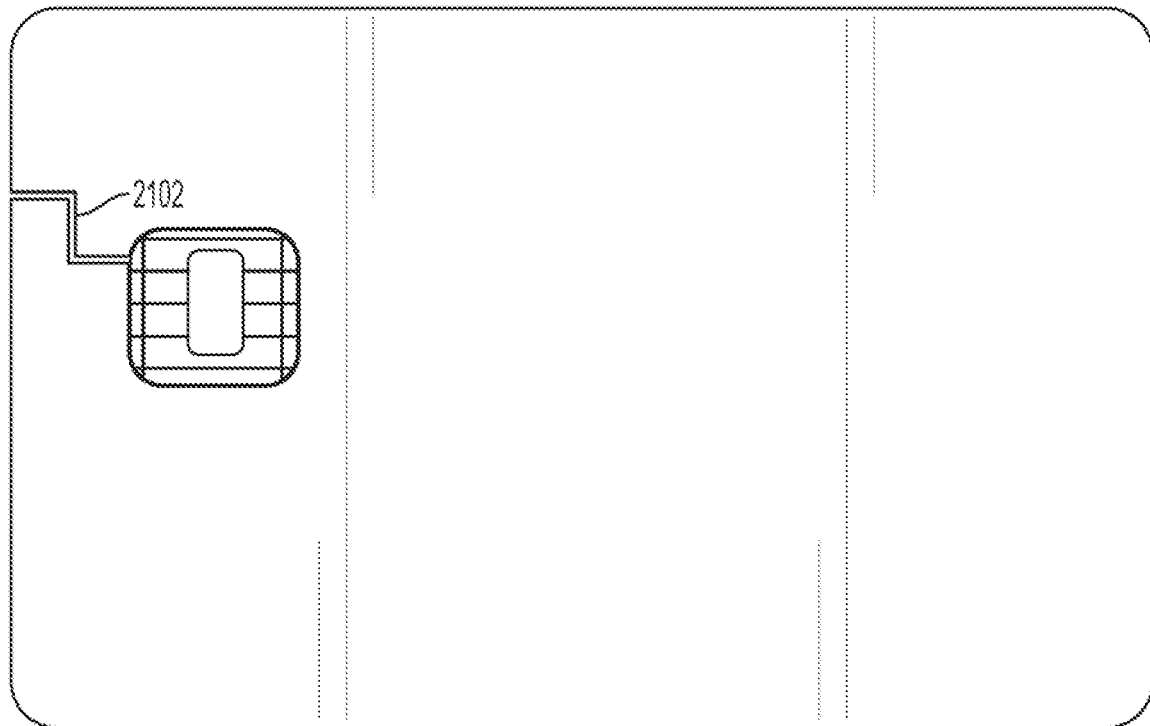
Figure 21D:
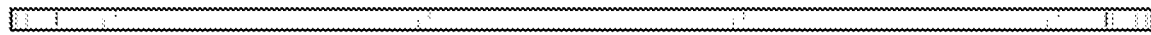
Figure 21E:
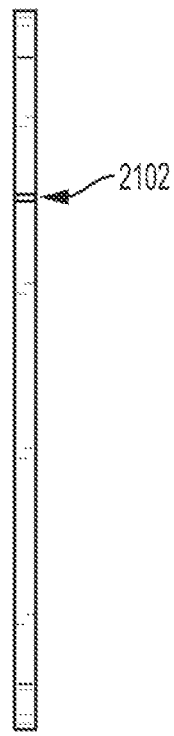
Figure 21F:
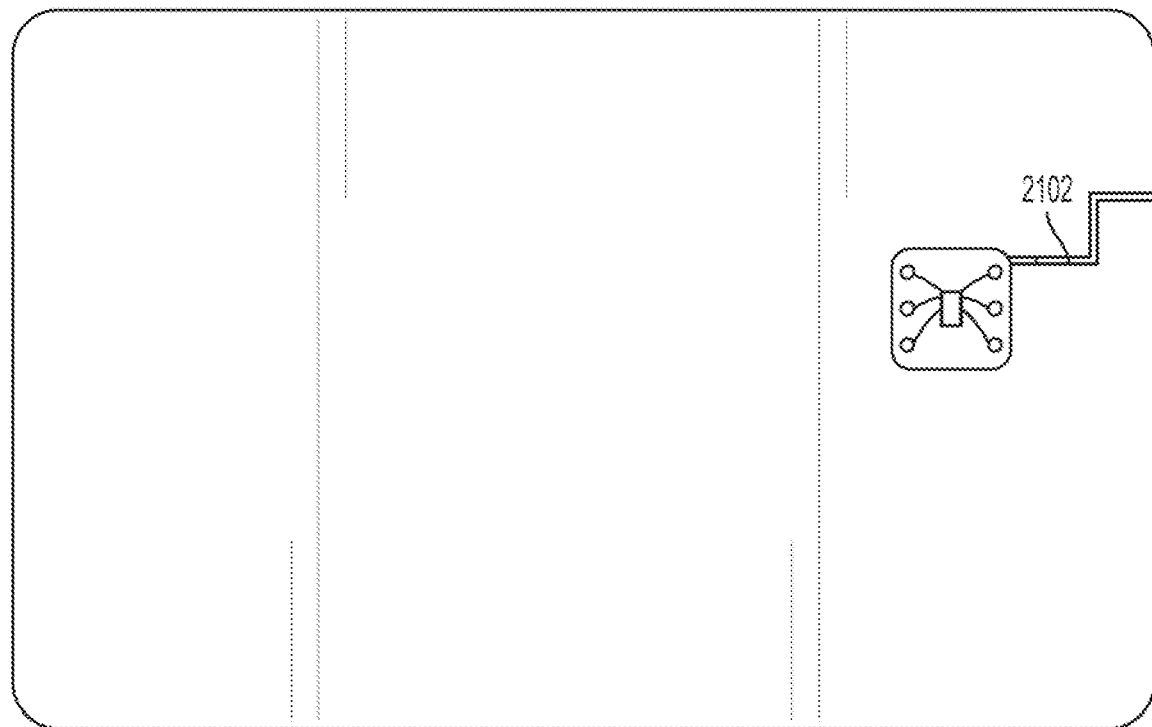
Figure 22A:
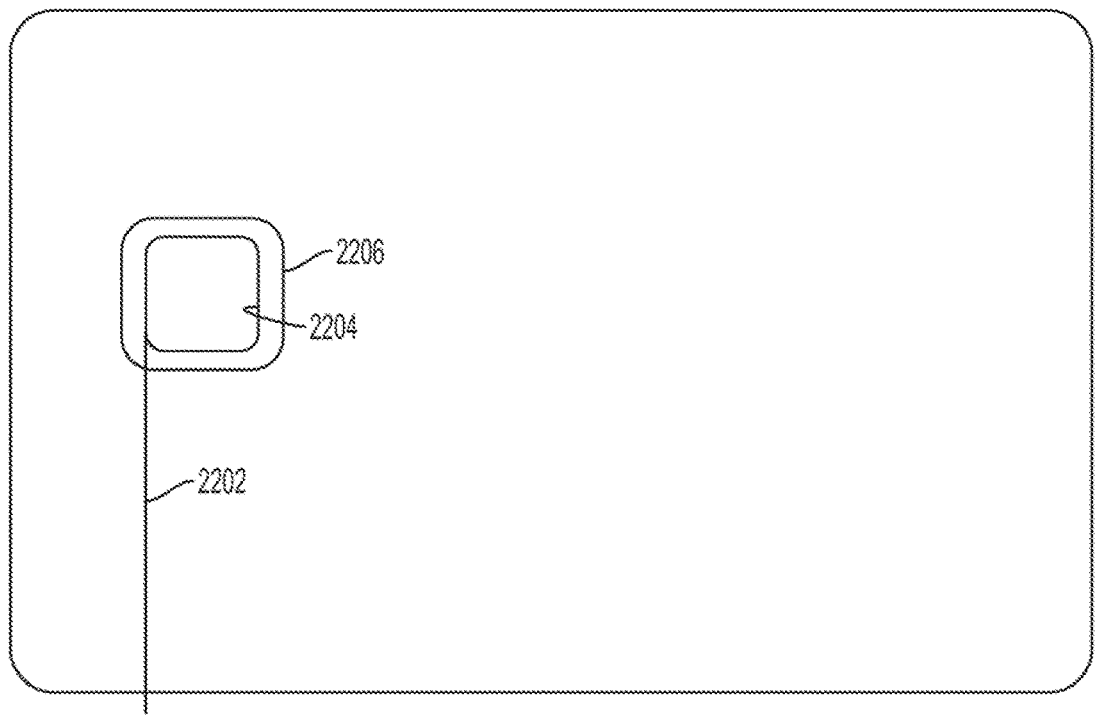
FIG. 22A is a schematic view illustration of a machine tool path for a discontinuity, which extends from the opening to a bottom side of the card, relative to boundaries of upper and lower portions of the transponder chip opening for another exemplary card embodiment.
Figure 22B:
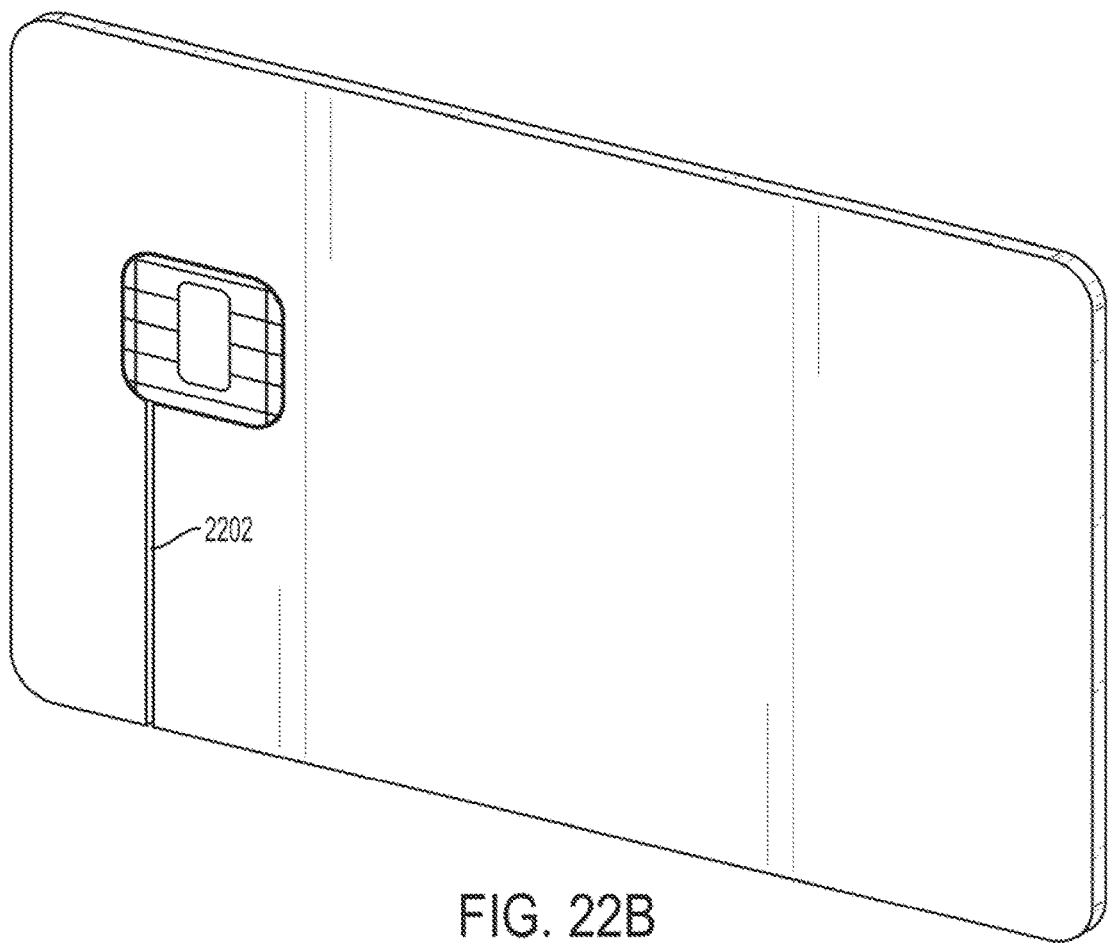
FIGS. 22B-22F are a perspective view (B) and plan view illustrations of the front surface (C), bottom side (D), left side (E), and back surface (F), respectively, of an exemplary card having the discontinuity depicted in FIG. 21A.
Figure 22C:
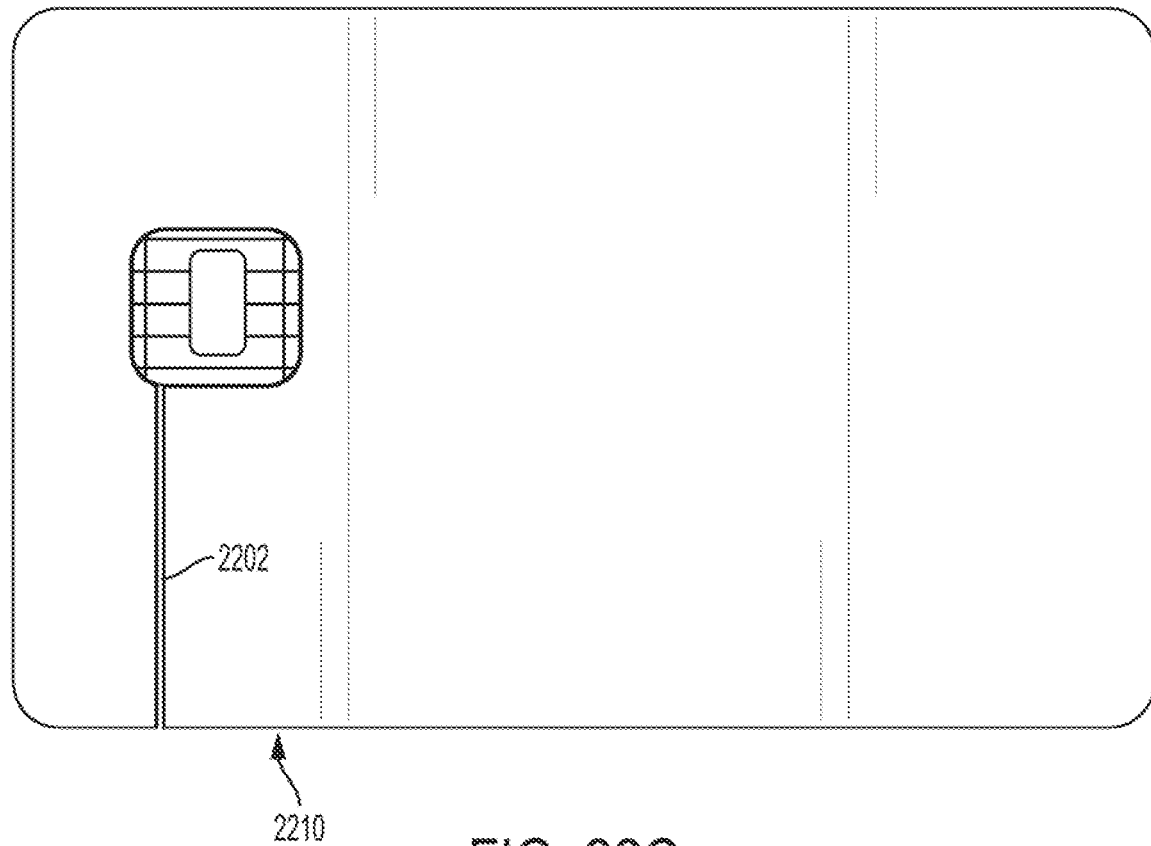
Figure 22D:
Figure 22E:
Figure 22F:
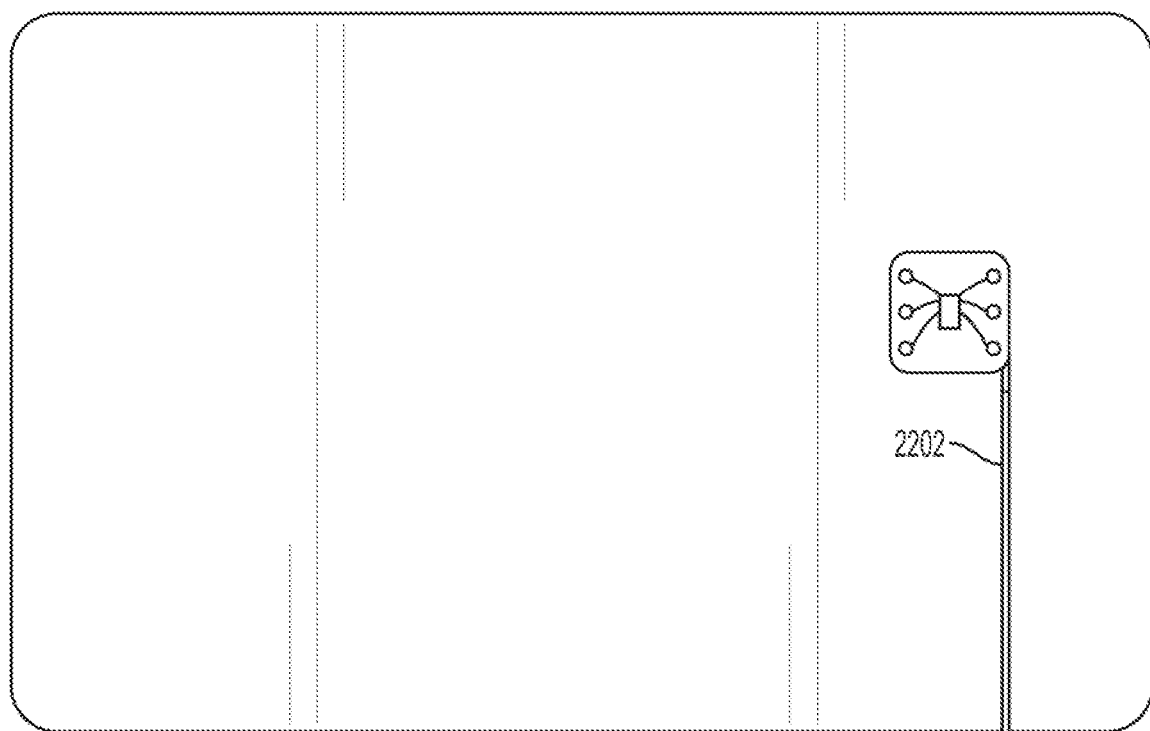
Figure 23A:
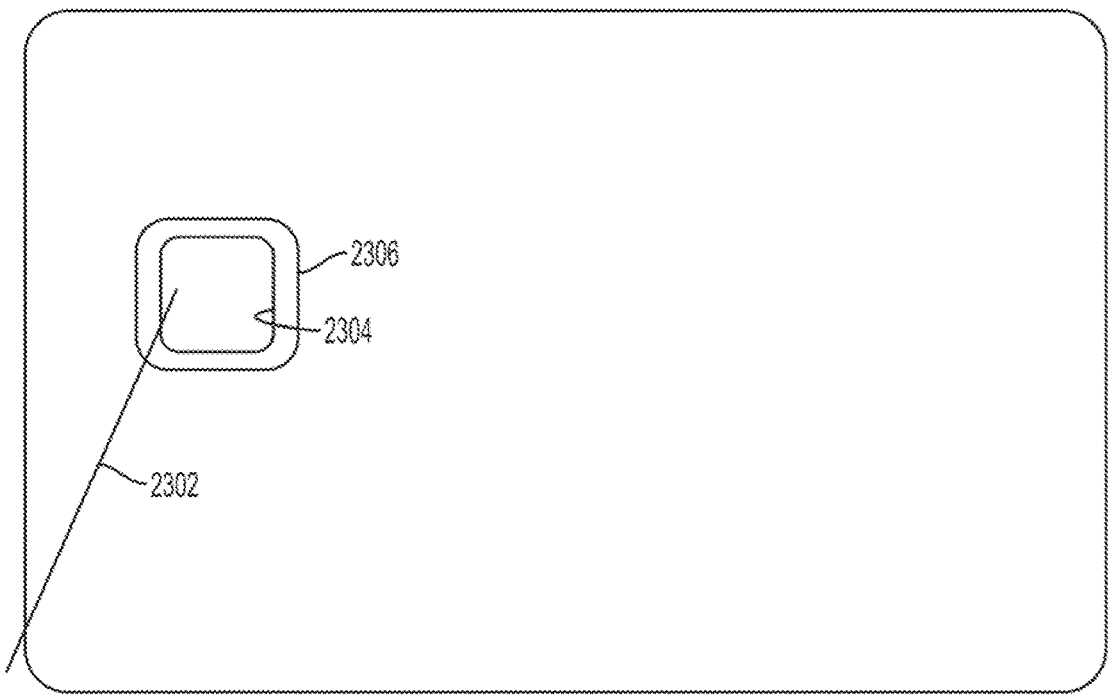
FIG. 23A is a schematic view illustration of a machine tool path for a discontinuity, which extends diagonally from the opening to near a bottom left corner of the card, relative to boundaries of upper and lower portions of the transponder chip opening for another exemplary card embodiment.
Figure 23B:
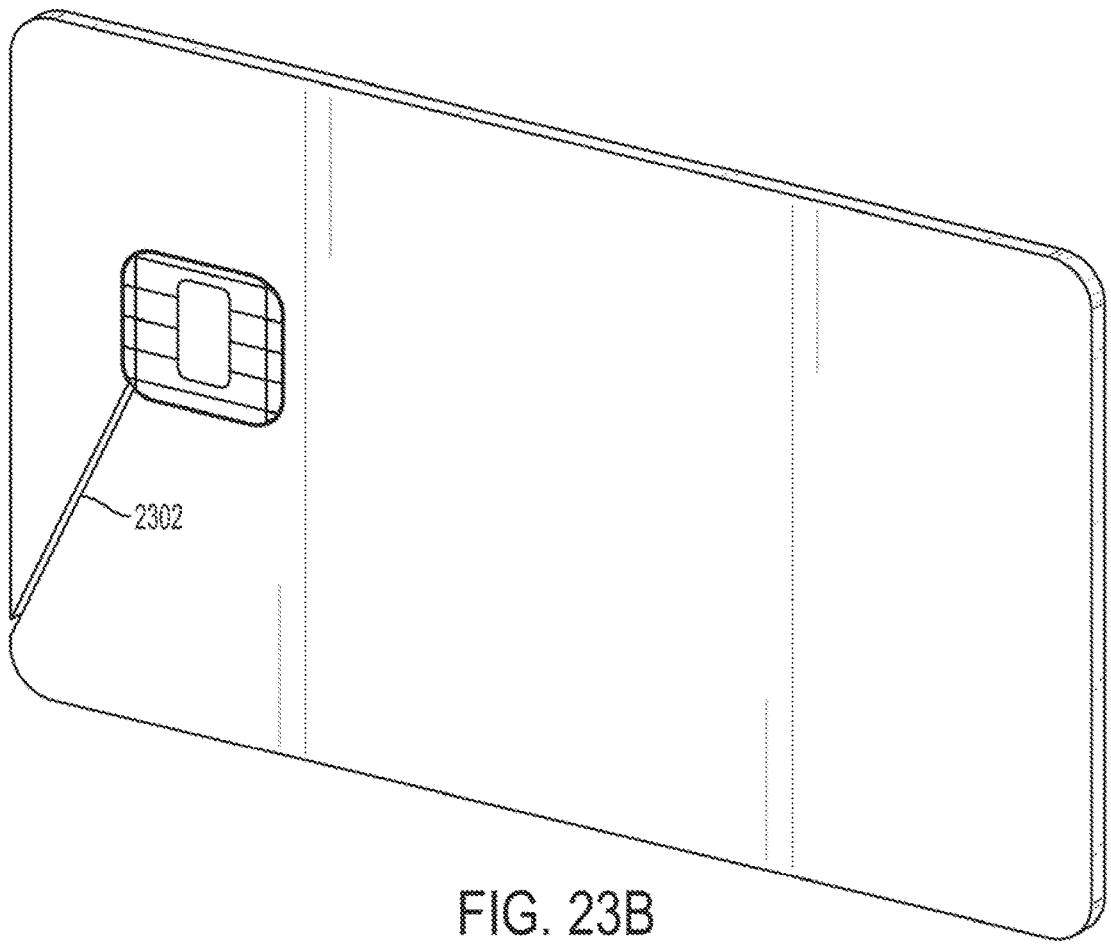
FIGS. 23B-23F are a perspective view (B) and plan view illustrations of the front surface (C), top side (D), left side (E), and back surface (F), respectively, of an exemplary card having the discontinuity depicted in FIG. 23A.
Figure 23C:
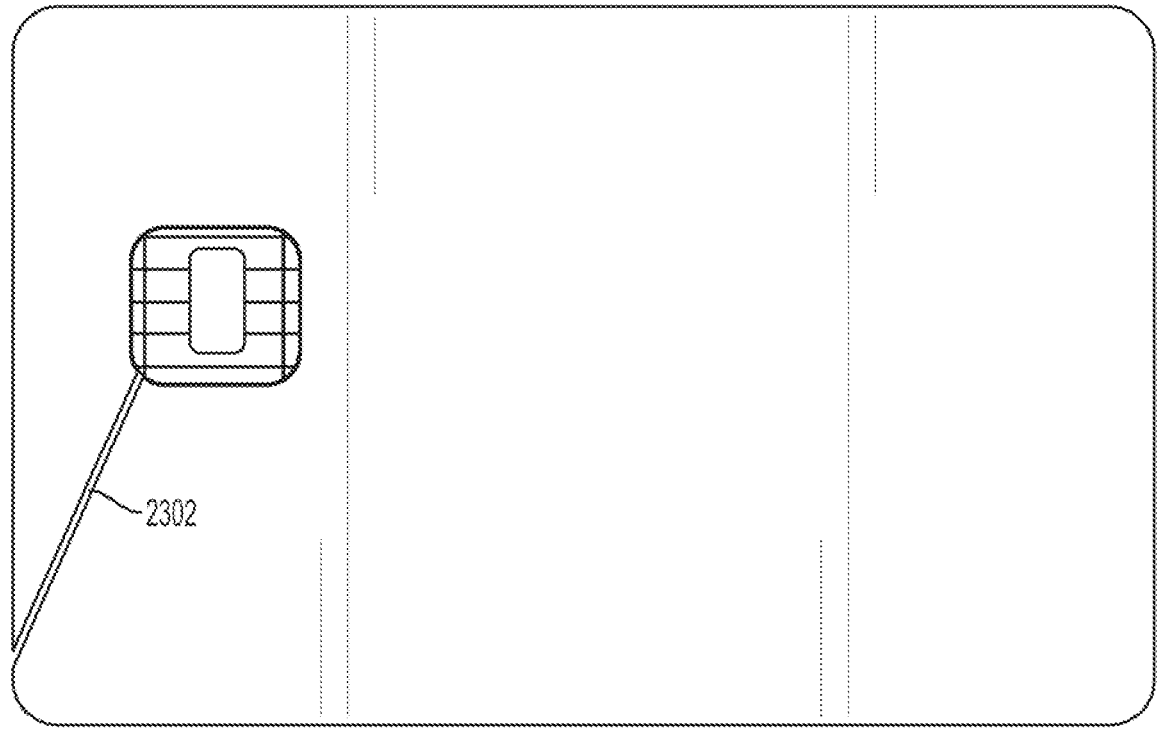
Figure 23D:
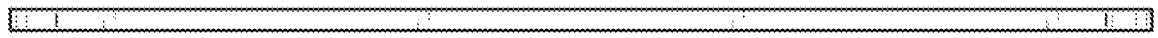
Figure 23E:
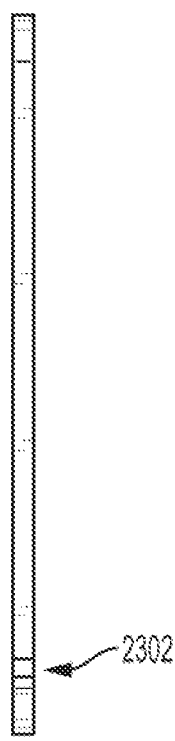
Figure 23F:
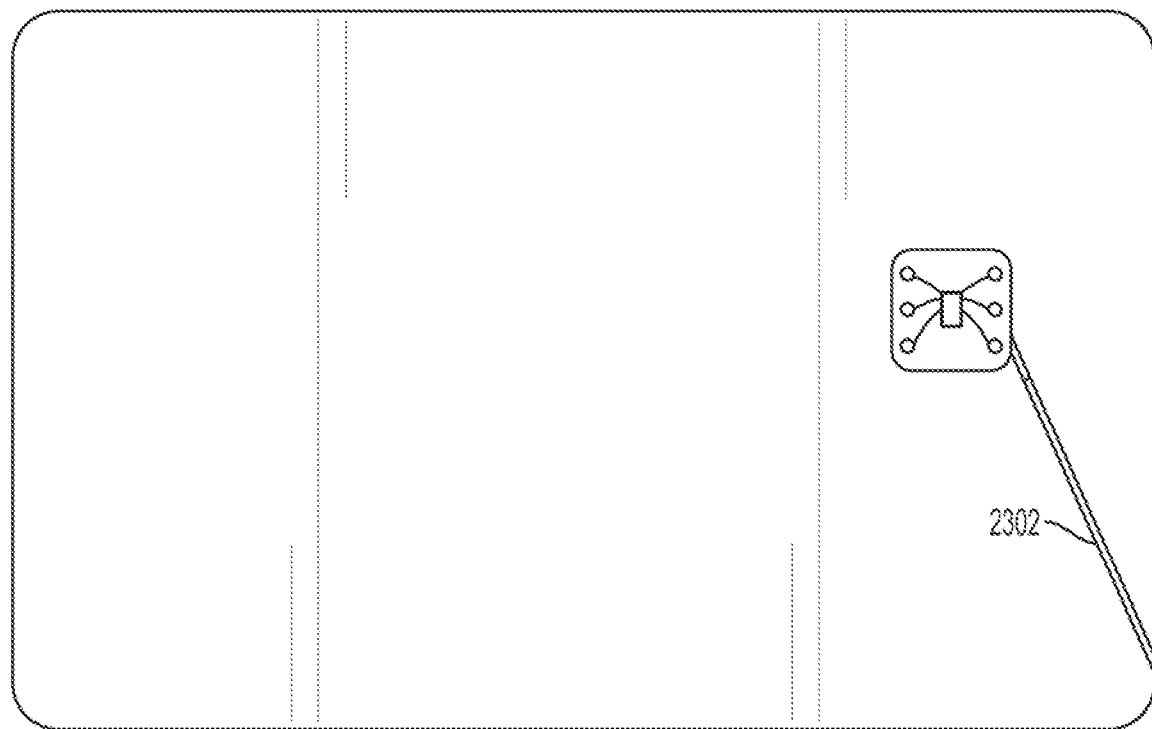
Figure 24A:
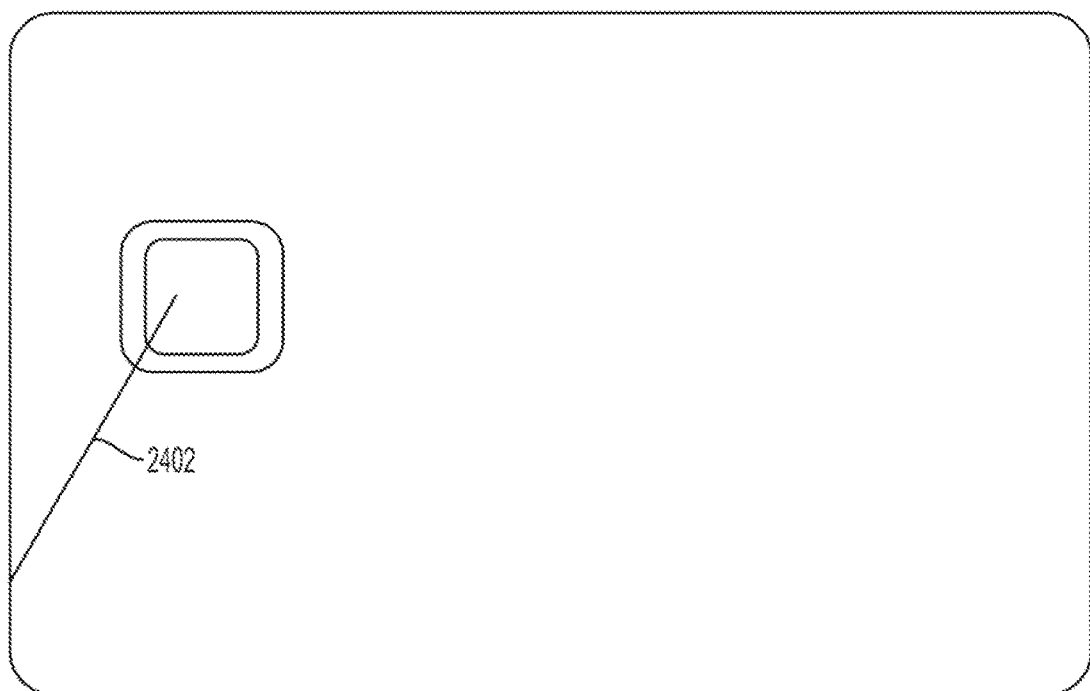
FIG. 24A is a schematic view illustration of a machine tool path for a discontinuity, which also extends diagonally from the opening to near a bottom lefthand corner of the card, relative to boundaries of upper and lower portions of the transponder chip opening for another exemplary card embodiment.
Figure 24B:
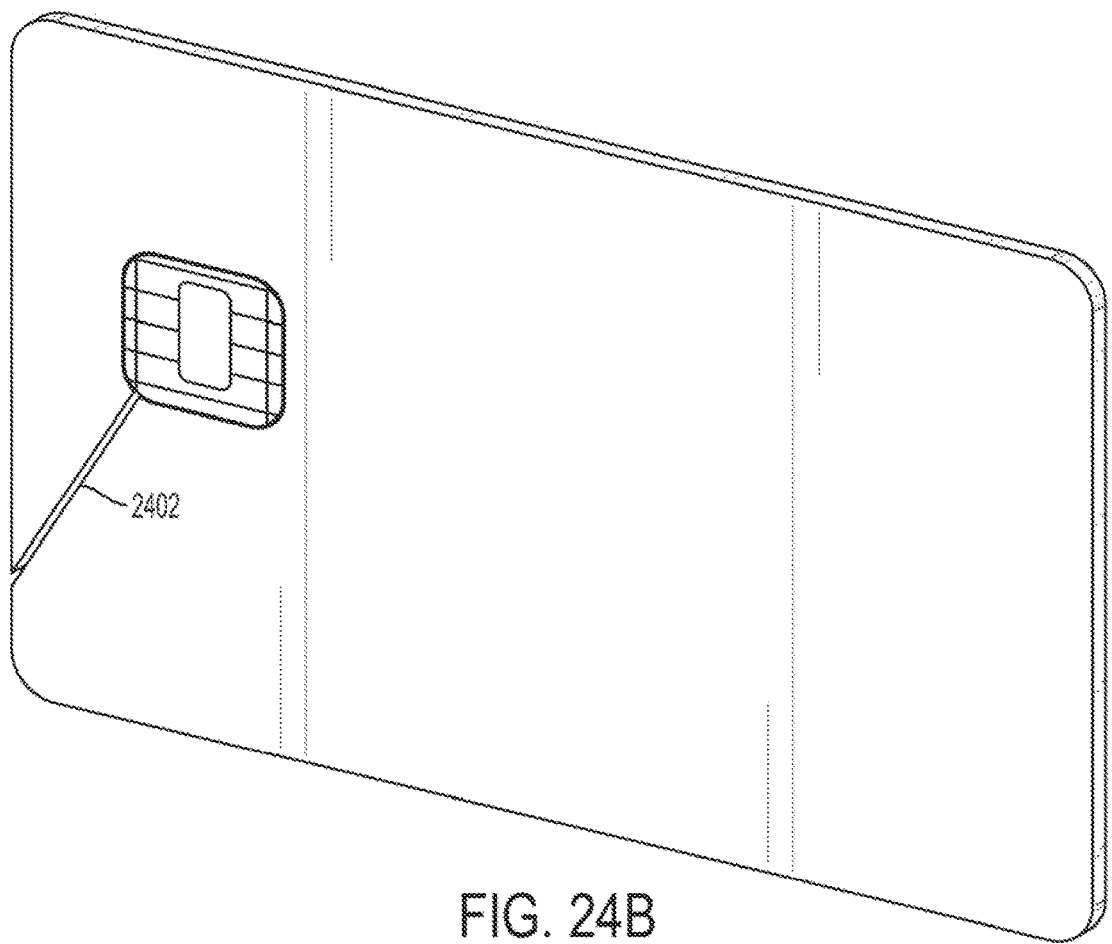
FIGS. 24B-24F are a perspective view (B) and plan view illustrations of the front surface (C), top side (D), left side (E), and back surface (F), respectively, of an exemplary card having the discontinuity depicted in FIG. 24A.
Figure 24C:
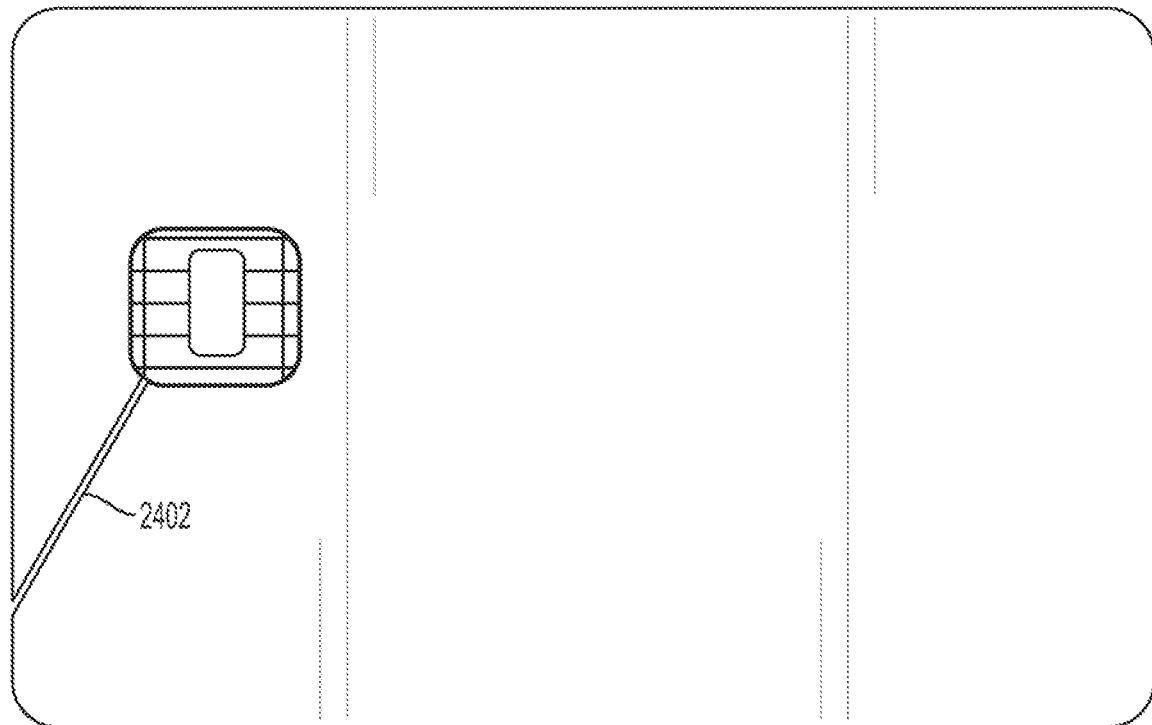
Figure 24D:
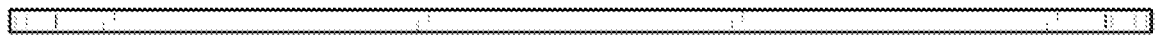
Figure 24E:
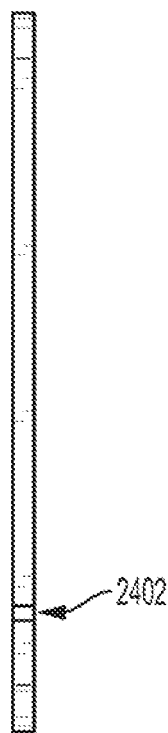
Figure 24F:
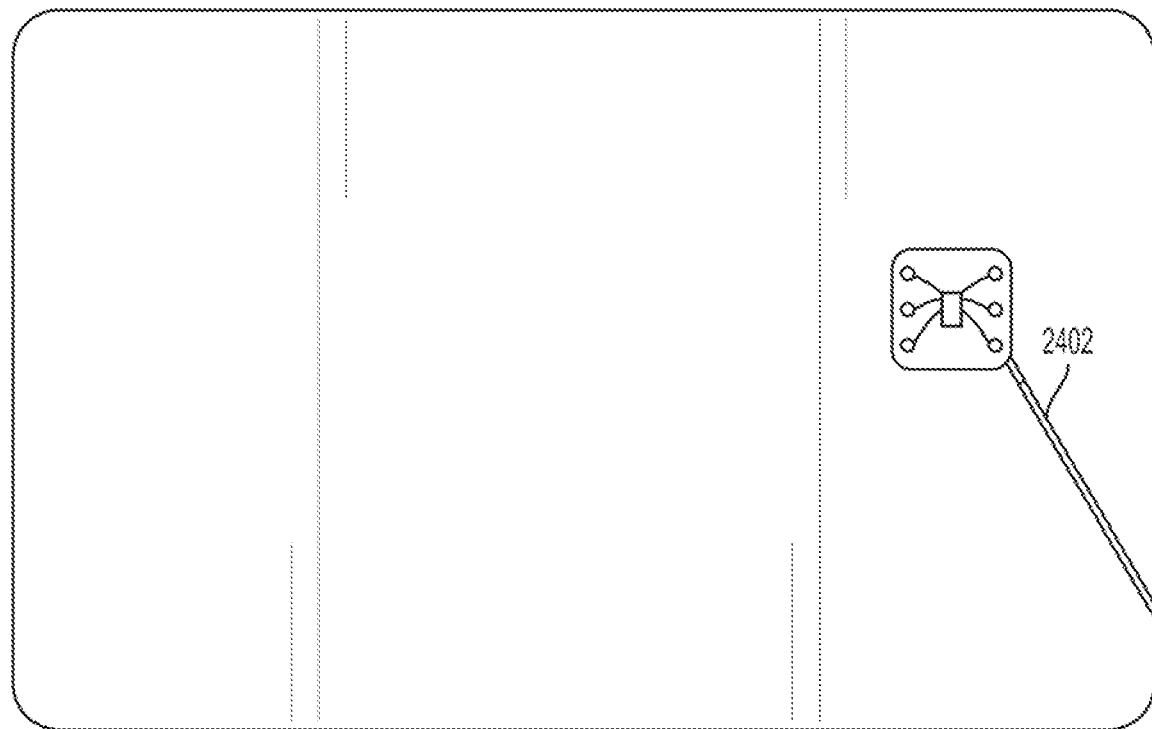
Figure 31A:
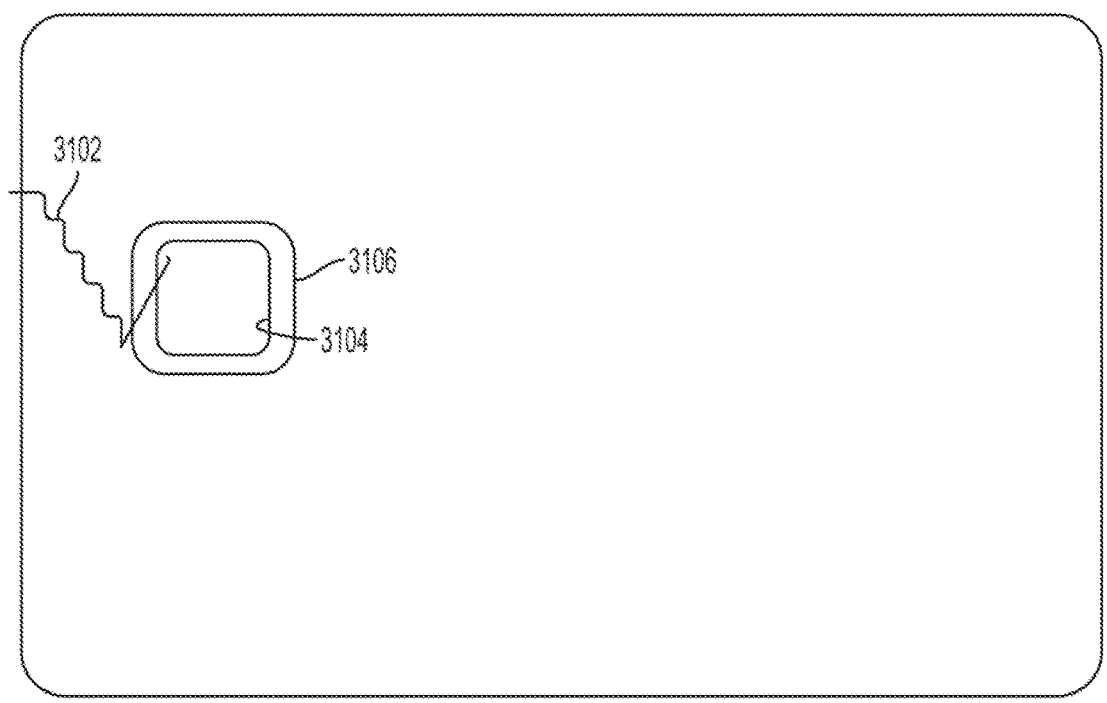
FIG. 31A is a schematic view illustration of a machine tool path for an exemplary discontinuity, having a curved, stairstep geometry, relative to boundaries of upper and lower portions of the transponder chip opening for another exemplary card embodiment.
Figure 31B:
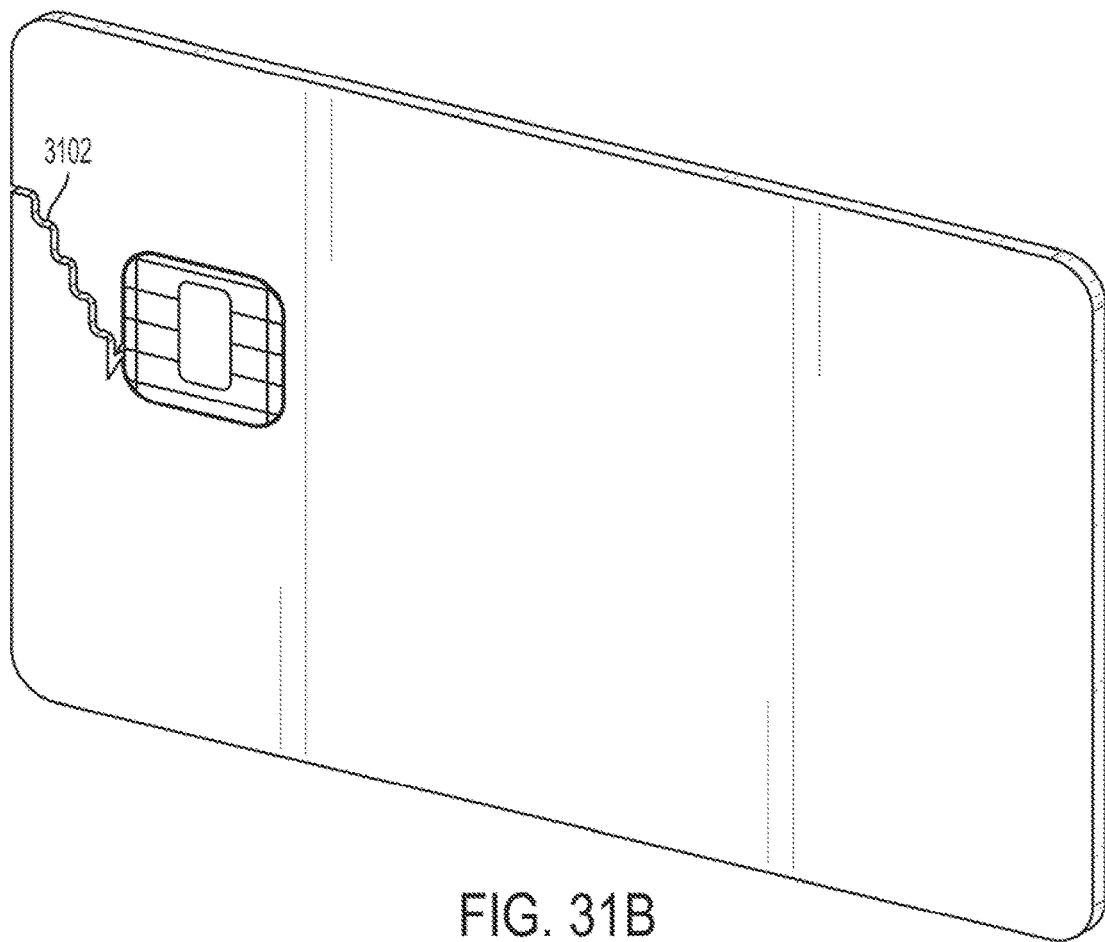
FIGS. 31B-31F are a perspective view (B) and plan view illustrations of the front surface (C), top side (D), left side (E), and back surface (F), respectively, of an exemplary card having the discontinuity depicted in FIG. 31A.
Figure 31C:
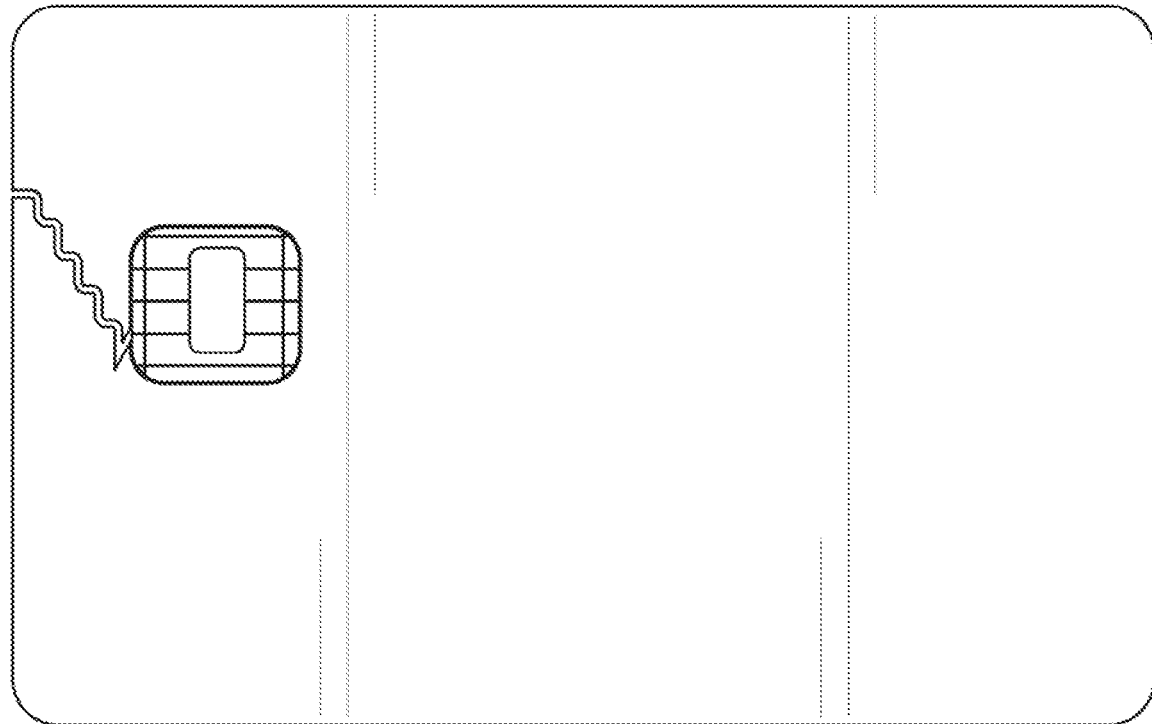
Figure 31D:
Figure 31E:
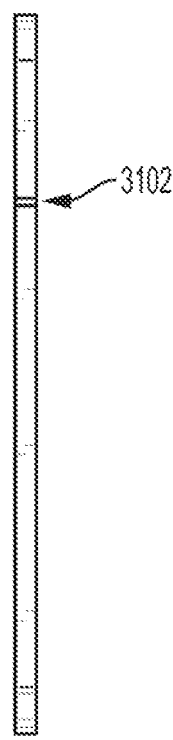
Figure 31F:
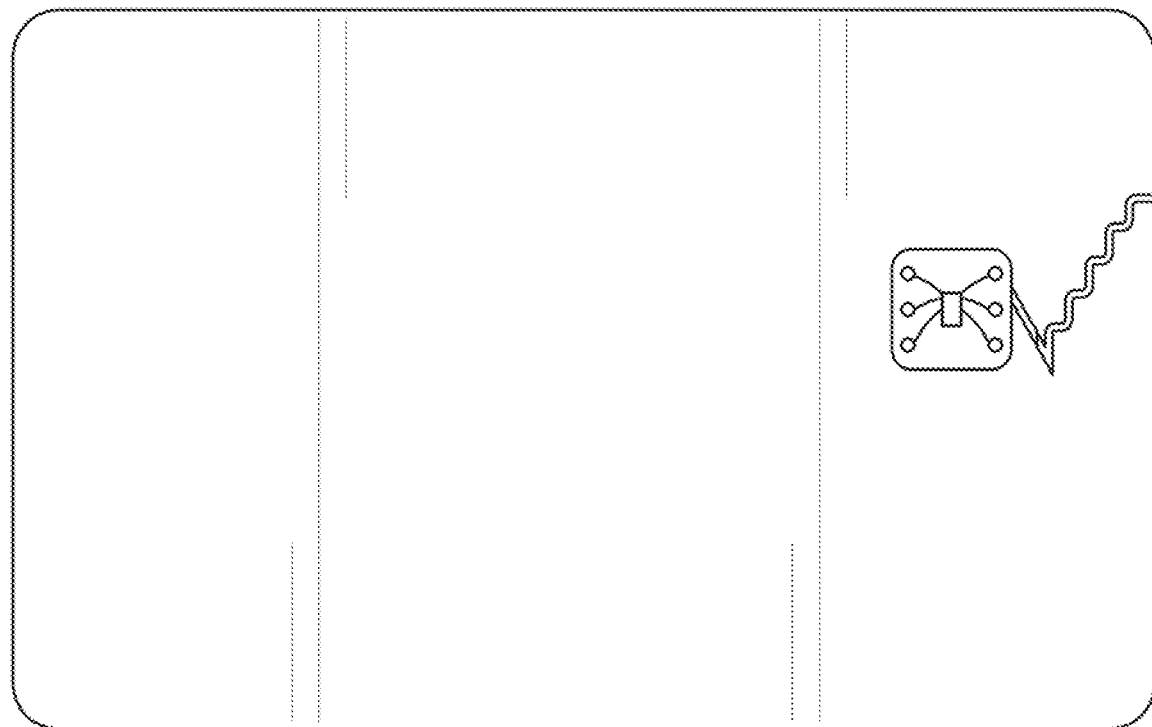

In certain embodiments, the discontinuity path comprises at least two changes in direction of 90 degrees or more. For example, FIGS. 9A, 19A, and 31A illustrate stairstep designs in which the discontinuity path makes multiple 90 degree changes in direction. In the embodiments depicted in FIGS. 9A, 19A, and 31A, the stairstep geometry has a rise (vertical distance covered between adjacent horizontal sections) and a run (horizontal distance covered between adjacent vertical sections), in which the rise is greater than the run. In other embodiments, not shown, the rise and run may be equal or the run may be greater than the rise. In the embodiments depicted, the rise and run are roughly equal for each step, but in other embodiments, the rise and run may be different in at least one step relative to others in the series of steps.

Figure 11A:
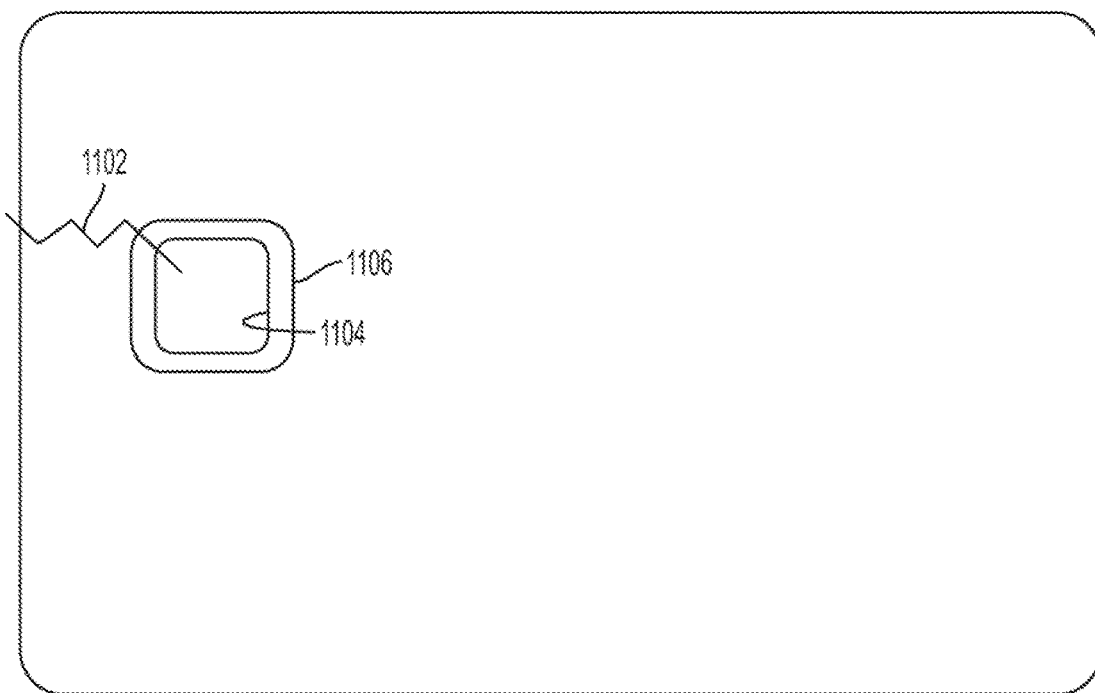
FIG. 11A is a schematic view illustration of a machine tool path for a discontinuity having a sawtooth geometry relative to boundaries of upper and lower portions of the transponder chip opening for another exemplary card embodiment.
Figure 11B:
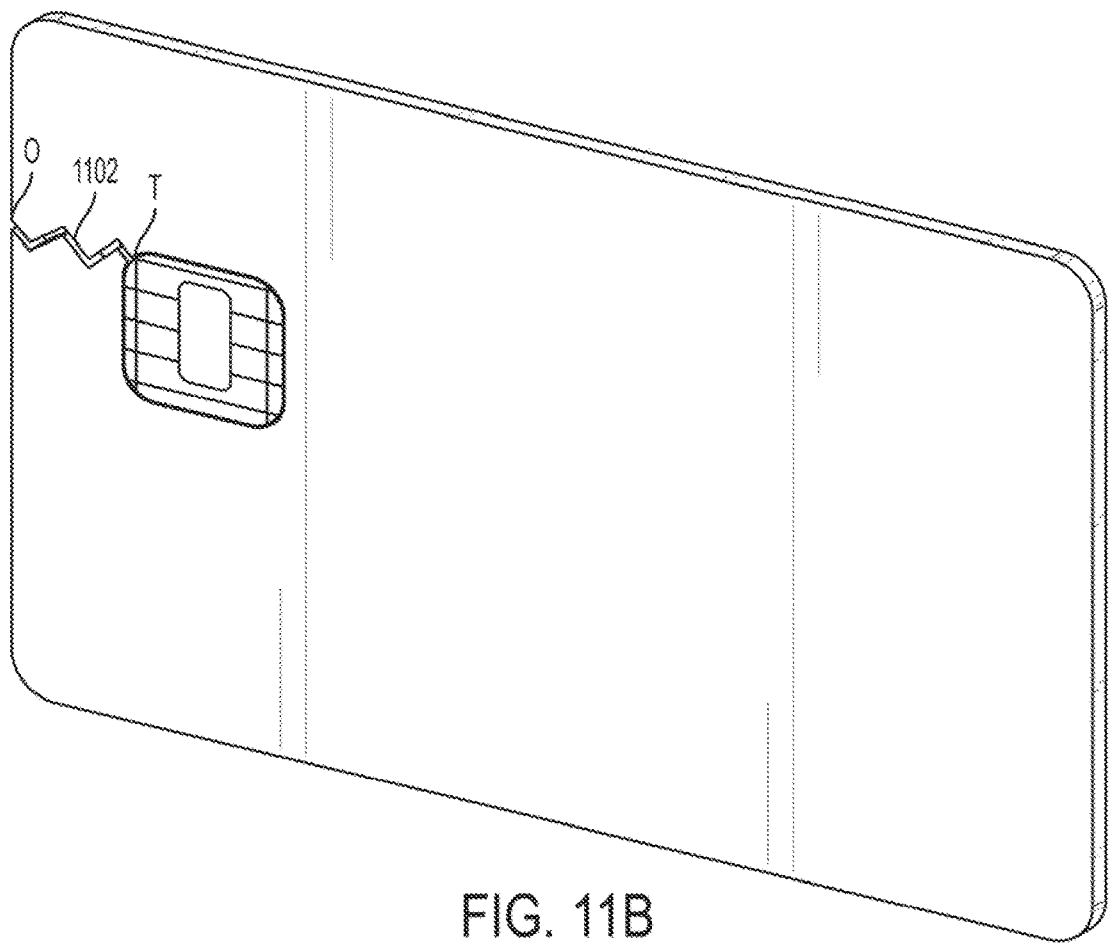
FIGS. 11B-11F are perspective and plan view illustrations of the front surface, top side, left side, back surface, respectively, of an exemplary card having the discontinuity depicted in FIG. 11A.
Figure 11C:
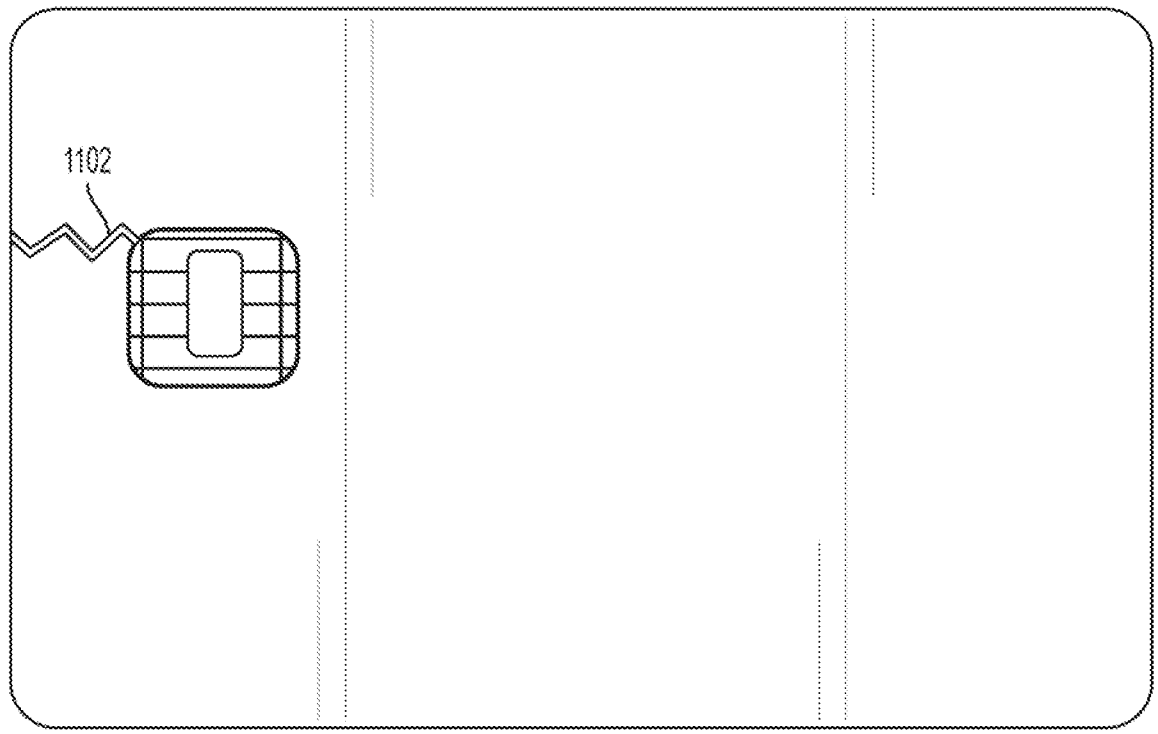
Figure 11D:
Figure 11E:
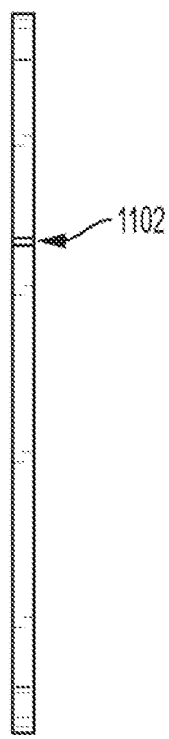
Figure 11F:
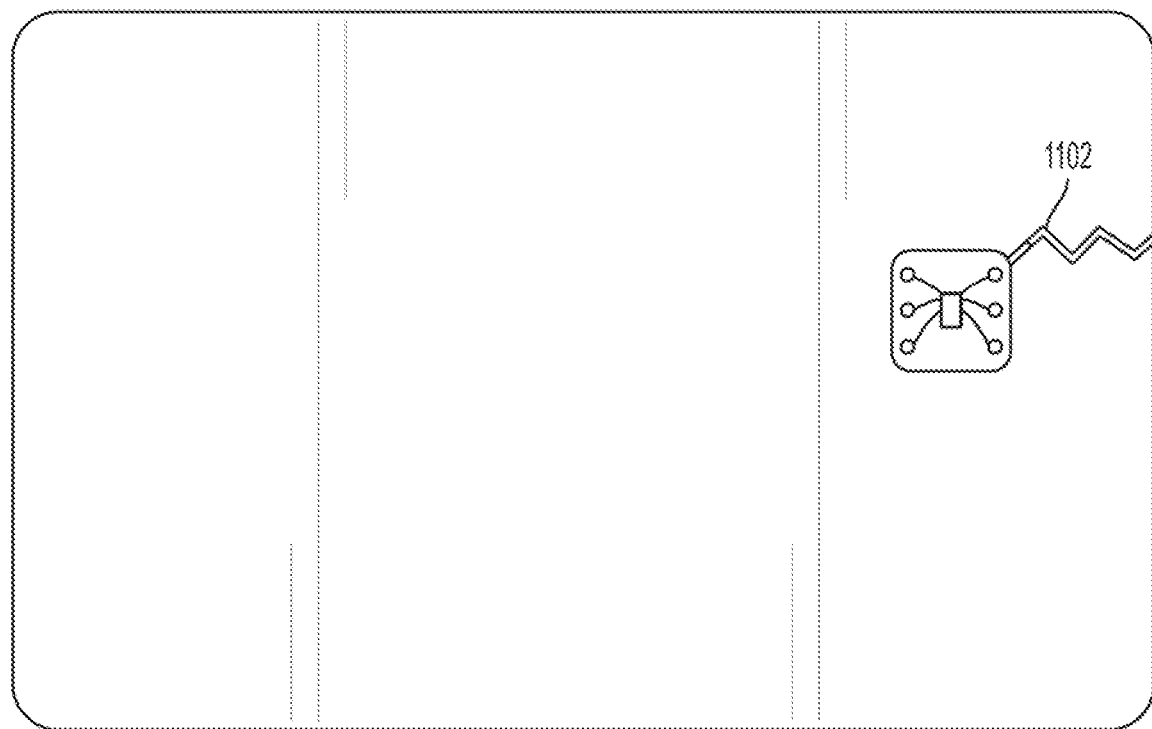
Figure 12A:
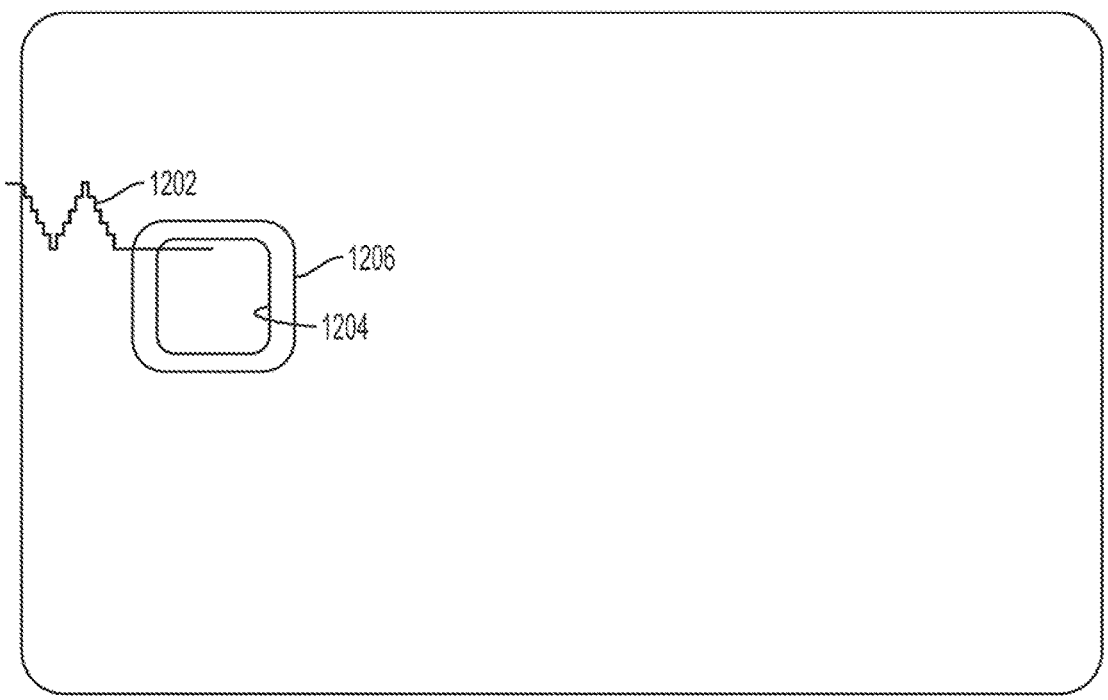
FIG. 12A is a schematic view illustration of a machine tool path for a discontinuity having a micro stairstep and macro sawtooth geometry relative to boundaries of upper and lower portions of the transponder chip opening for another exemplary card embodiment.
Figure 12B:
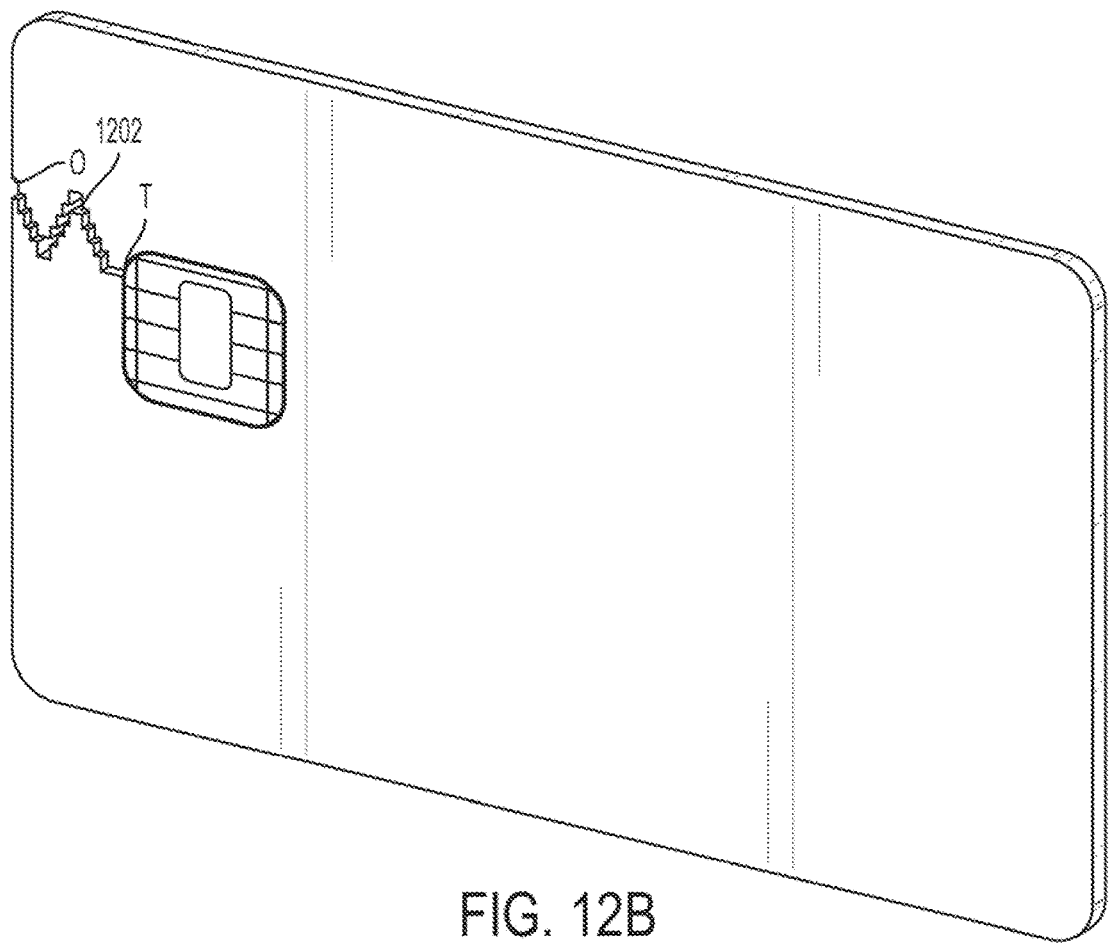
FIGS. 12B-12F are a perspective view (B) and plan view illustrations of the front surface (C), top side (D), left side (E), and back surface (F), respectively, of an exemplary card having the discontinuity depicted in FIG. 12A.
Figure 12C:
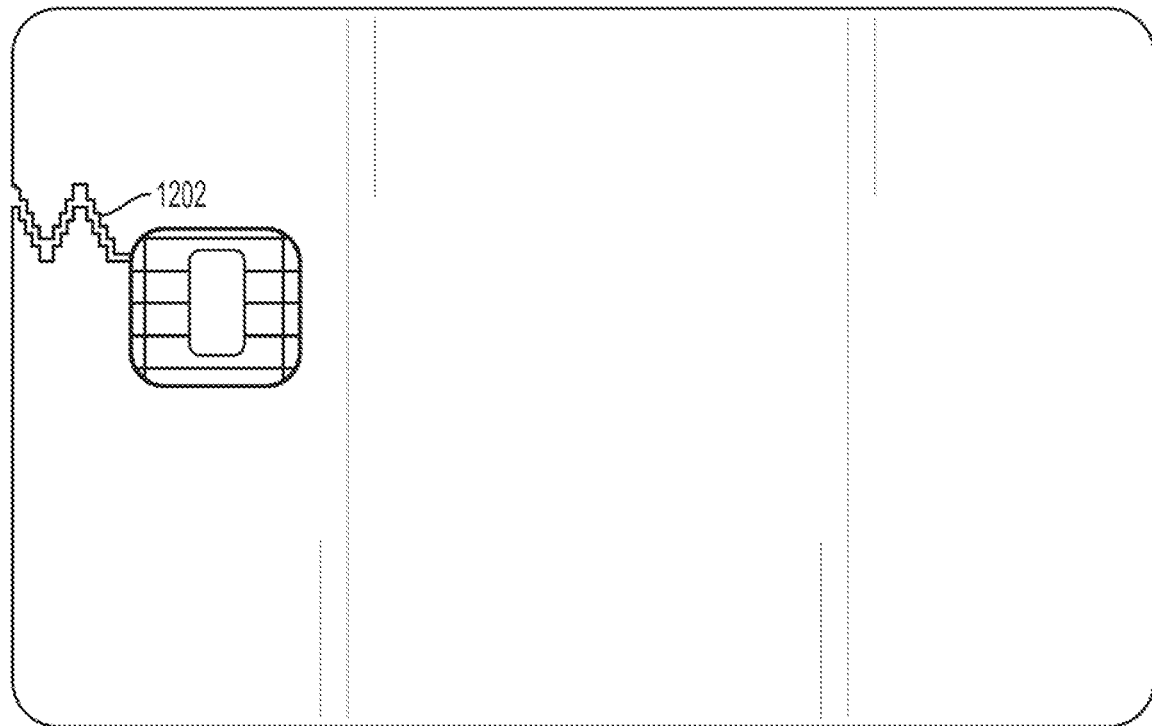
Figure 12D:
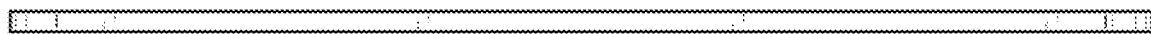
Figure 12E:
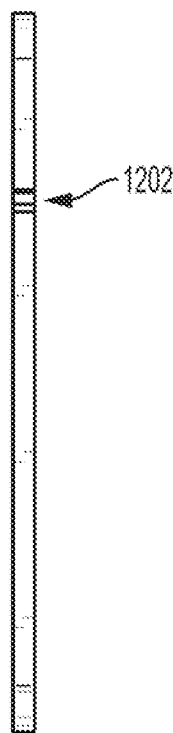
Figure 12F:
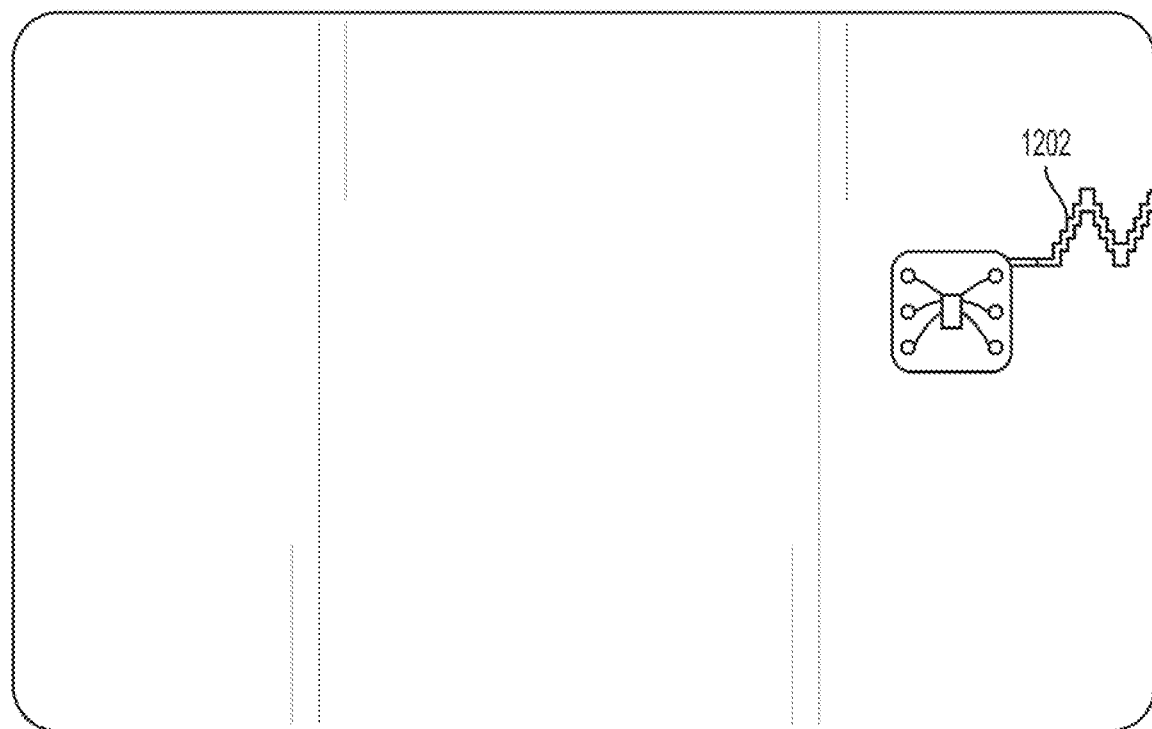
Figure 13A:
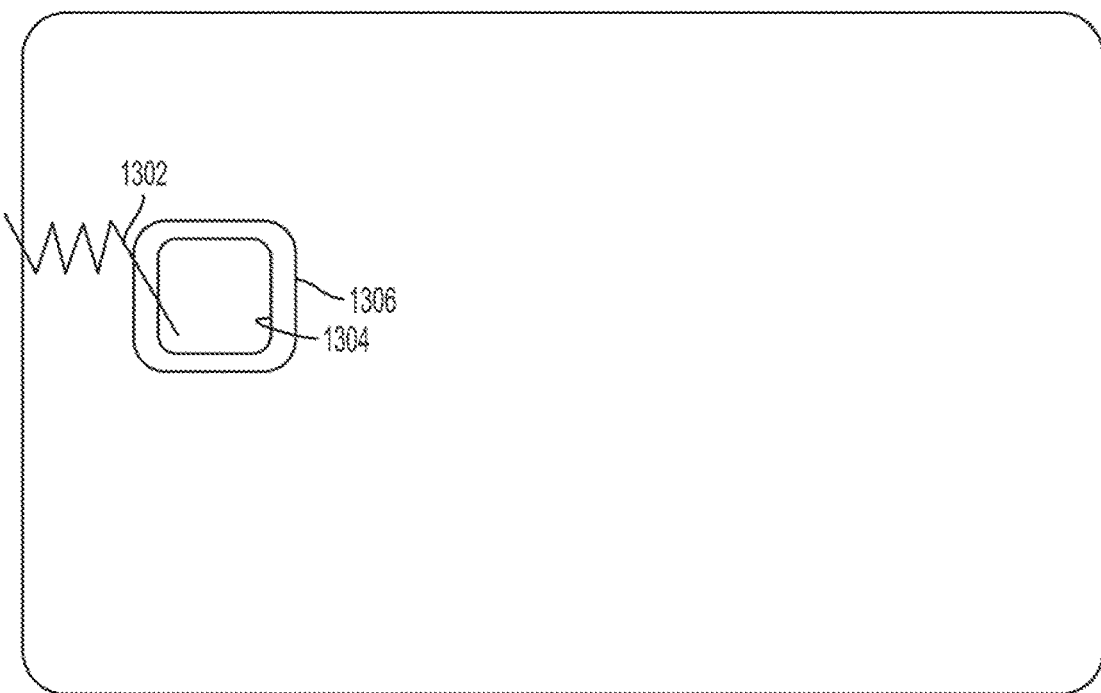
FIG. 13A is a schematic view illustration of a machine tool path for a discontinuity having a sawtooth geometry relative to boundaries of upper and lower portions of the transponder chip opening for another exemplary card embodiment.
Figure 13B:
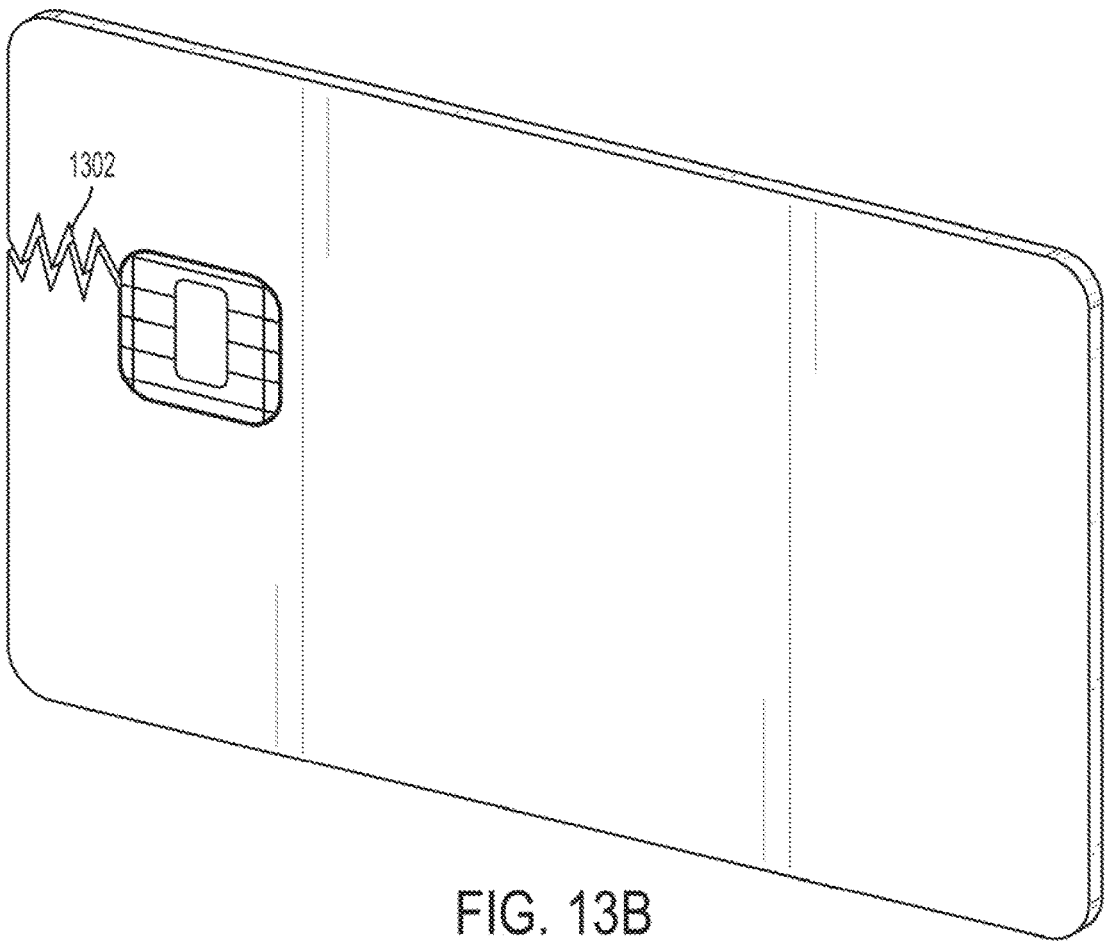
FIGS. 13B-13F are a perspective view (B) and plan view illustrations of the front surface (C), top side (D), left side (E), and back surface (F), respectively, of an exemplary card having the discontinuity depicted in FIG. 13A.
Figure 13C:
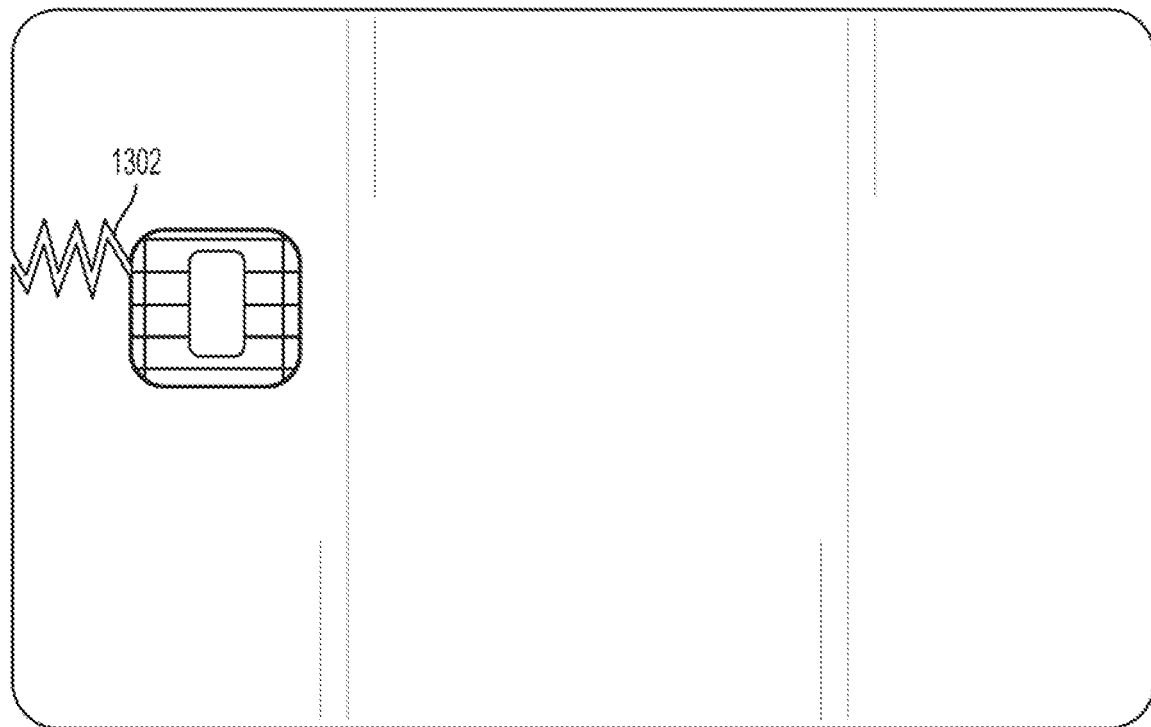
Figure 13D:
Figure 13E:
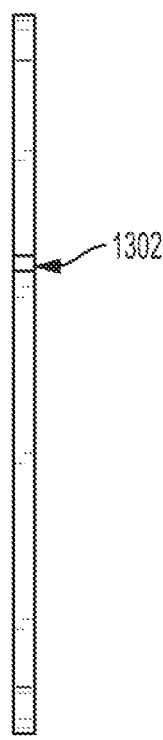
Figure 13F:
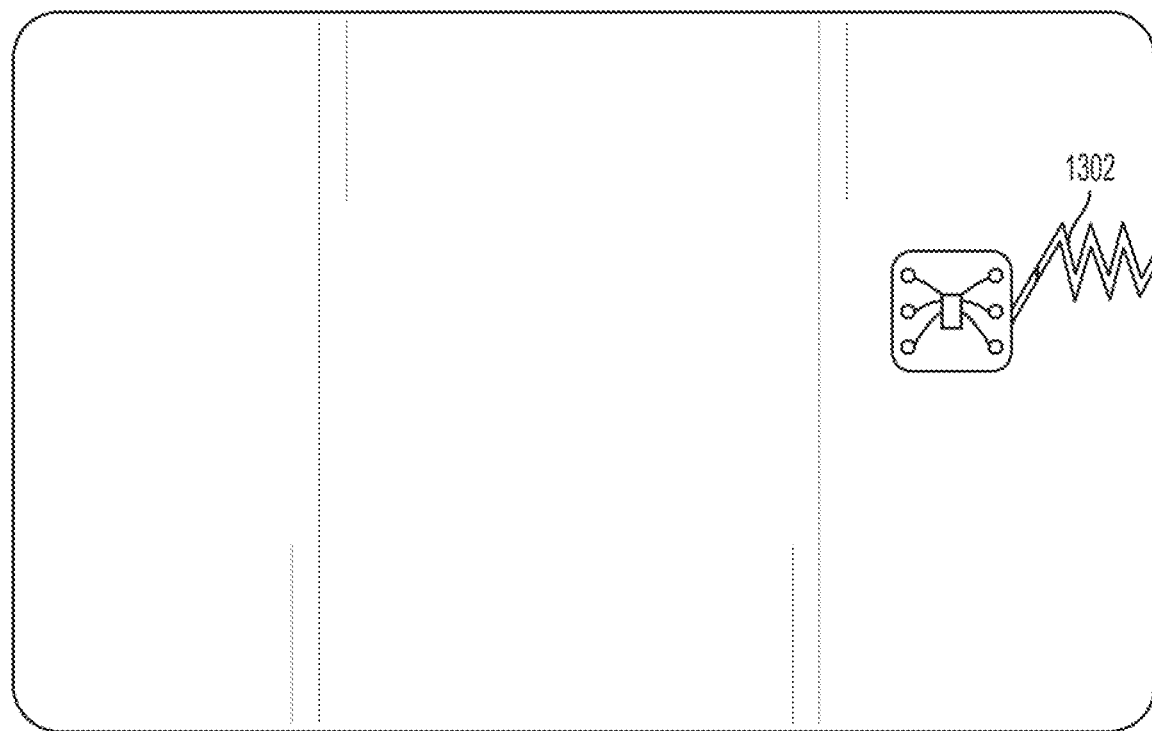
Figure 14A:
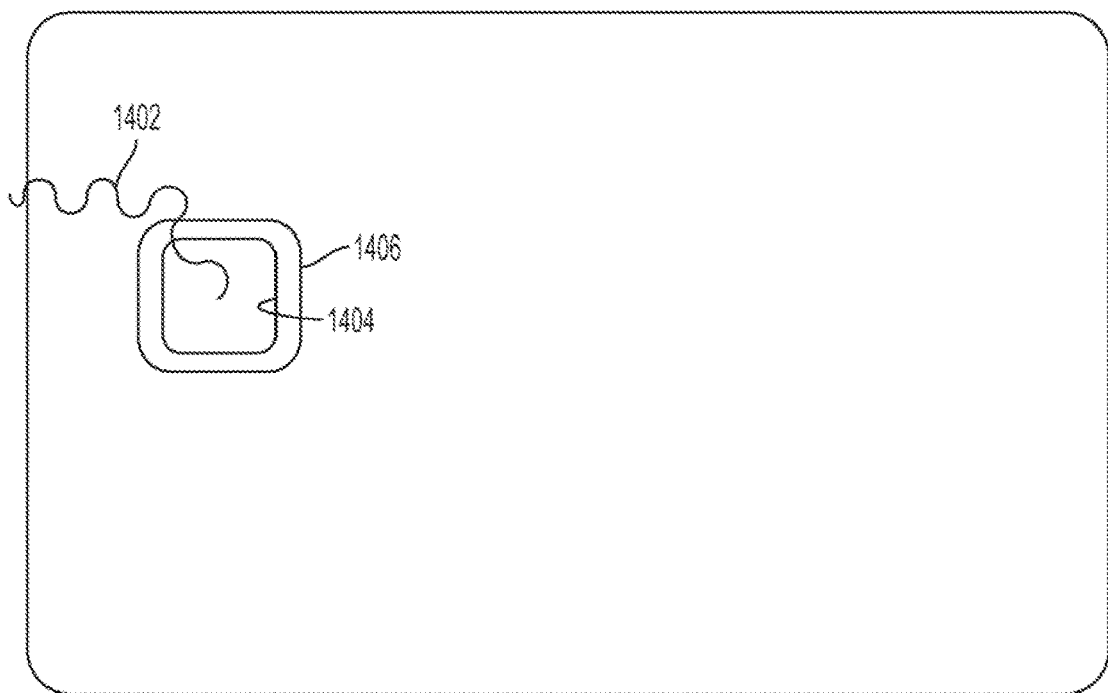
FIG. 14A is a schematic view illustration of a machine tool path for a discontinuity having a curved sinusoidal geometry relative to boundaries of upper and lower portions of the transponder chip opening for another exemplary card embodiment.
Figure 14B:
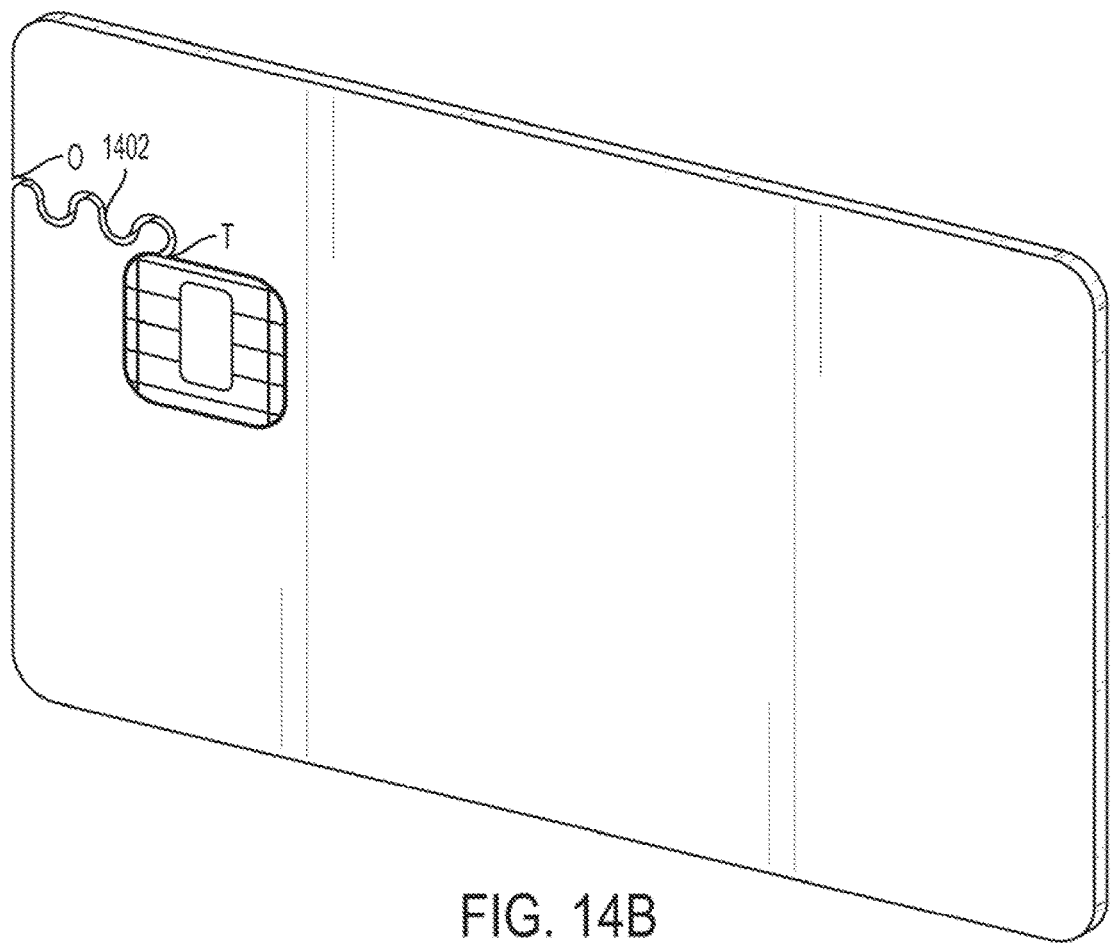
FIGS. 14B-14F are a perspective view (B) and plan view illustrations of the front surface (C), top side (D), left side (E), and back surface (F), respectively, of an exemplary card having the discontinuity depicted in FIG. 14A.
Figure 14C:
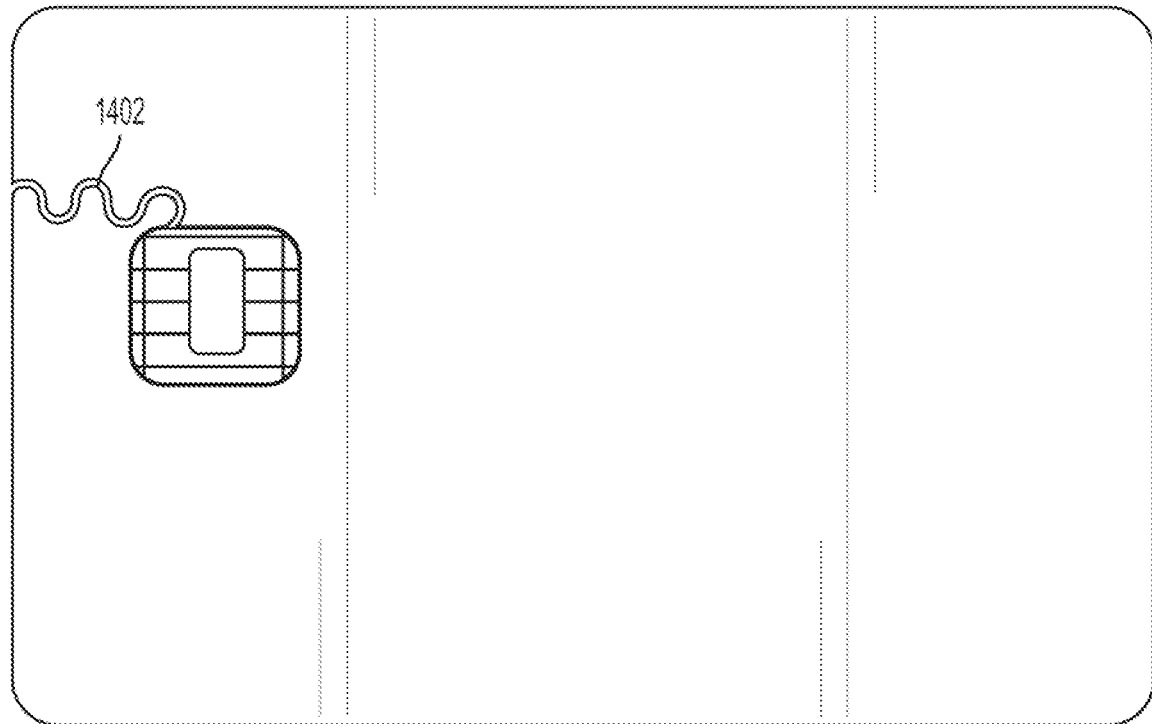
Figure 14D:
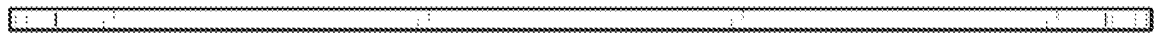
Figure 14E:
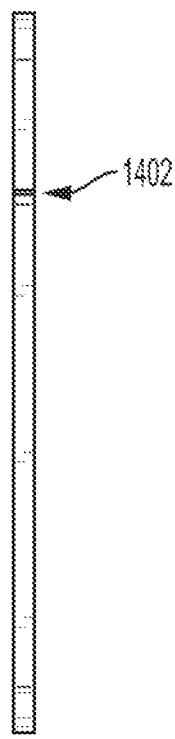
Figure 14F:
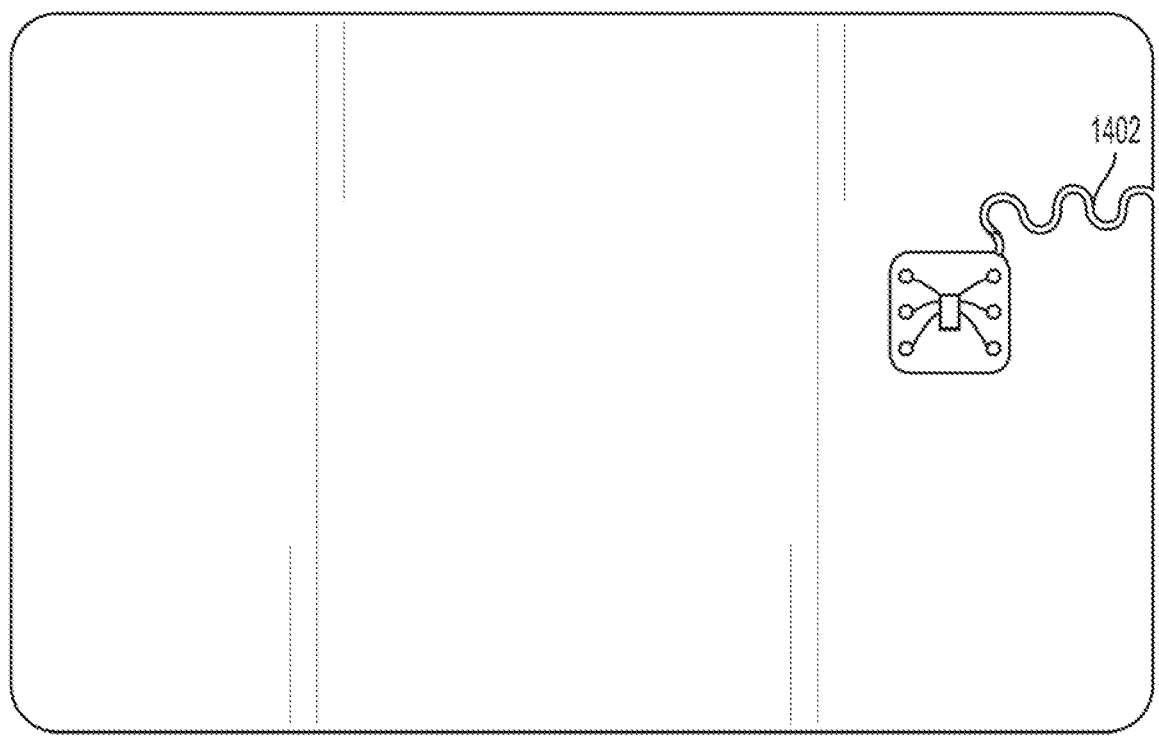
Figure 15A:
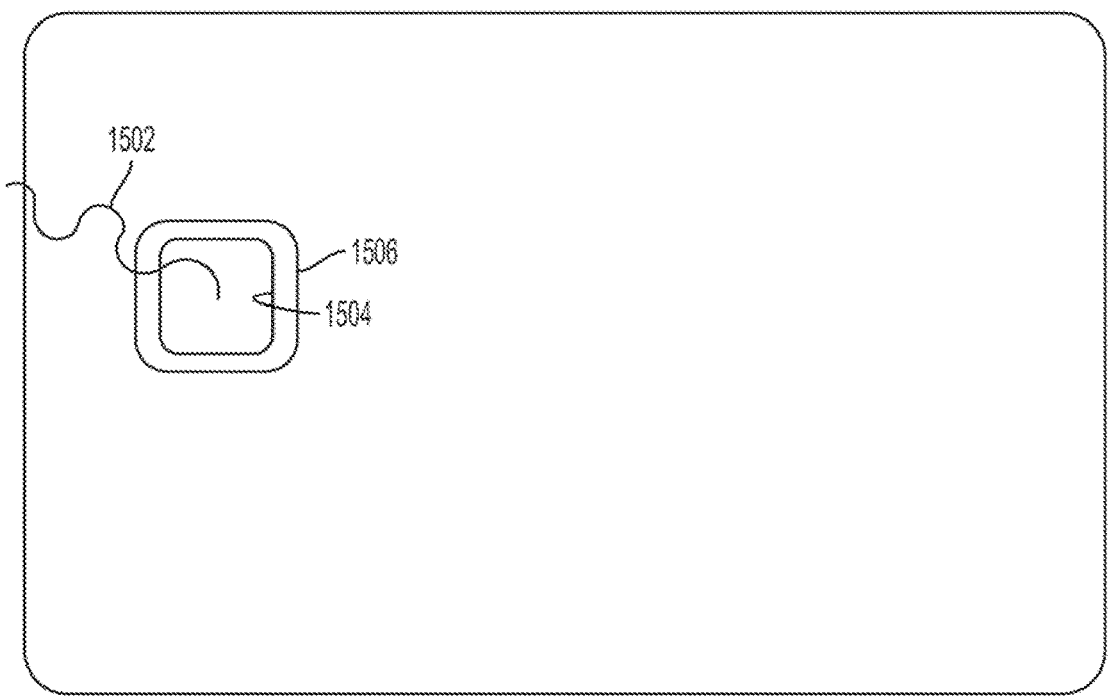
FIG. 15A is a schematic view illustration of a machine tool path for a discontinuity having a curved sinusoidal geometry relative to boundaries of upper and lower portions of the transponder chip opening for another exemplary card embodiment.
Figure 15B:
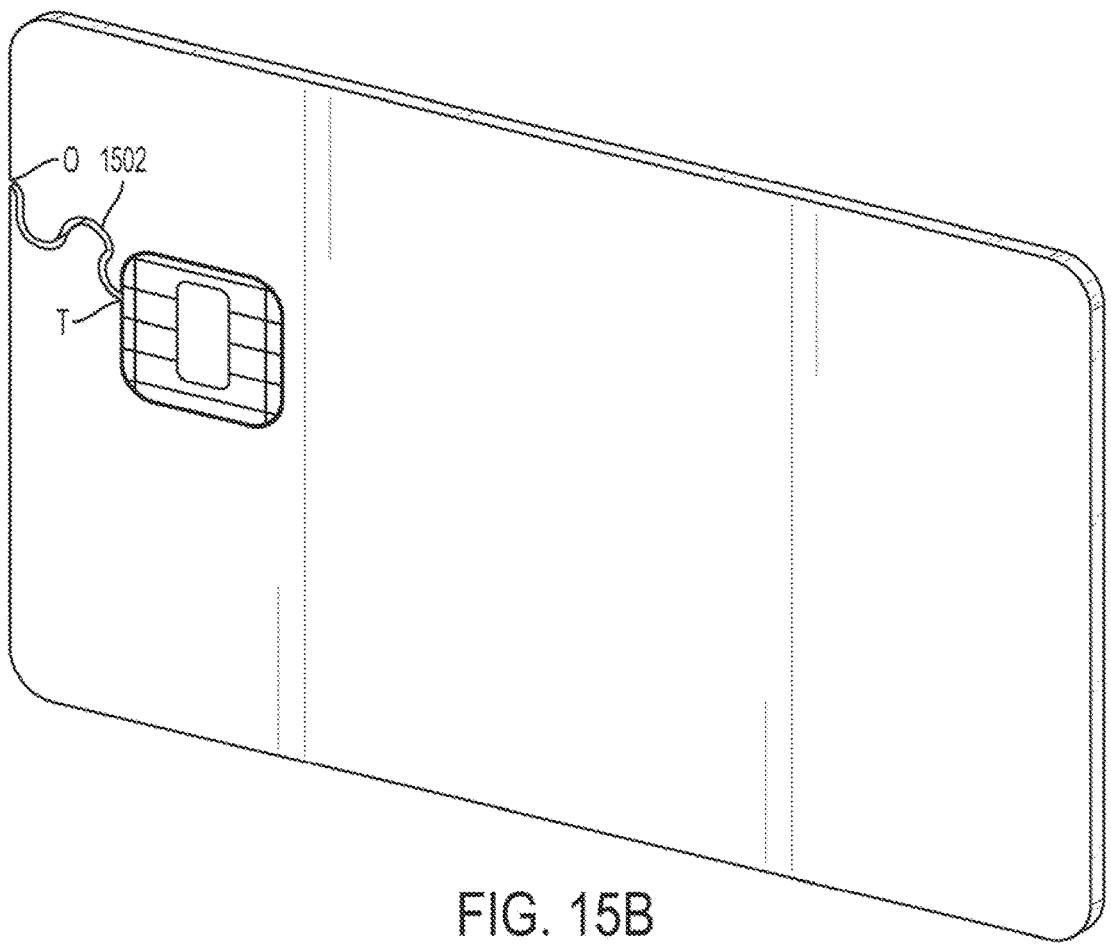
FIGS. 15B-15F are a perspective view (B) and plan view illustrations of the front surface (C), top side (D), left side (E), and back surface (F), respectively, of an exemplary card having the discontinuity depicted in FIG. 15A.
Figure 15C:
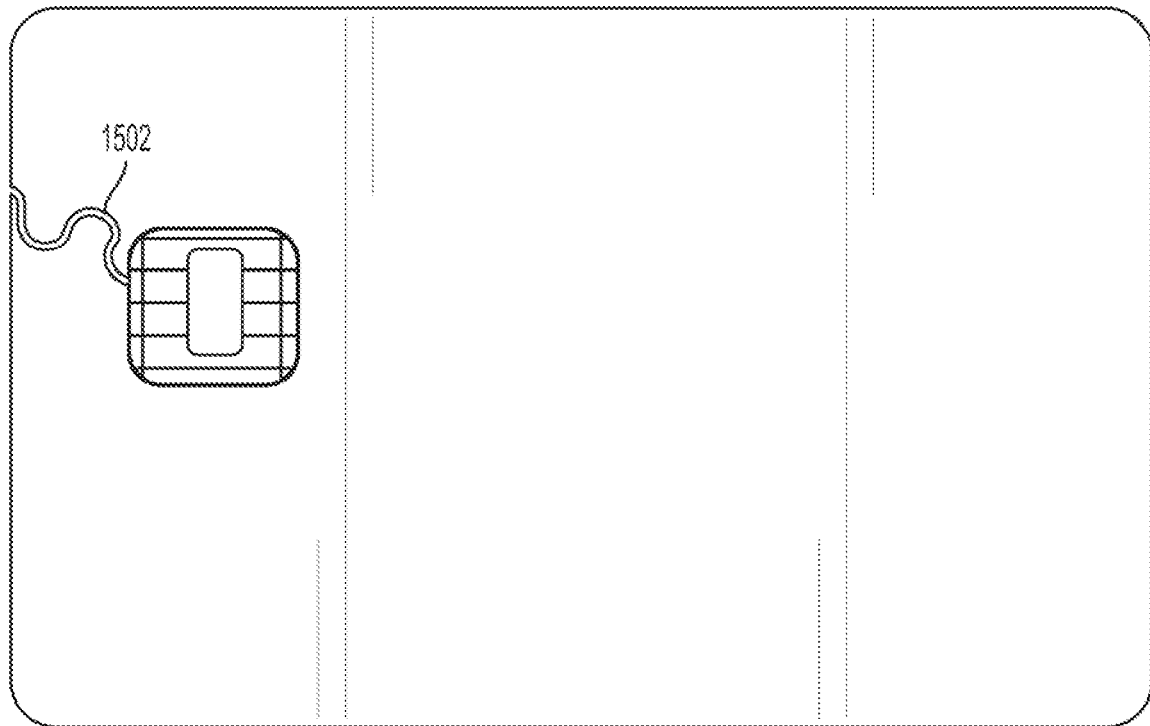
Figure 15D:
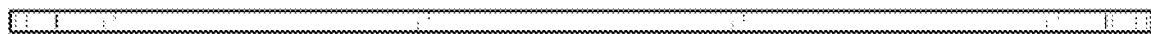
Figure 15E:
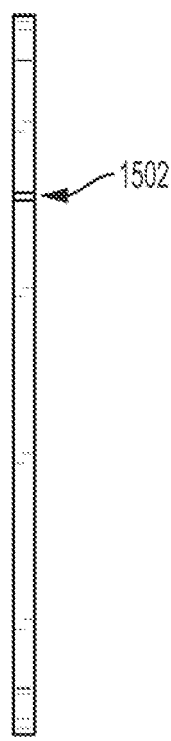
Figure 15F:
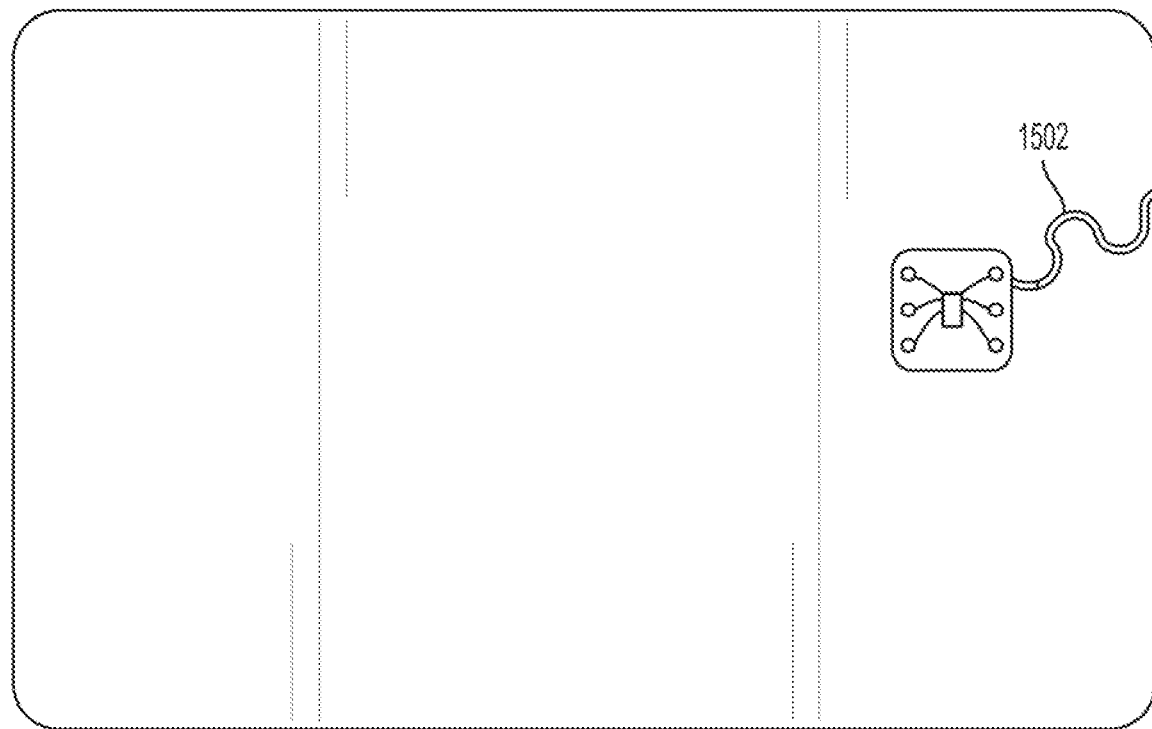
Figure 16A:
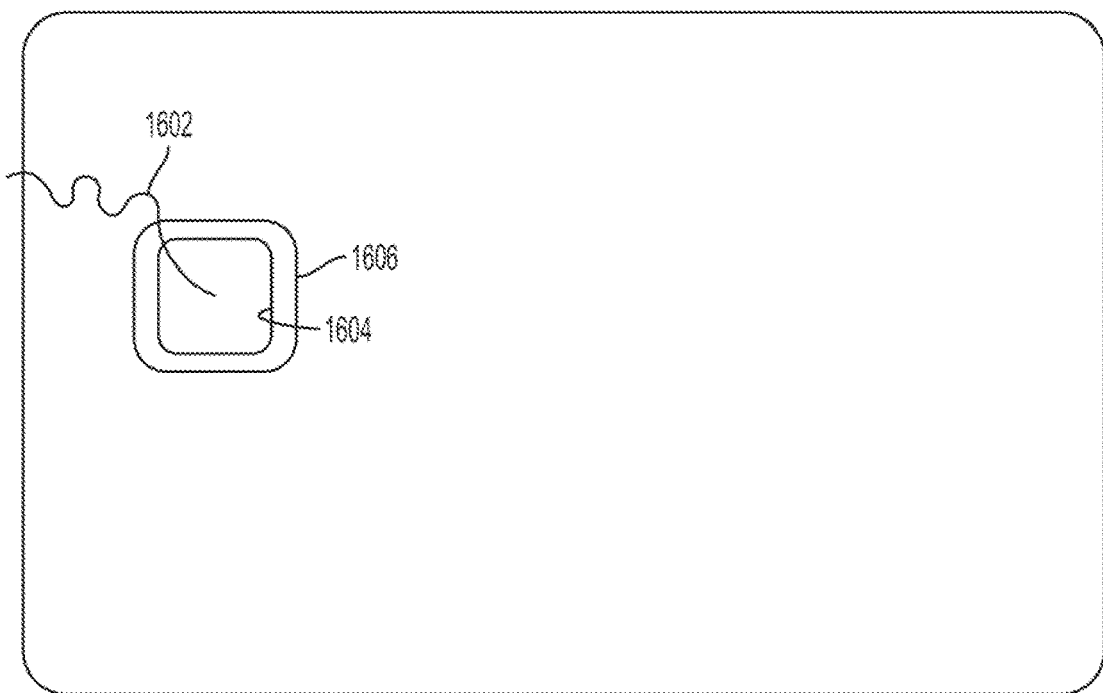
FIG. 16A is a schematic view illustration of a machine tool path for a discontinuity having a curved sinusoidal geometry relative to boundaries of upper and lower portions of the transponder chip opening for another exemplary card embodiment.
Figure 16B:
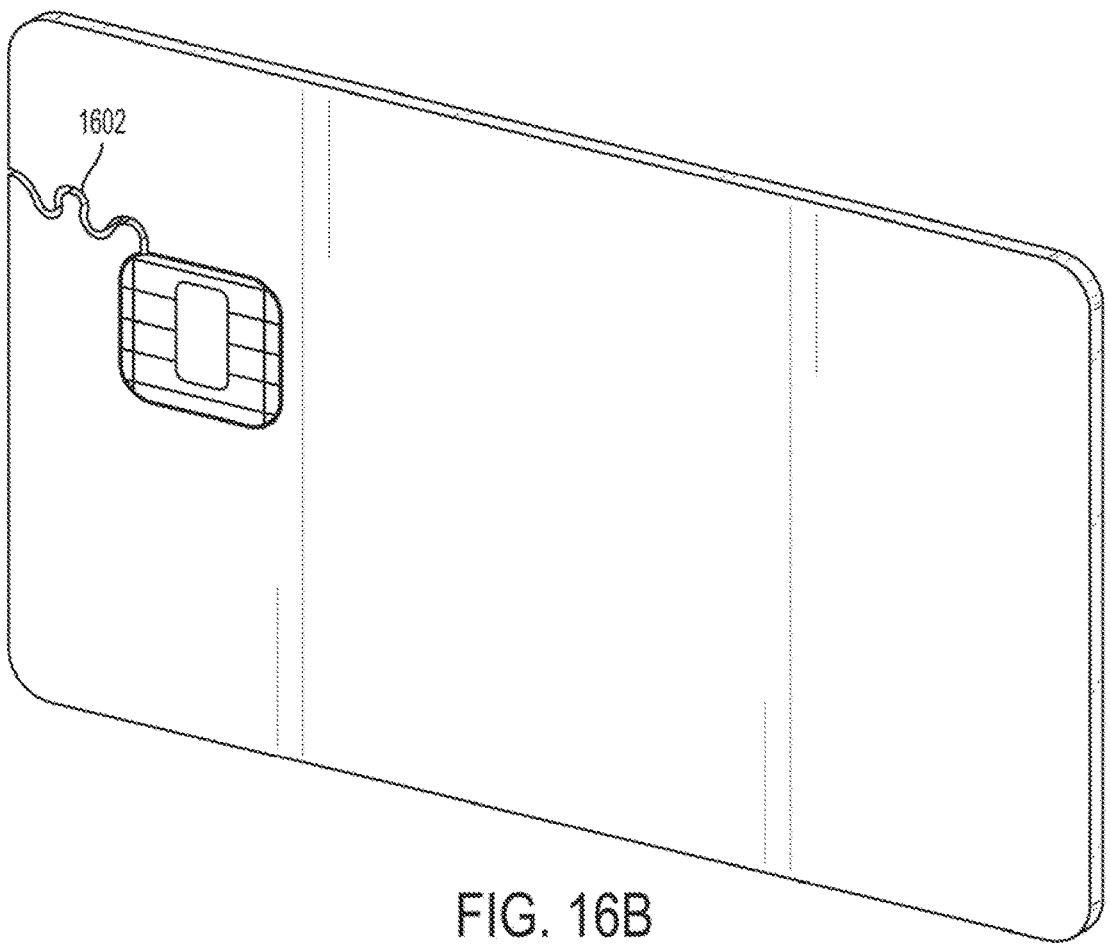
FIGS. 16B-16F are a perspective view (B) and plan view illustrations of the front surface (C), top side (D), left side (E), and back surface (F), respectively, of an exemplary card having the discontinuity depicted in FIG. 16A.
Figure 16C:
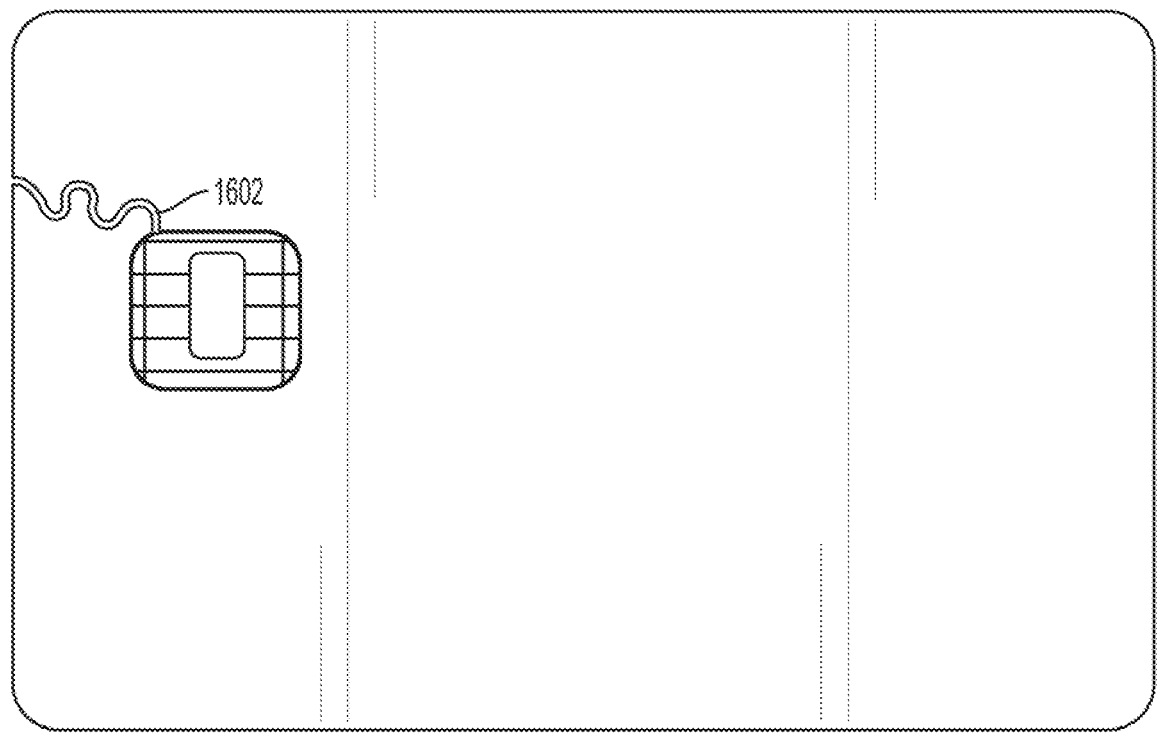
Figure 16D:
Figure 16E:
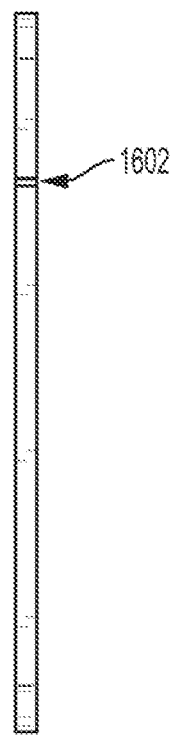
Figure 16F:
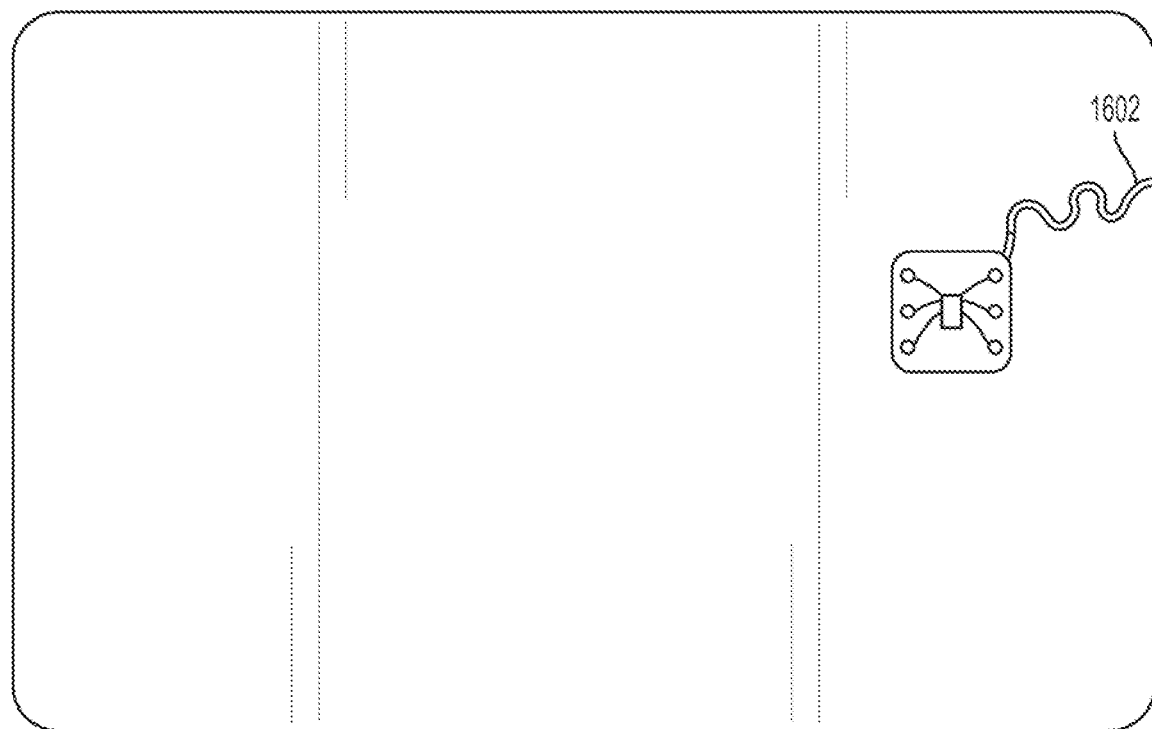

FIGS. 11A and 13A illustrate sawtooth geometries in which the path of the discontinuity makes multiple changes in direction of more than 90 degrees. FIG. 12A illustrates a discontinuity path that has a micro stairstep geometry and a macro sawtooth geometry, comprising at least a first plurality of more than two changes in direction of 90 degrees leading to a first change in direction of more than 90 degrees and a second plurality of more than two changes in direction of 90 degrees leading to a second change in direction of more than 90 degrees. Again, although depicted with each "tooth" in the sawtooth geometry of roughly equal dimension, the invention is not limited to such geometries.

Figure 10A:
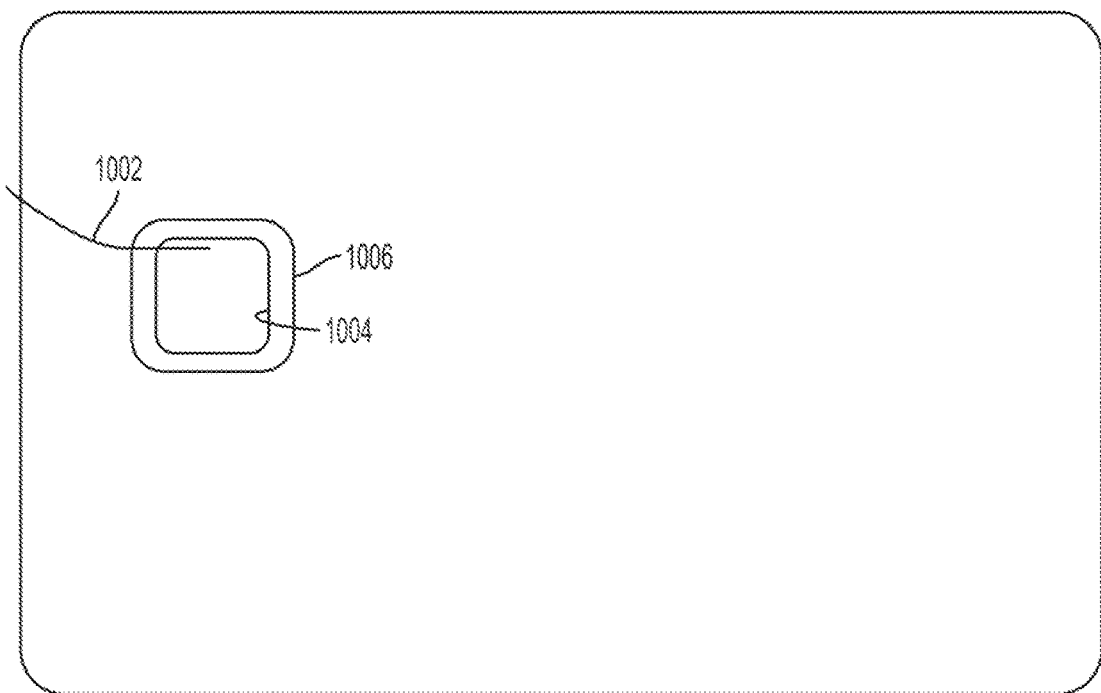
FIG. 10A is a schematic view illustration of a machine tool path for a discontinuity having a curved geometry relative to boundaries of upper and lower portions of the transponder chip opening for another exemplary card embodiment.
Figure 10B:
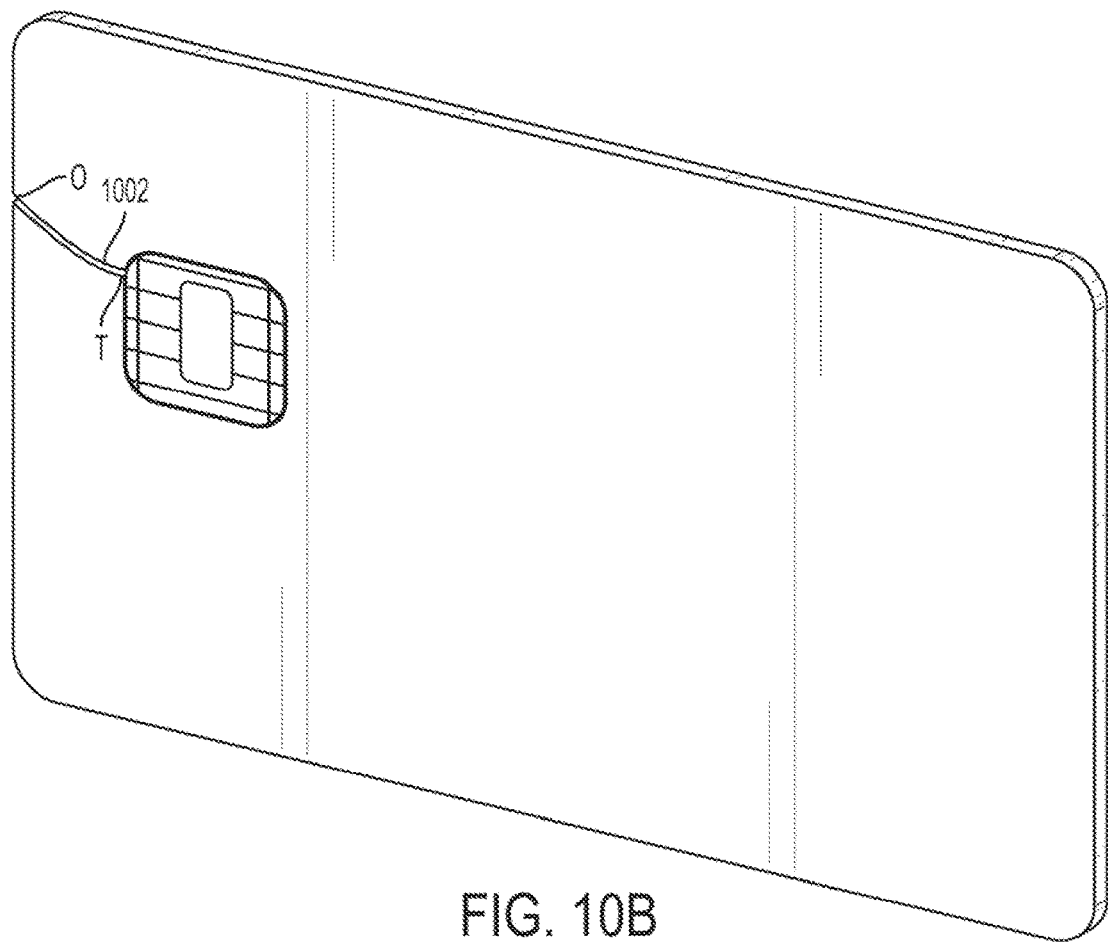
FIGS. 10B-10F are perspective and plan view illustrations of the front surface, top side, left side, back surface, respectively, of an exemplary card having the discontinuity depicted in FIG. 10A.
Figure 10C:
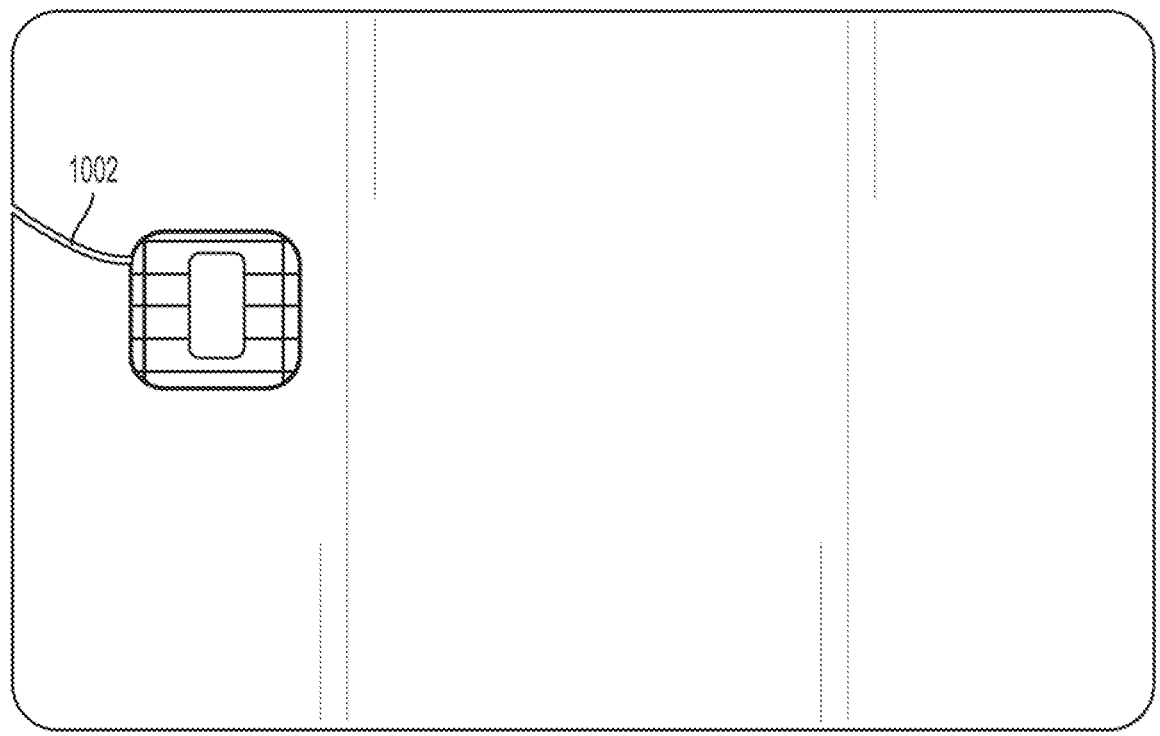
Figure 10D:
Figure 10E:
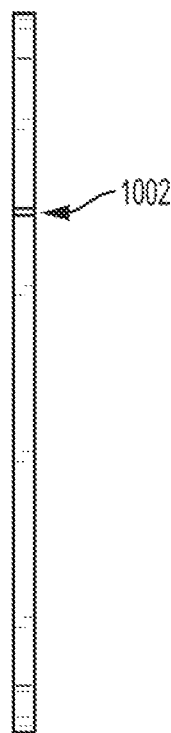
Figure 10F:
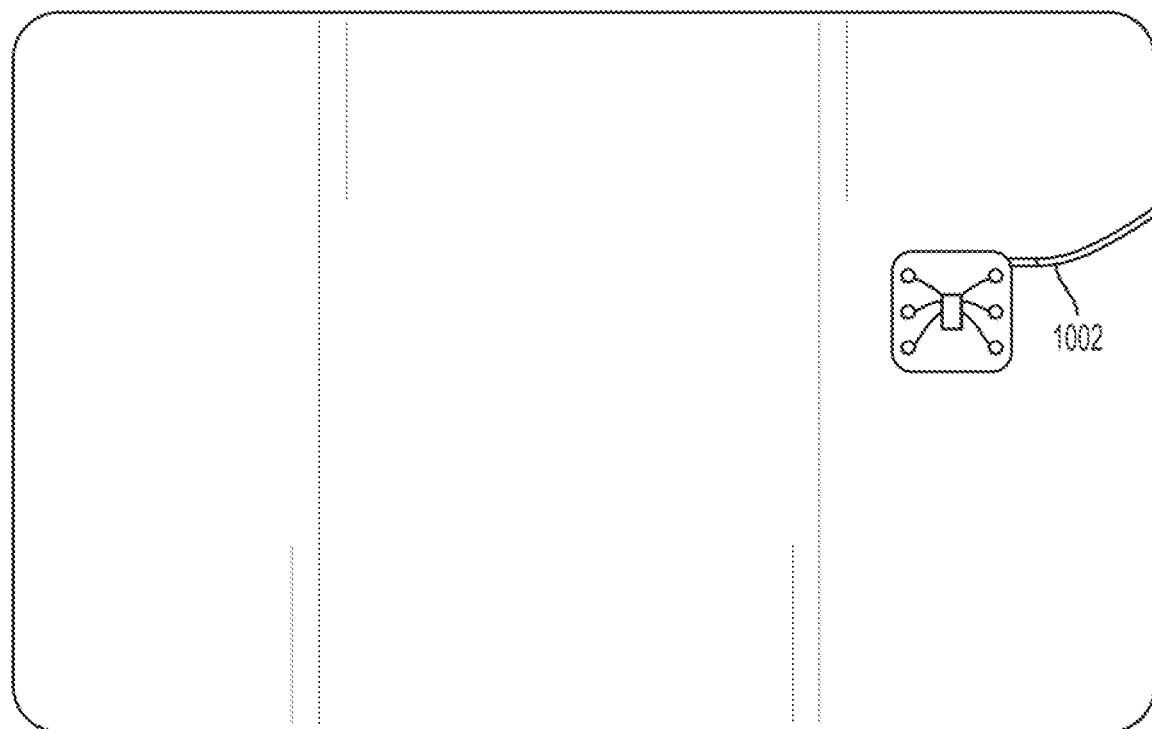

The discontinuity path may also have at least one section of curved geometry. A basic curved geometry is illustrated in FIG. 10A, but the curved design may also have one or more changes in direction greater than or equal to 90 degrees, wherein at least one of the changes in direction has a curved geometry. The embodiments illustrated in FIGS. 14A-18A depict such features, with the discontinuity paths illustrated in FIG. 14A-16A each having a sinusoidal shape for at least a portion of the path comprising at least two changes in direction of more than 90 degrees.

Figure 17A:
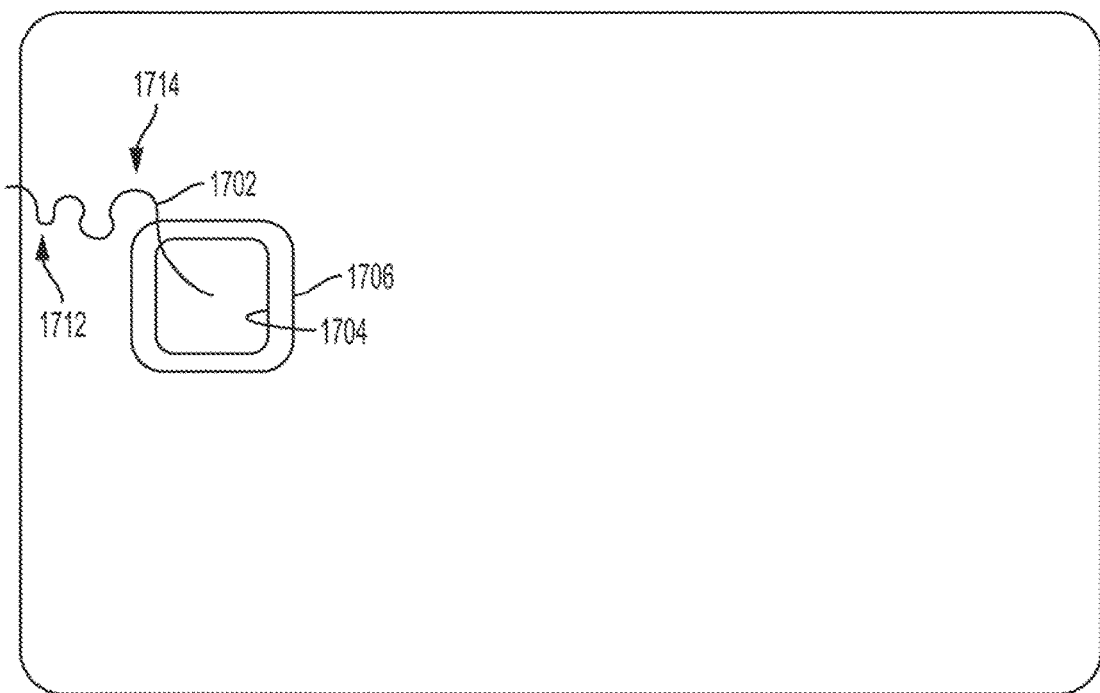
FIG. 17A is a schematic view illustration of a machine tool path for a discontinuity having a curved sinusoidal geometry relative to boundaries of upper and lower portions of the transponder chip opening for another exemplary card embodiment.
Figure 17B:
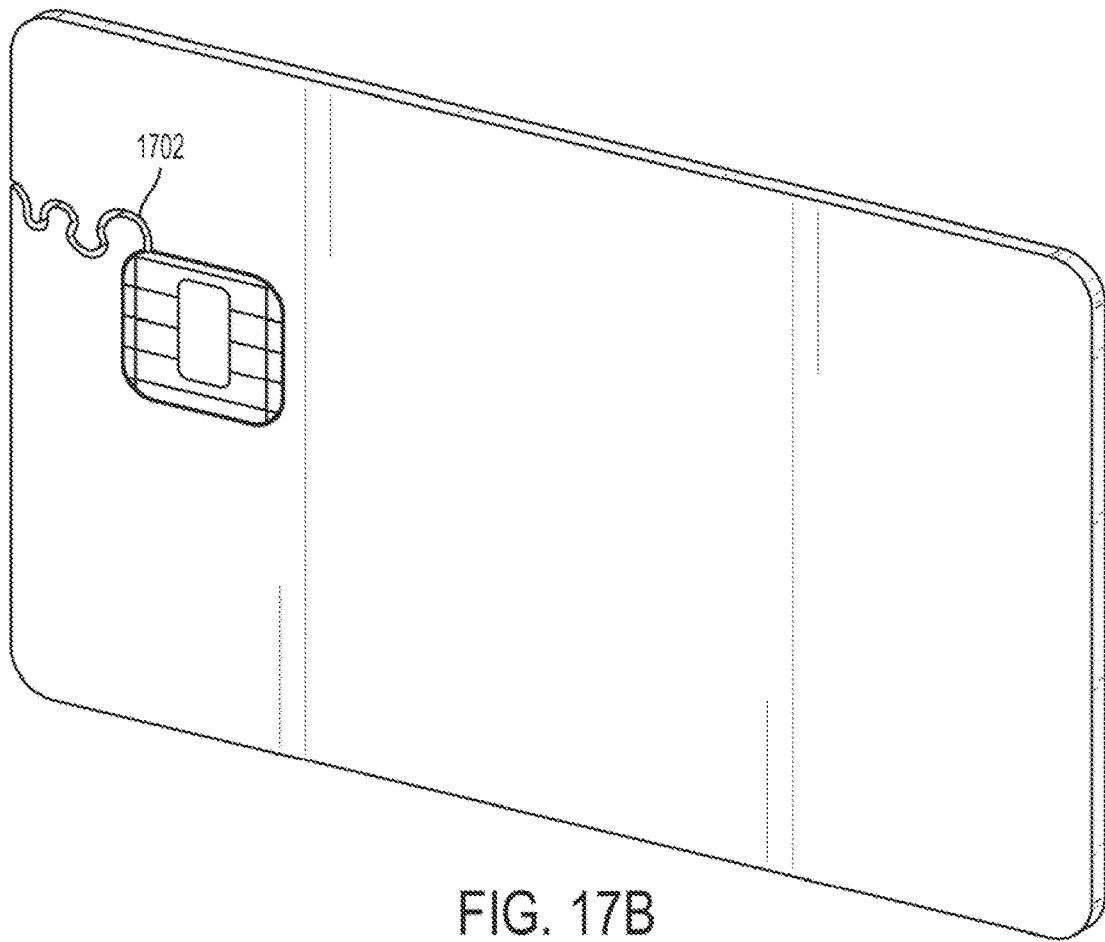
FIGS. 17B-17F are a perspective view (B) and plan view illustrations of the front surface (C), top side (D), left side (E), and back surface (F), respectively, of an exemplary card having the discontinuity depicted in FIG. 17A.
Figure 17C:
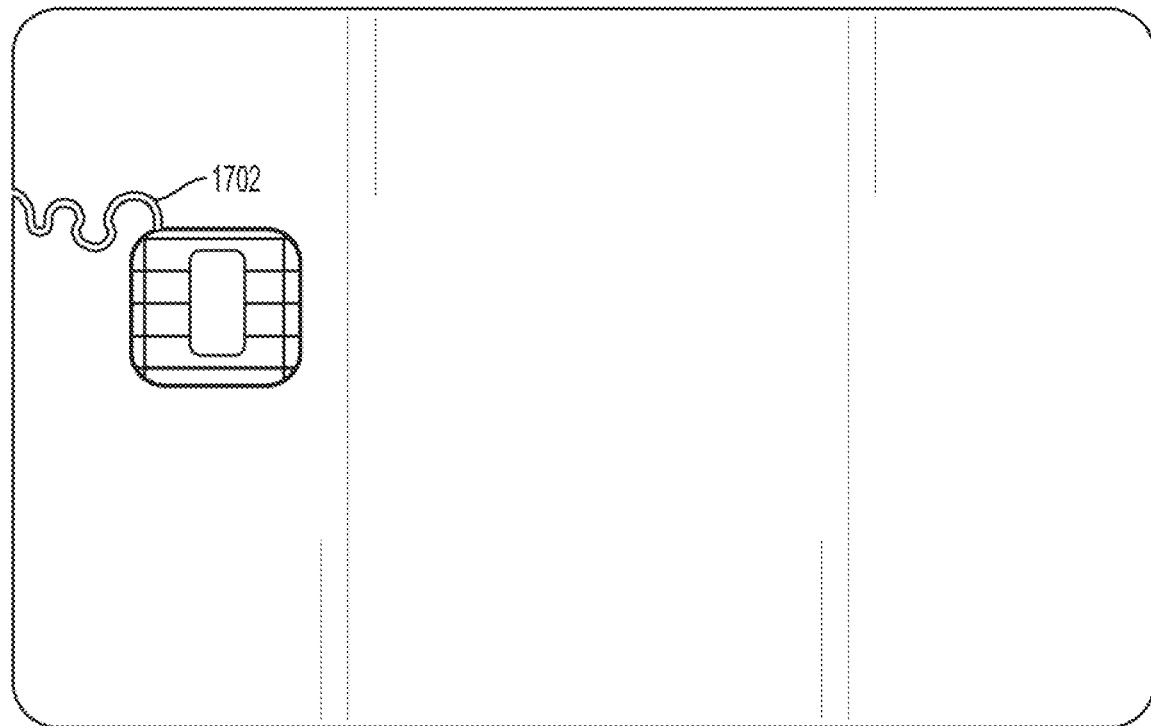
Figure 17D:
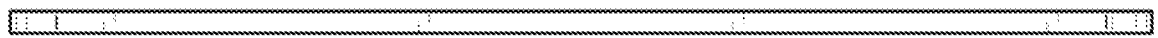
Figure 17E:
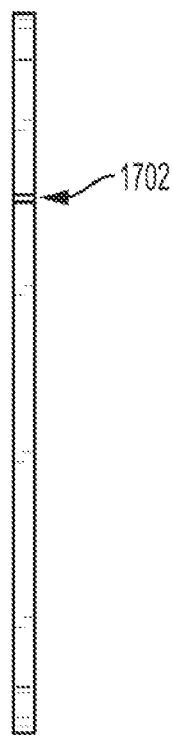
Figure 17F:
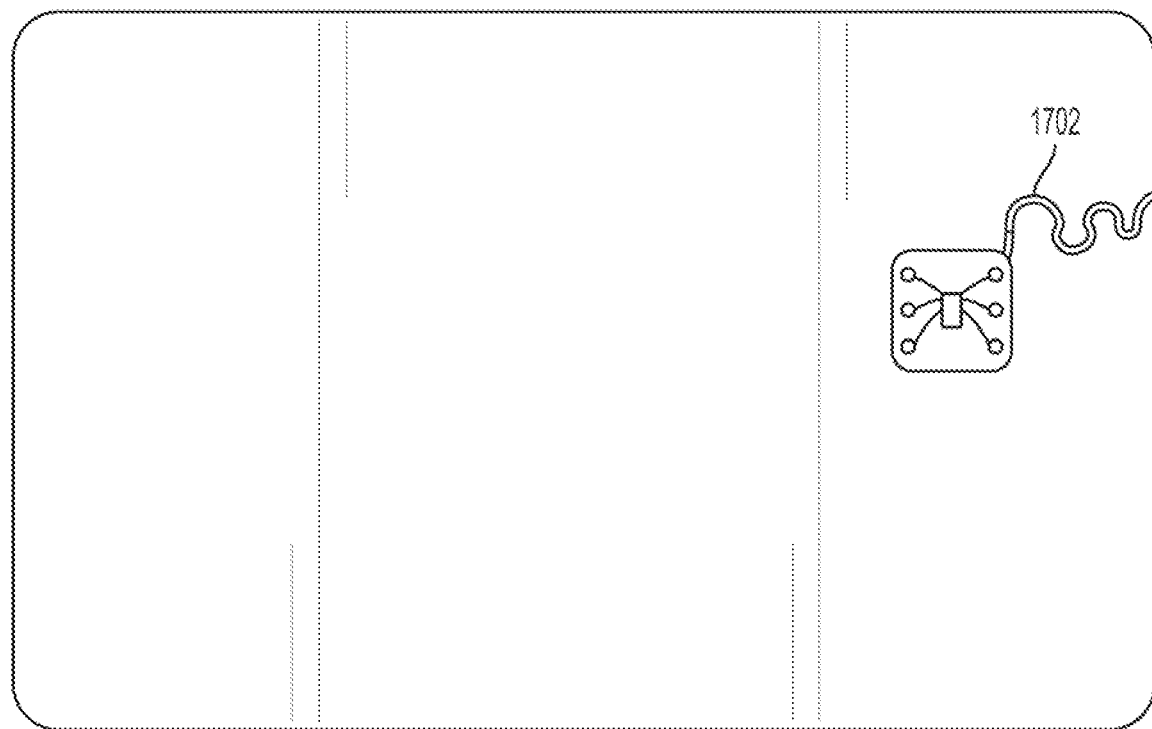
Figure 18A:
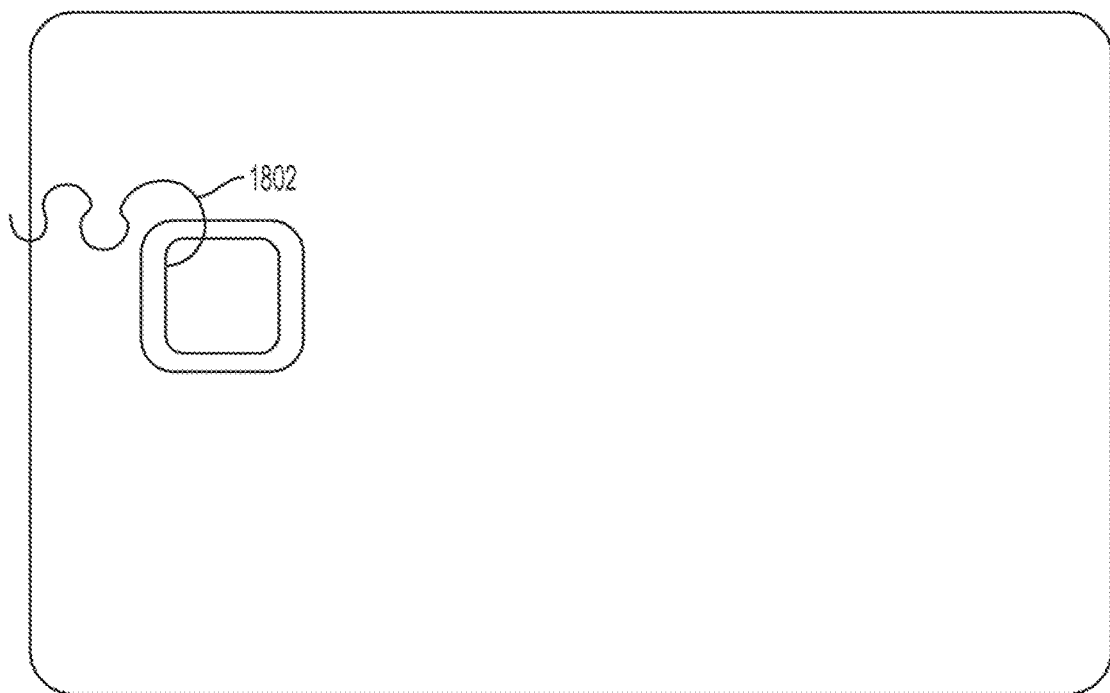
FIG. 18A is a schematic view illustration of a machine tool path for a discontinuity having a curved sinusoidal geometry relative to boundaries of upper and lower portions of the transponder chip opening for another exemplary card embodiment.
Figure 18B:
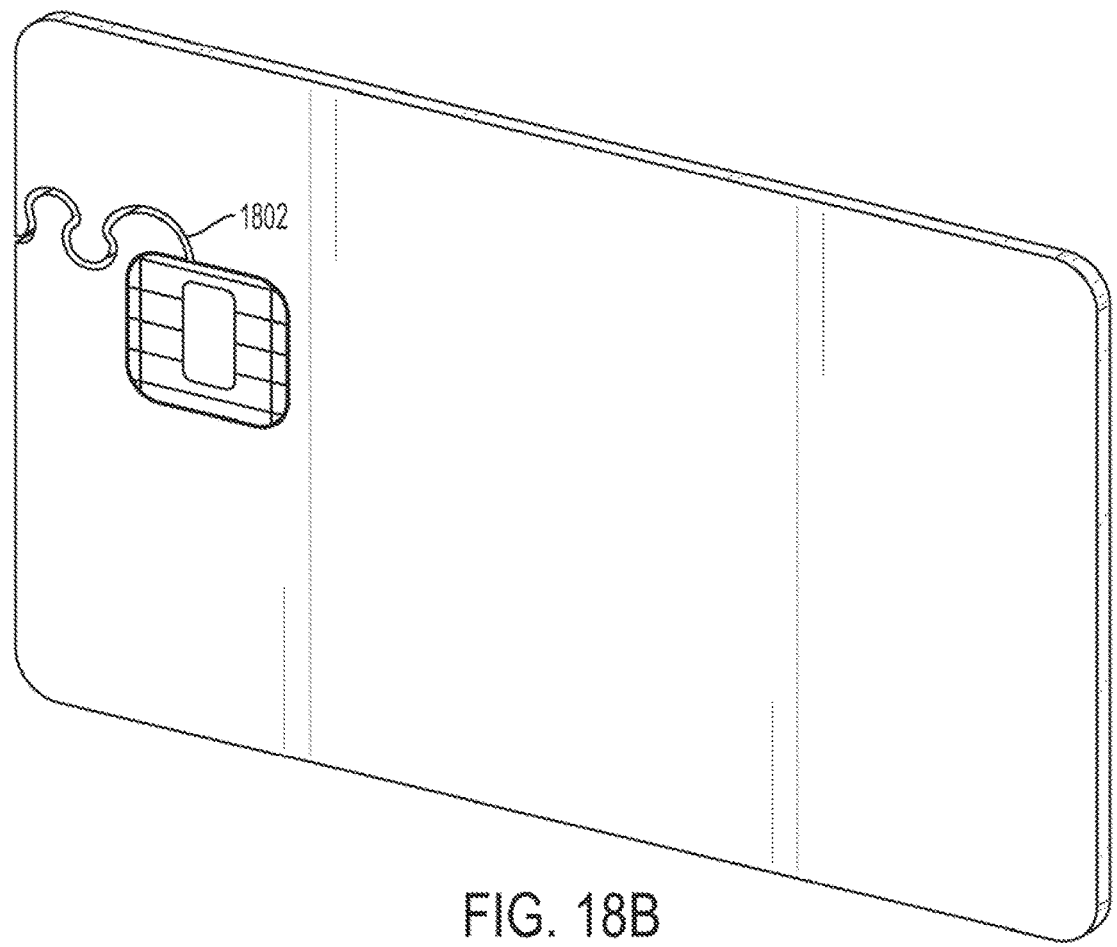
FIGS. 18B-18F are a perspective view (B) and plan view illustrations of the front surface (C), top side (D), left side (E), and back surface (F), respectively, of an exemplary card having the discontinuity depicted in FIG. 18A.
Figure 18C:
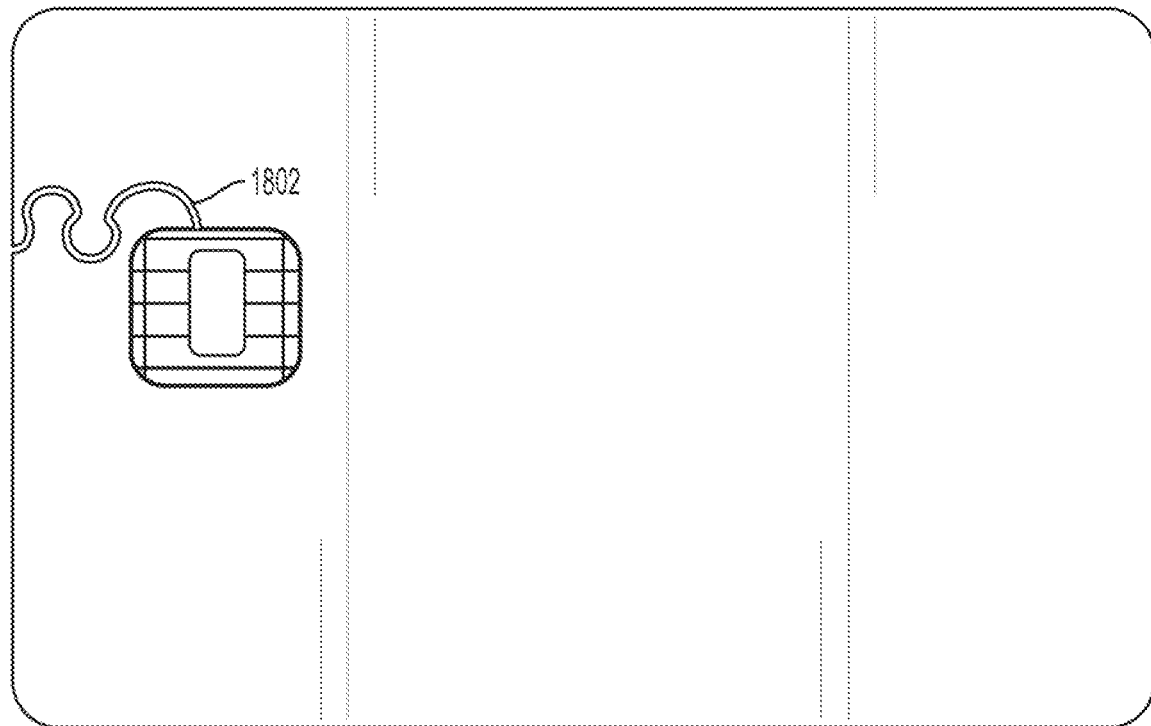
Figure 18D:
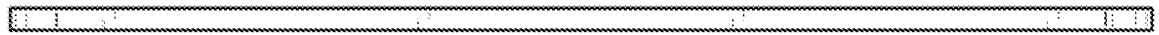
Figure 18E:
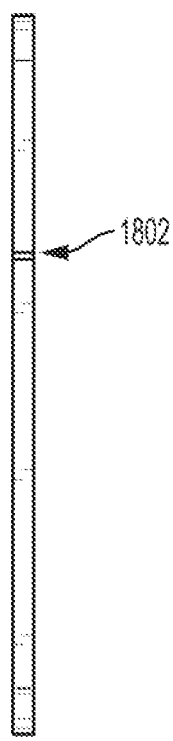
Figure 18F:
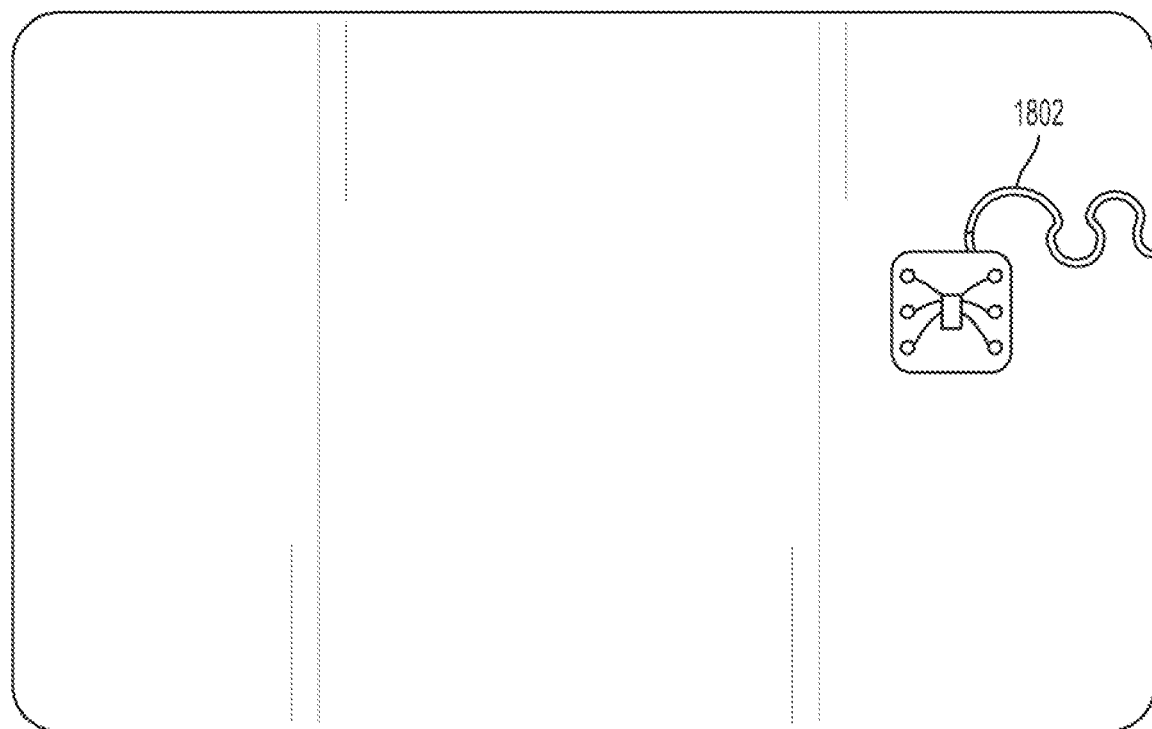

Although the paths shown in FIGS. 14-16 are generally sinusoidal in nature, a curved path with multiple changes in direction may also have portions that complete a change in direction of more than 180 degrees before making a subsequent change in direction of more than 180 degrees, as depicted in FIGS. 17A-C. Also depicted in FIGS. 17A-C, the size of each section encompassing a 180 degree change in direction may vary over the length of the path from a relatively smaller section 1712 to a relatively larger section 1714.

The path in FIG. 31A depicts sections of curved geometry within a stairstep architecture, comprising a radius or fillet instead of a right angle for each change of direction of 90 degrees. Such a path may enable faster operation of the cutting tool and/or may be aesthetically more pleasing than the embodiment with sharp direction changes.

In some embodiments, such as depicted in FIGS. 15A-18A, the terminus of the discontinuity may be located on the top edge opening with the origin located on the left side of the card. In other embodiments, such as depicted in FIGS. 1A-7, and FIG. 22A-F, the discontinuity may be located on the top or bottom side of the card periphery and the terminus may be on the top or bottom edge or a top or bottom corner of the opening.

Figure 30A:
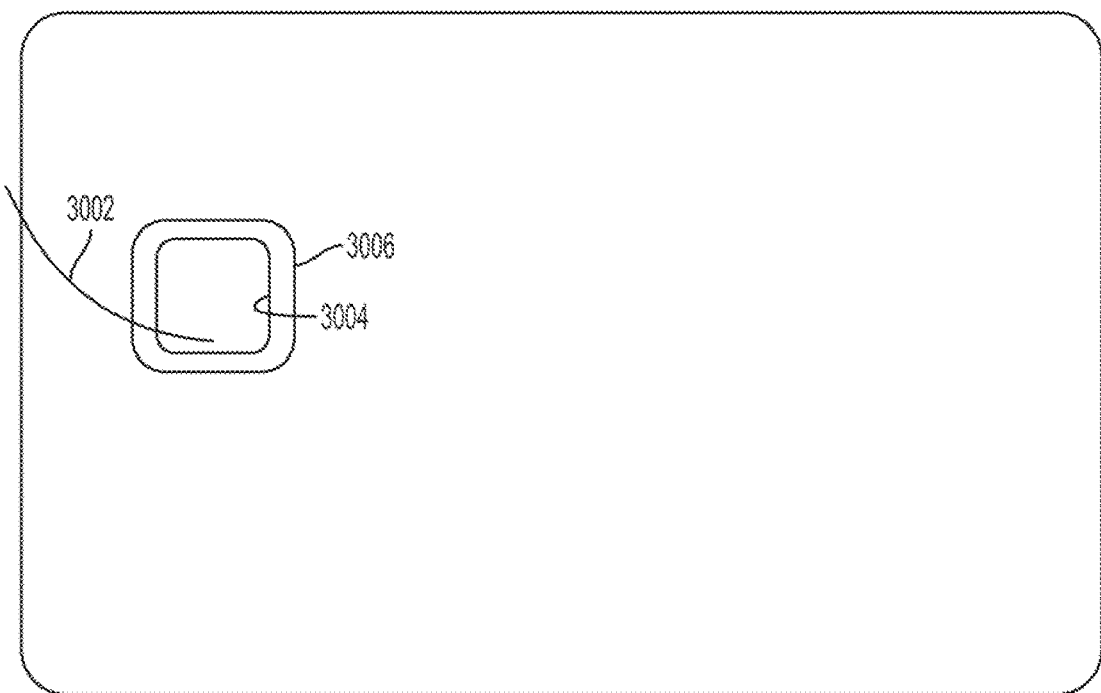
FIG. 30A is a schematic view illustration of a machine tool path for an exemplary discontinuity, having a curved geometry, relative to boundaries of upper and lower portions of the transponder chip opening for another exemplary card embodiment.
Figure 30B:
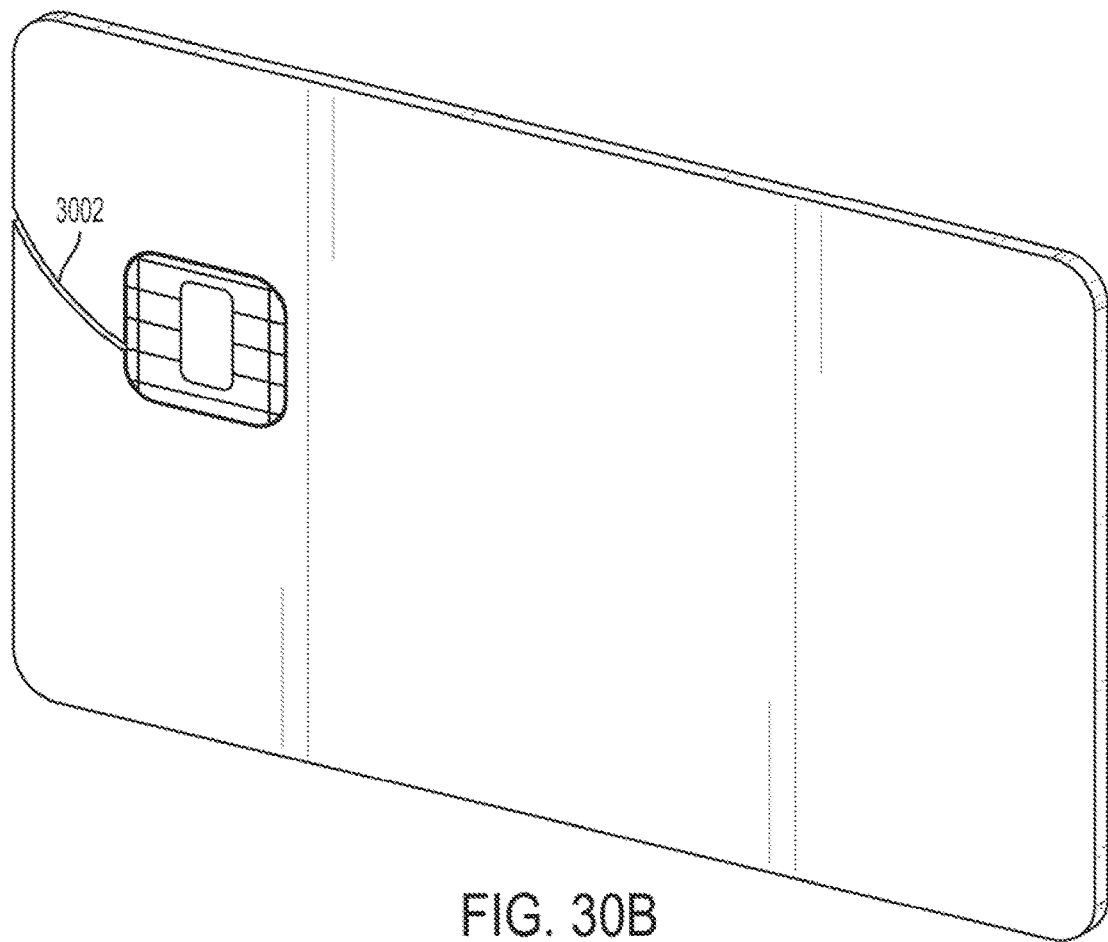
FIGS. 30B-30F are a perspective view (B) and plan view illustrations of the front surface (C), top side (D), left side (E), and back surface (F), respectively, of an exemplary card having the discontinuity depicted in FIG. 30A.
Figure 30C:
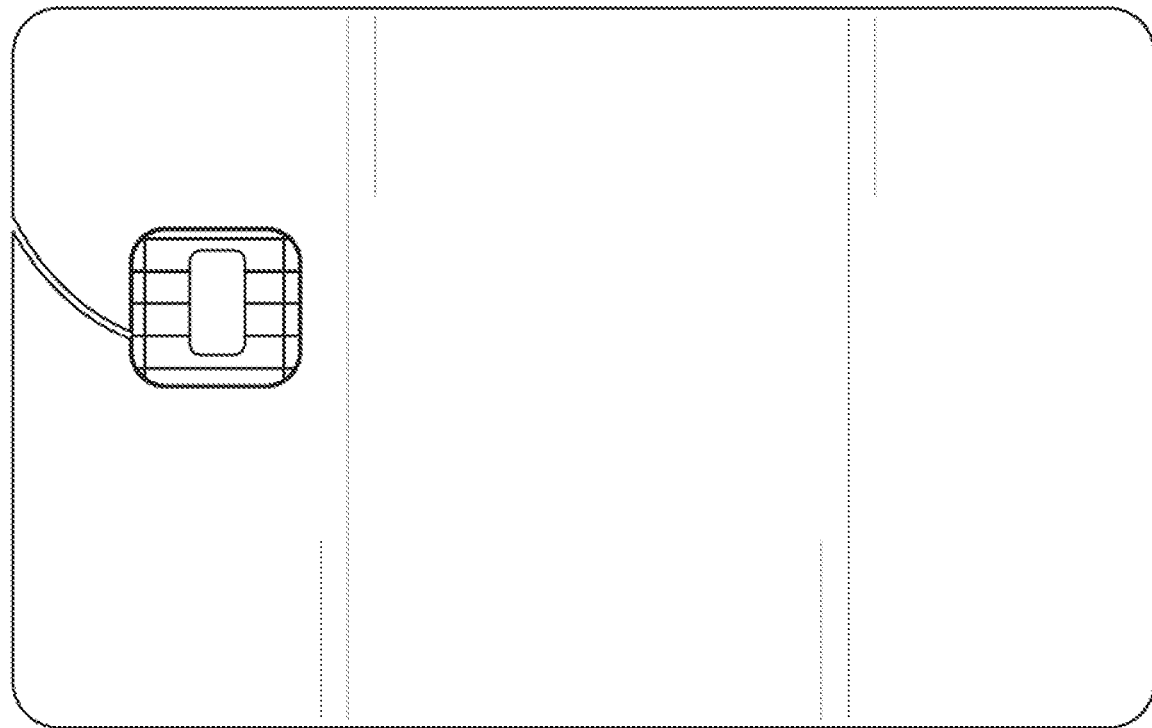
Figure 30D:
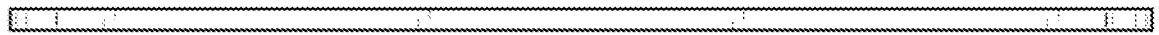
Figure 30E:
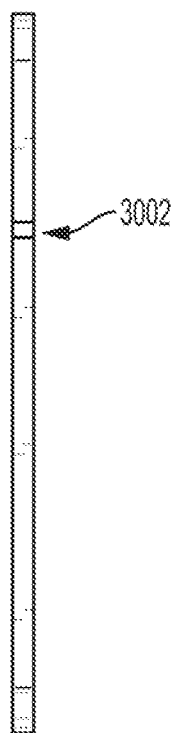
Figure 30F:
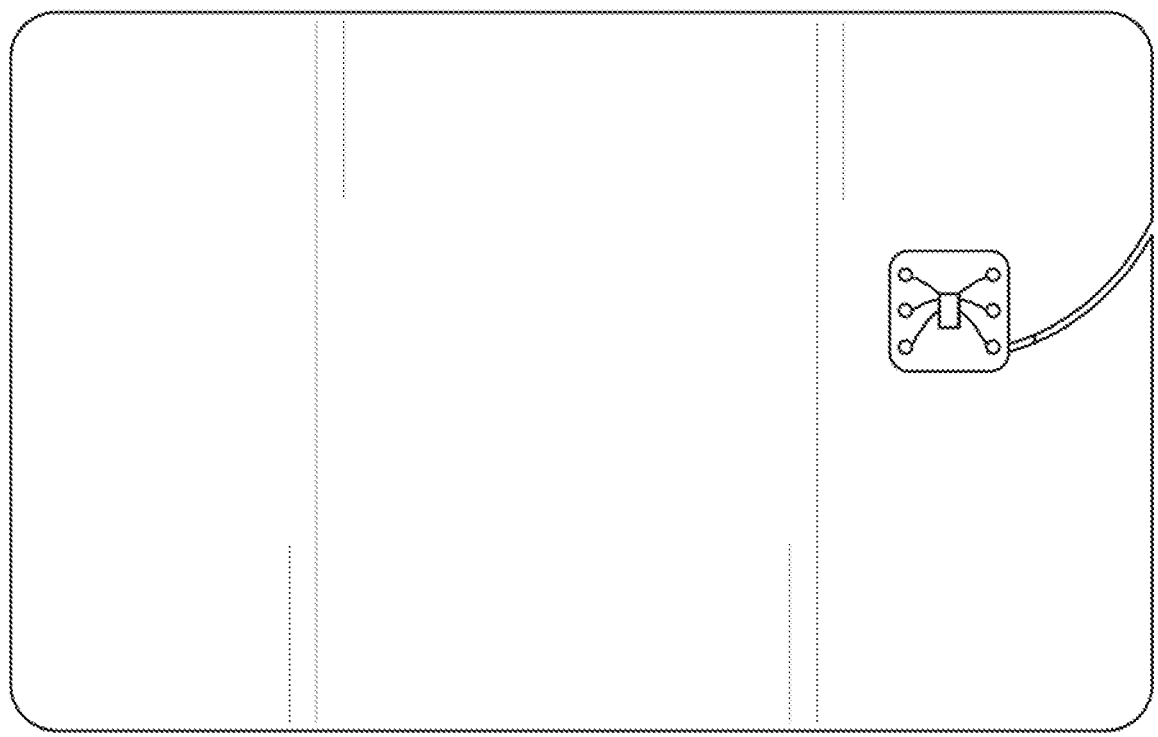

In some embodiments, such as depicted in FIGS. 9A, 19A, and 30A, the discontinuity has a terminus located on the left edge of the opening at a location relatively closer to the bottom left corner 125 than the upper left corner 123 and has an origin in the left side of the card periphery in a location relatively closer to the upper left corner 123 than the bottom left corner 125. In other embodiments, such as depicted in FIGS. 8A, 10A, 15A, 20A, and 21A, the terminus location is relatively closer to upper left corner 123 than the bottom left corner 125 and the origin is located in the left side of the card periphery relatively closer to the upper left corner 123 than the bottom left corner 125. In other words, the paths of the discontinuities for both of the foregoing types of embodiments are generally diagonal and downward from the origin to the terminus, but the first group terminates on the left edge of the opening closer to the bottom corner than the top corner.

As described above and depicted in the figures, e.g., 1C, 8C, 9C, etc., in a completed metal layer of the card, a transponder chip module 121 is disposed in the opening, and the metal layer serves as an amplifying antenna for the transponder chip module. In final card embodiments incorporating any of the metal layers depicted and described herein, such as layer 1100 depicted in FIG. 32, the card may comprise at least one non-metal layer 1200, 1300 disposed on at least one surface of the metal layer 1100, such as but not limited to a plastic layer, a ceramic layer, a decorative layer comprising one of wood or leather, or a combination thereof. Different types of layers, or combinations thereof, may be disposed on different surfaces of the card. As used herein, the term "disposed" does not denote a direct connection to the respective surface, but also an indirect connection (i.e. on top of one or more other layers that are directly connected to the surface).

In one preferred embodiment, wherein metal layer 1100 has a stairstep shaped discontinuity 902, 1902, 3102, such as is depicted in, for example, FIGS. 9A-C, 19A-C and 31A-C, the card may have a front surface coated with ceramic layer 1200 and a back surface on which a plastic layer 1300 is attached, preferably by an adhesive. As is known to one of skill in the art, attachment of a plastic layer with an adhesive may comprise employing a carrier substrate (e.g. polyester) having adhesive (e.g. an ethylene copolymer adhesive, such as ethylene acrylic acid (EEA)) on both sides. As depicted in the cross sectional diagram of FIG. 34, in embodiments with a ceramic layer 3400 comprising a ceramic coating over the metal layer 3410, the gap 3402 defined by the discontinuity may at least partially filled with the ceramic coating, leaving a surface imperfection 3404 still visible from the top surface of the ceramic coating.

Figure 34:
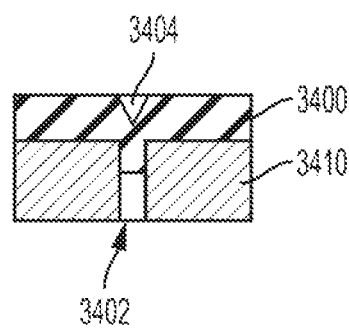
FIG. 34 is a cross sectional illustration of another exemplary card embodiment, showing a discontinuity partially filled with a surface coating.
Figure 35A:
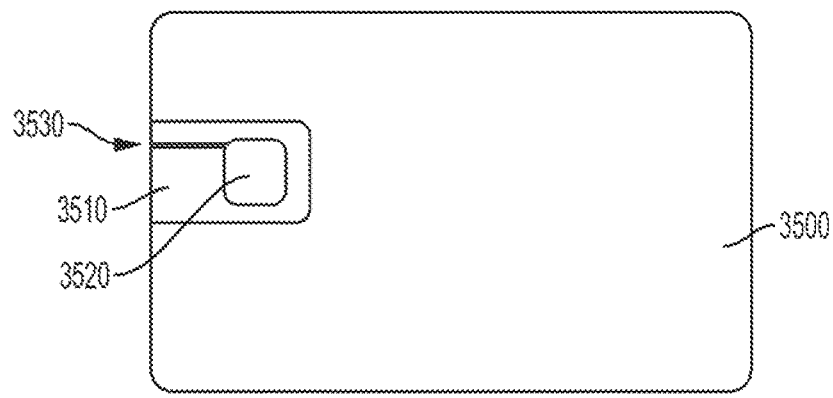
FIG. 35A is a plan view of a front surface of an exemplary card with a discontinuity and an exemplary pocket for receiving a reinforcing tab.
Figure 35B:
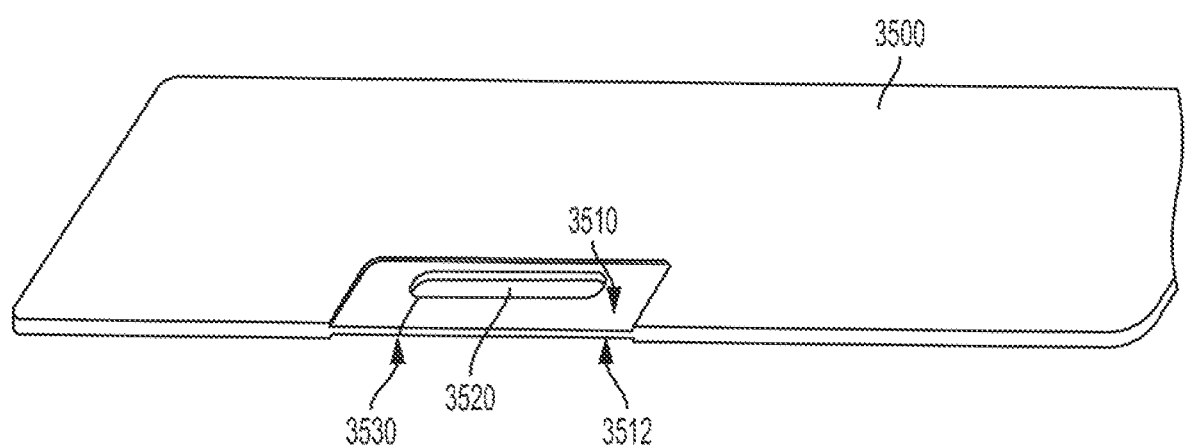
FIG. 35B is perspective view from the front left side of the card of FIG. 35A prior to receiving reinforcing tabs.
Figure 35C:
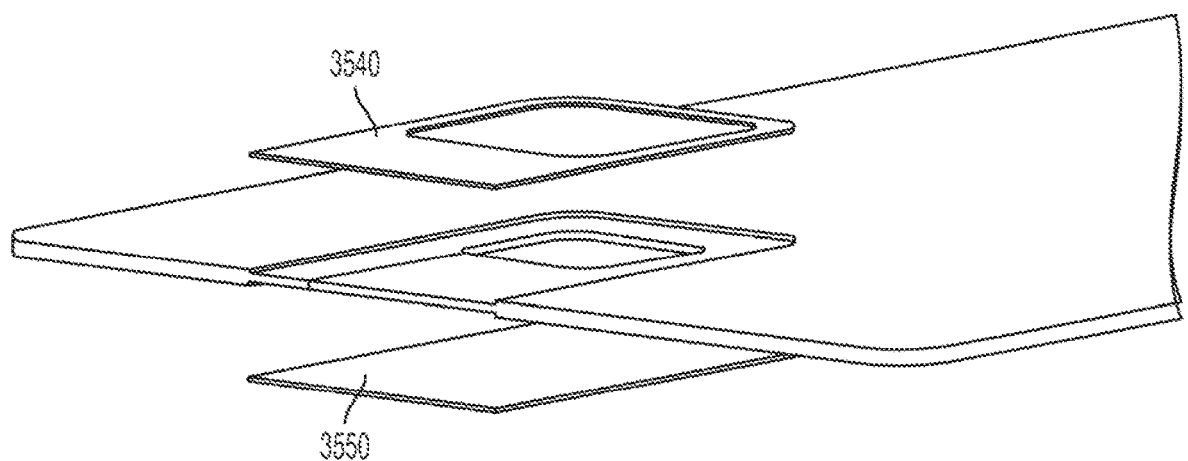
FIG. 35C is an exploded perspective view from the front left side lower corner of the card of FIG. 35A, showing the placement of reinforcing tabs.
Figure 35D:
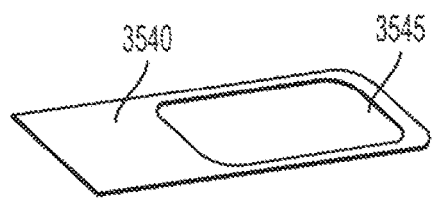
FIG. 35D is a perspective view of an isolated front tab as depicted in FIG. 35C.
Figure 35E:
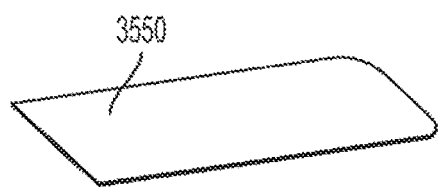
FIG. 35E is a perspective view of an isolated back tab as depicted in FIG. 35C.

The discontinuity as described herein may be optically visible from one or both surfaces of the card. In some embodiments, such as one in which the back surface is covered with an opaque plastic or translucent plastic with opaque ink, the discontinuity may not be visible from the back surface. In embodiments with front decorative layers, such as wood, leather, or certain ceramics, the discontinuity may also be hidden from the front. In some ceramic-coated embodiments, however, the ceramic coating may only partially fill the gap caused by the discontinuity, thereby making the discontinuity still visibly perceptible, at least as a surface imperfection 3404 as depicted in FIG. 34, which imperfection may be in the form of at least a perceptible line, if not a perceptible gap. Thus, it should be understood that in the drawings depicting a finished metal layer, that metal layer may be a top layer, or it may be a layer that is covered with another layer but still visibly perceptible in some way.

Figure 25A:
FIG. 25A is a schematic view illustration of a machine tool path for a plurality of discontinuities relative to boundaries of upper and lower portions of the transponder chip opening for another exemplary card embodiment.
Figure 25B:
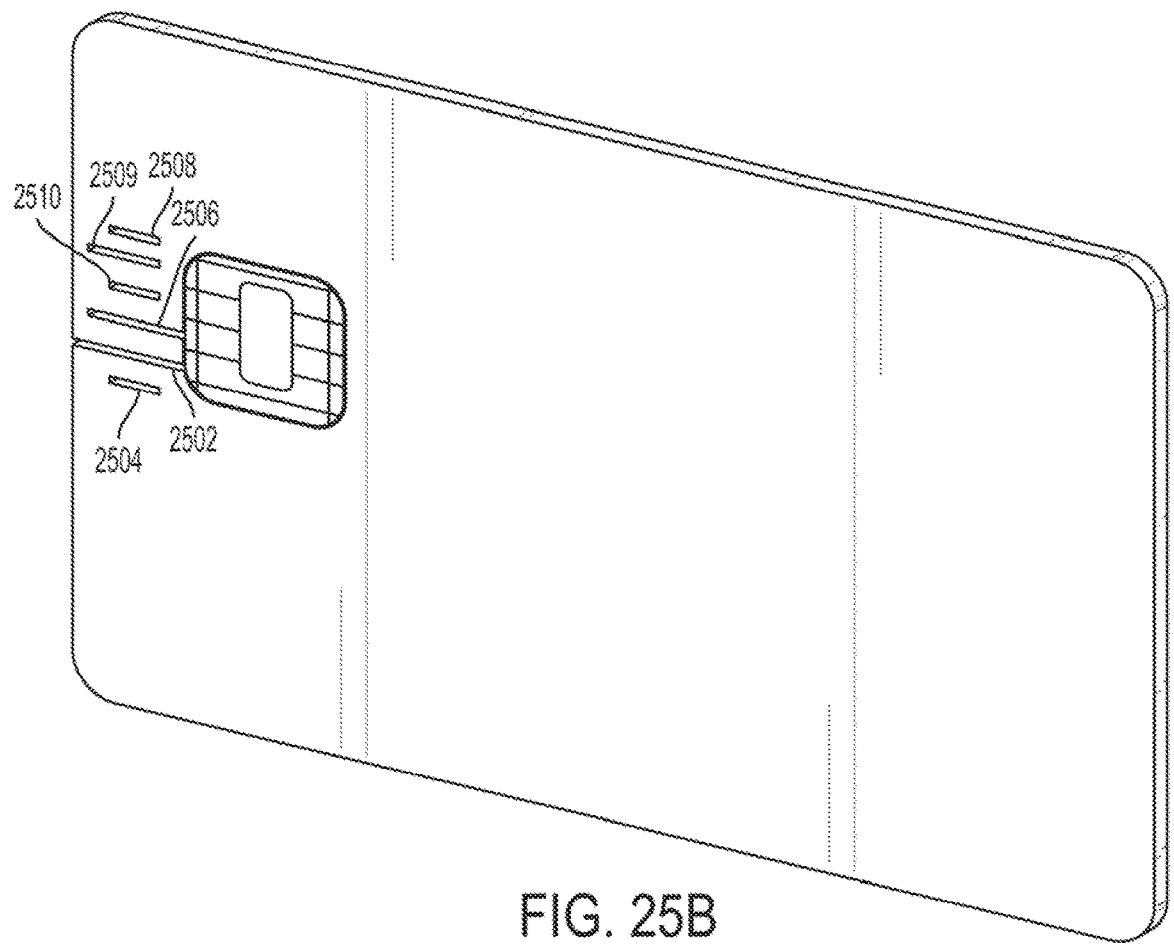
FIGS. 25B-25F are a perspective view (B) and plan view illustrations of the front surface (C), top side (D), left side (E), and back surface (F), respectively, of an exemplary card having the discontinuity depicted in FIG. 25A.
Figure 25C:
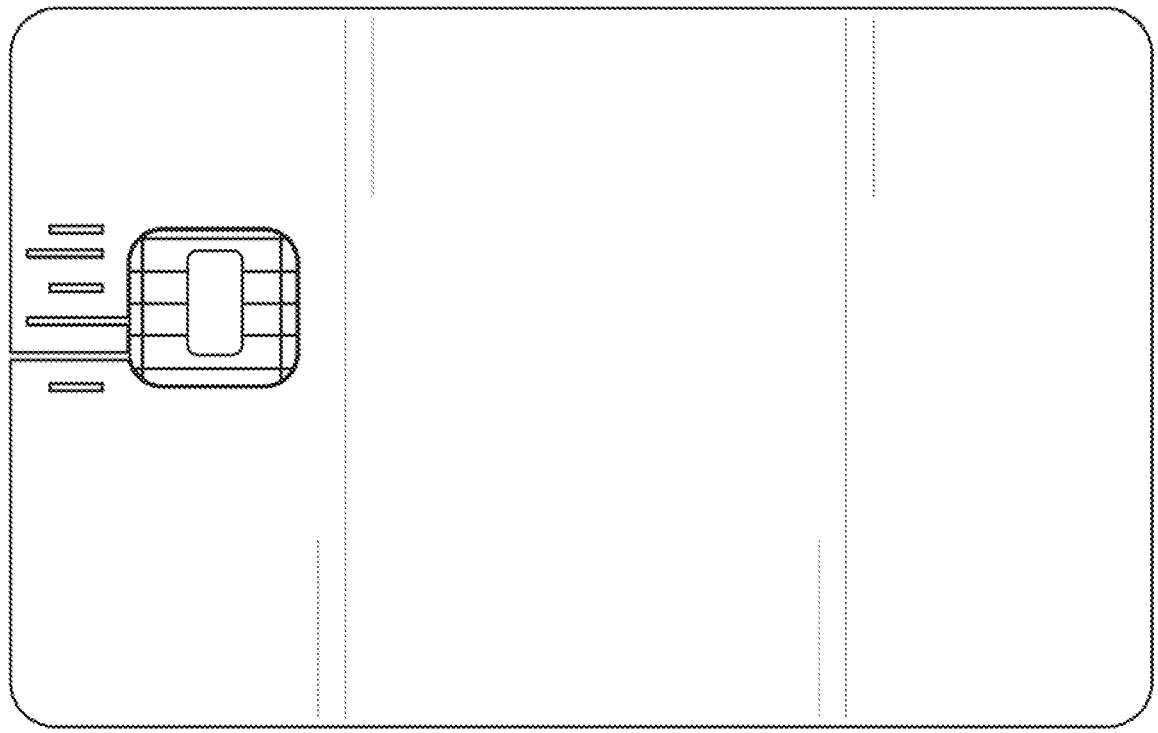
Figure 25D:
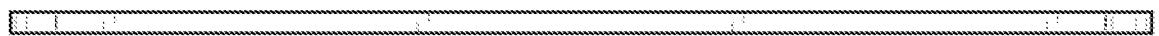
Figure 25E:
Figure 25F:
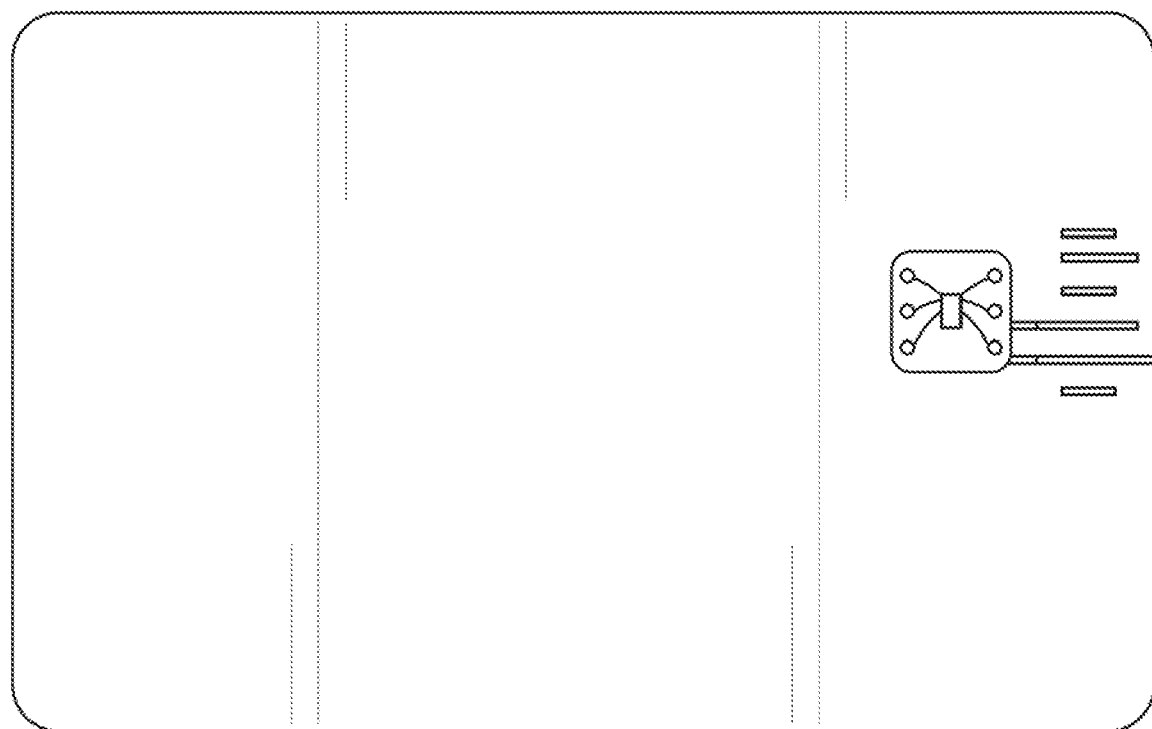
Figure 26A:
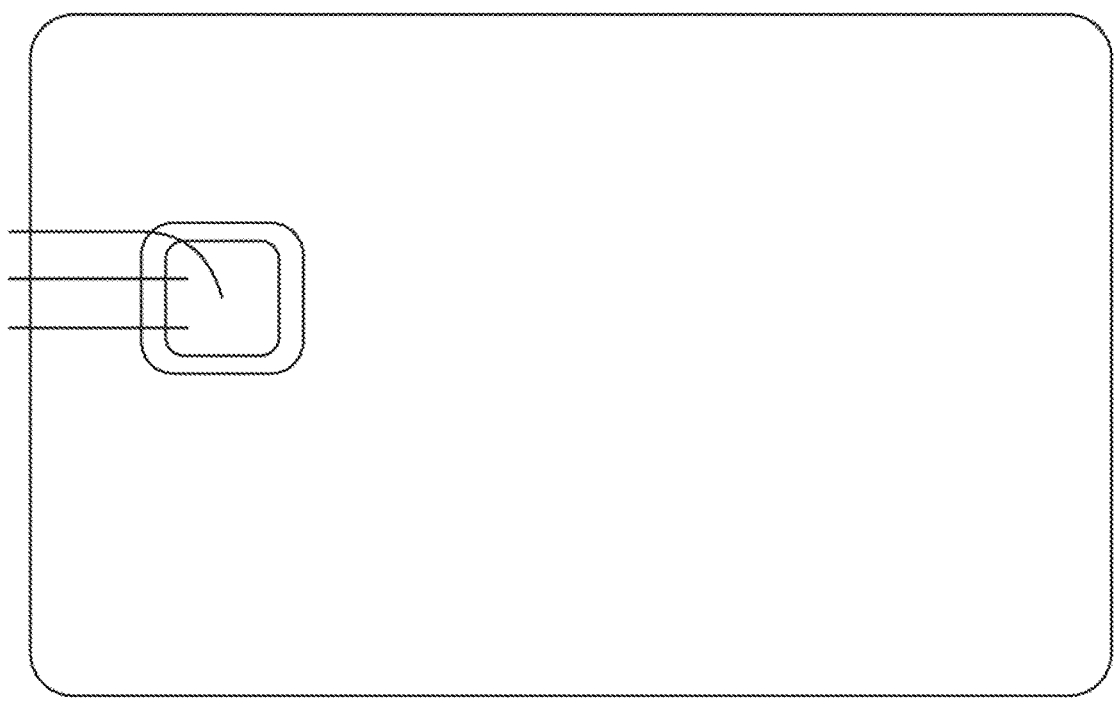
FIG. 26A is a schematic view illustration of a machine tool path for a plurality of discontinuities relative to boundaries of upper and lower portions of the transponder chip opening for another exemplary card embodiment.
Figure 26B:
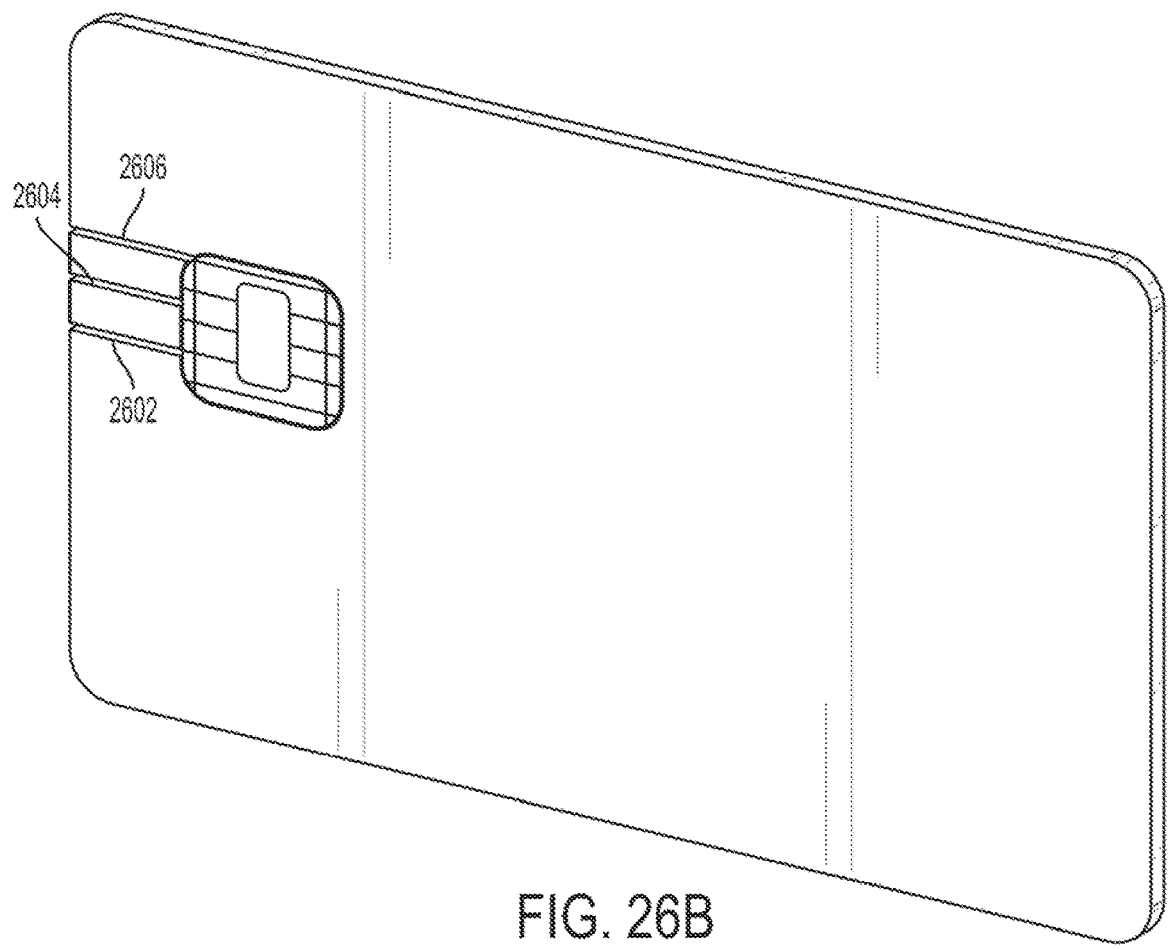
FIGS. 26B-26F are a perspective view (B) and plan view illustrations of the front surface (C), top side (D), left side (E), and back surface (F), respectively, of an exemplary card having the discontinuity depicted in FIG. 26A.
Figure 26C:
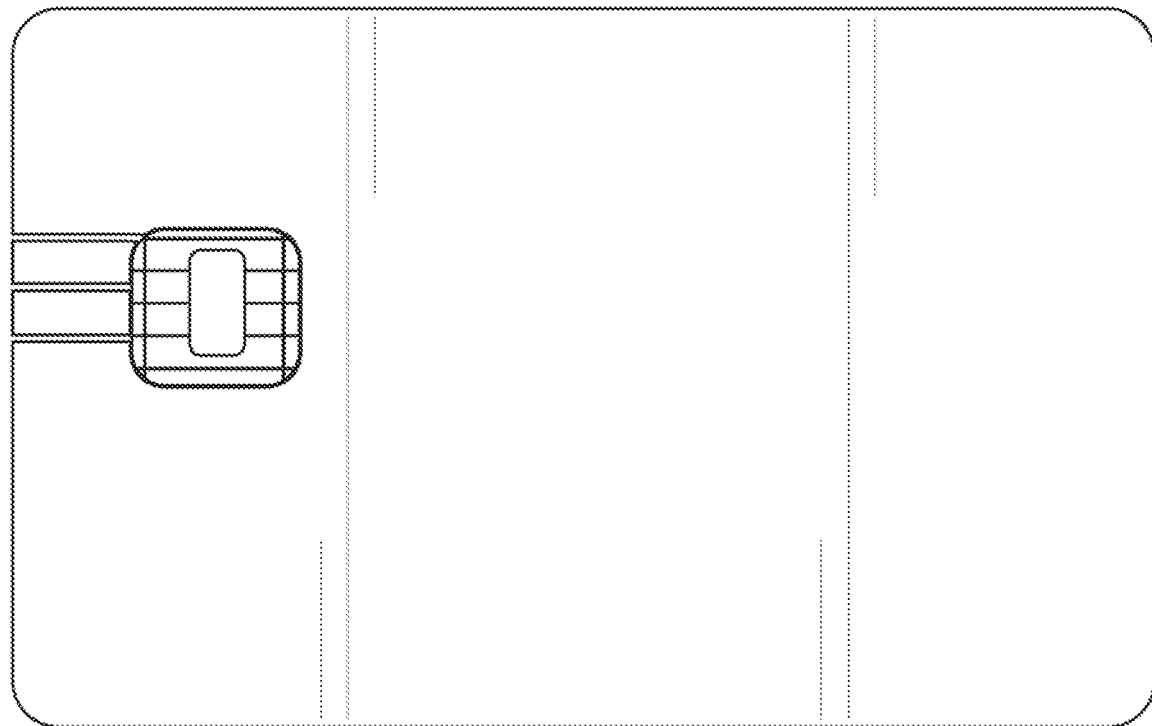
Figure 26D:
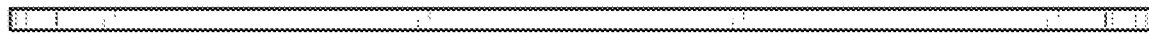
Figure 26E:
Figure 26F:
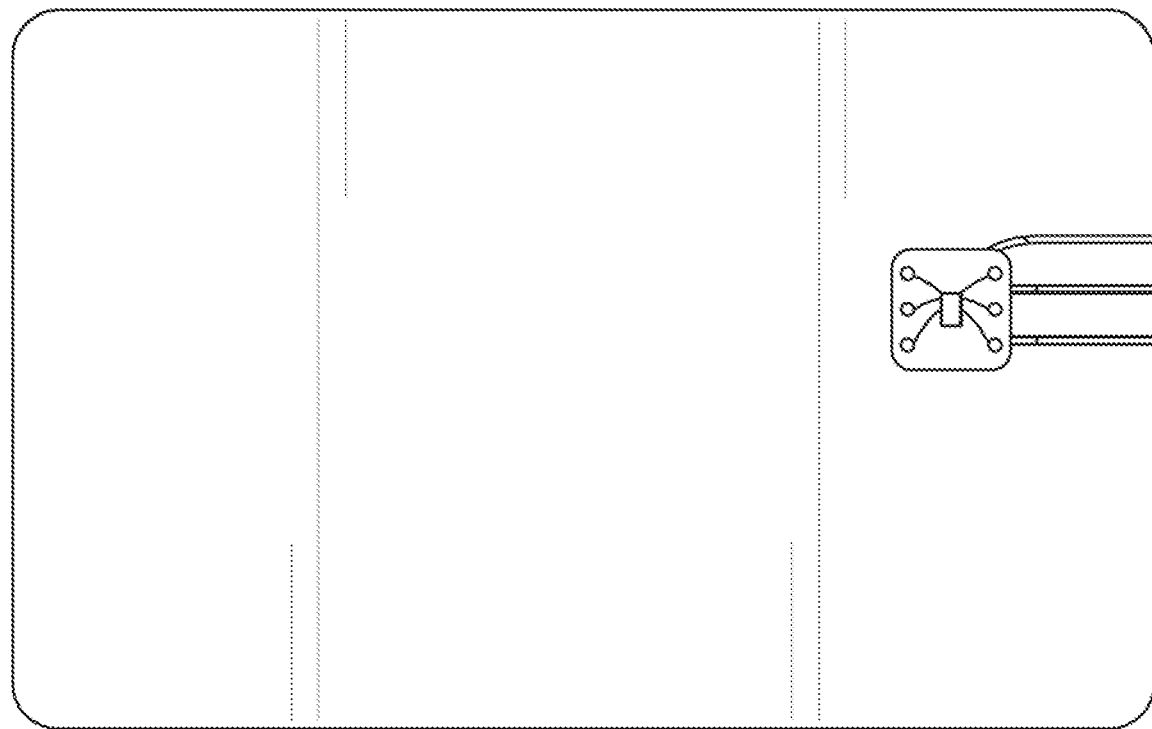
Figure 27A:
FIG. 27A is a schematic view illustration of a machine tool path for a plurality of discontinuities relative to boundaries of upper and lower portions of the transponder chip opening for another exemplary card embodiment.
Figure 27B:
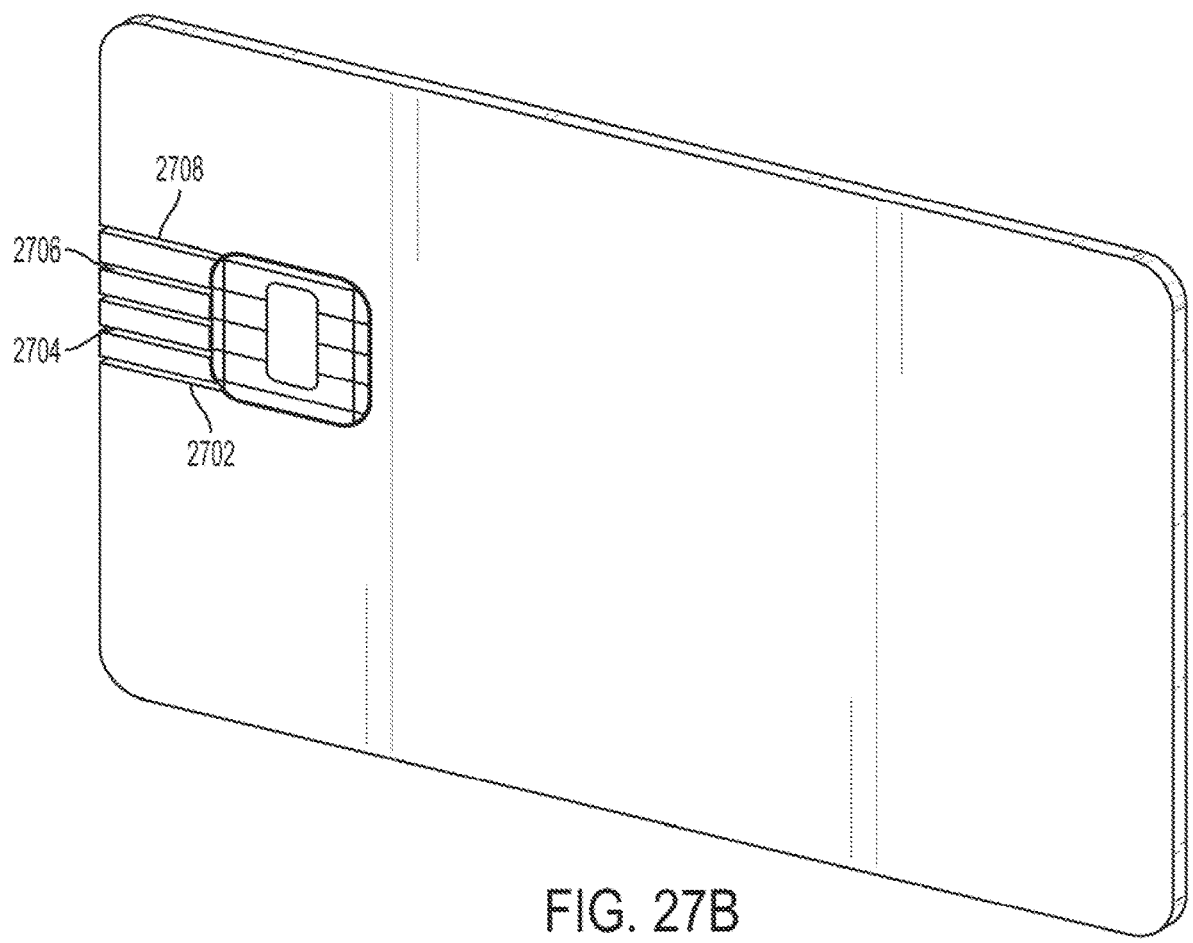
FIGS. 27B-27F are a perspective view (B) and plan view illustrations of the front surface (C), top side (D), left side (E), and back surface (F), respectively, of an exemplary card having the discontinuity depicted in FIG. 27A.
Figure 27C:
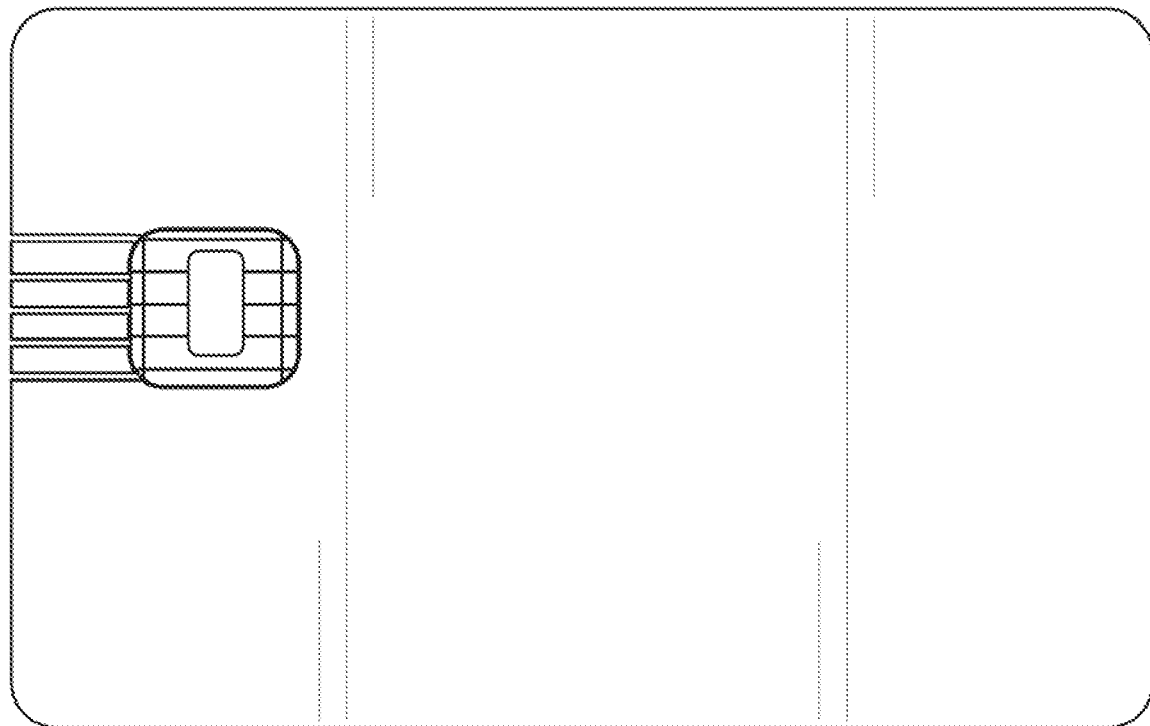
Figure 27D:
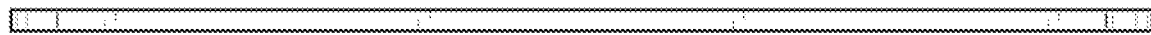
Figure 27E:
Figure 27F:
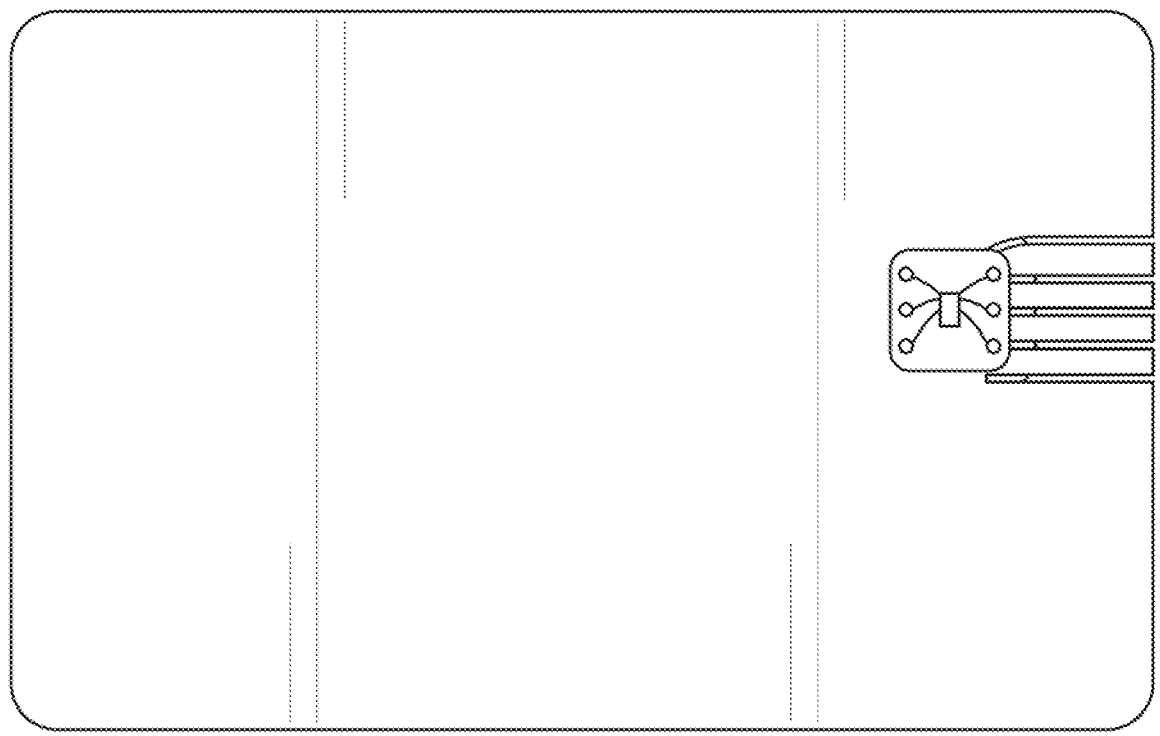
Figure 28A:
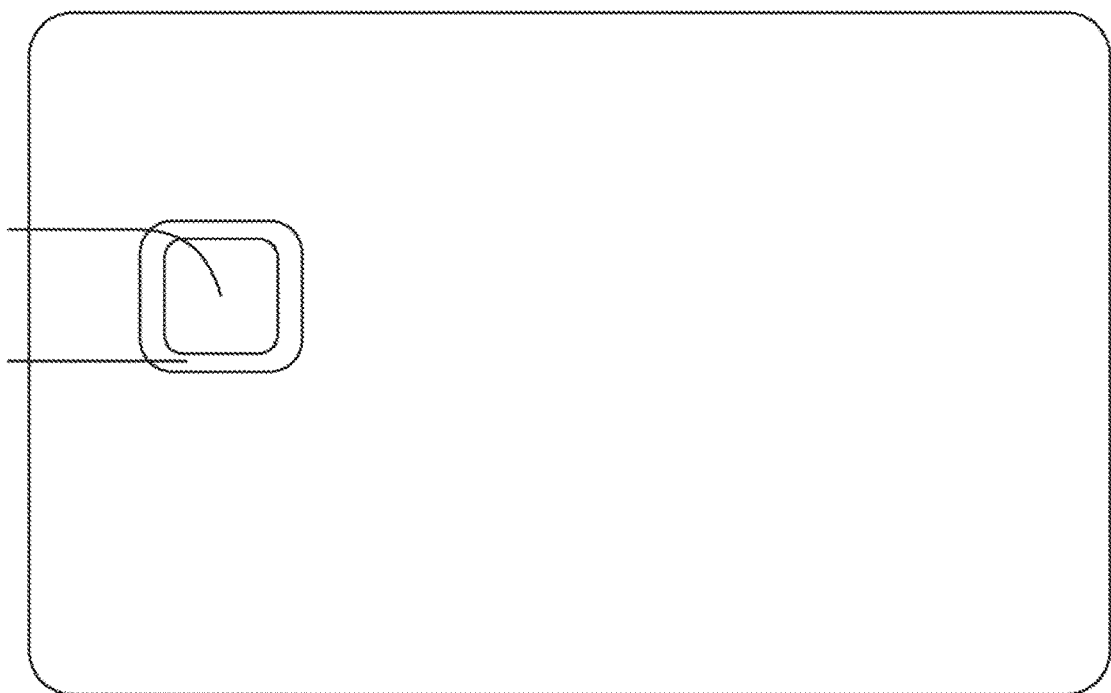
FIG. 28A is a schematic view illustration of a machine tool path for a plurality of discontinuities relative to boundaries of upper and lower portions of the transponder chip opening for another exemplary card embodiment.
Figure 28B:
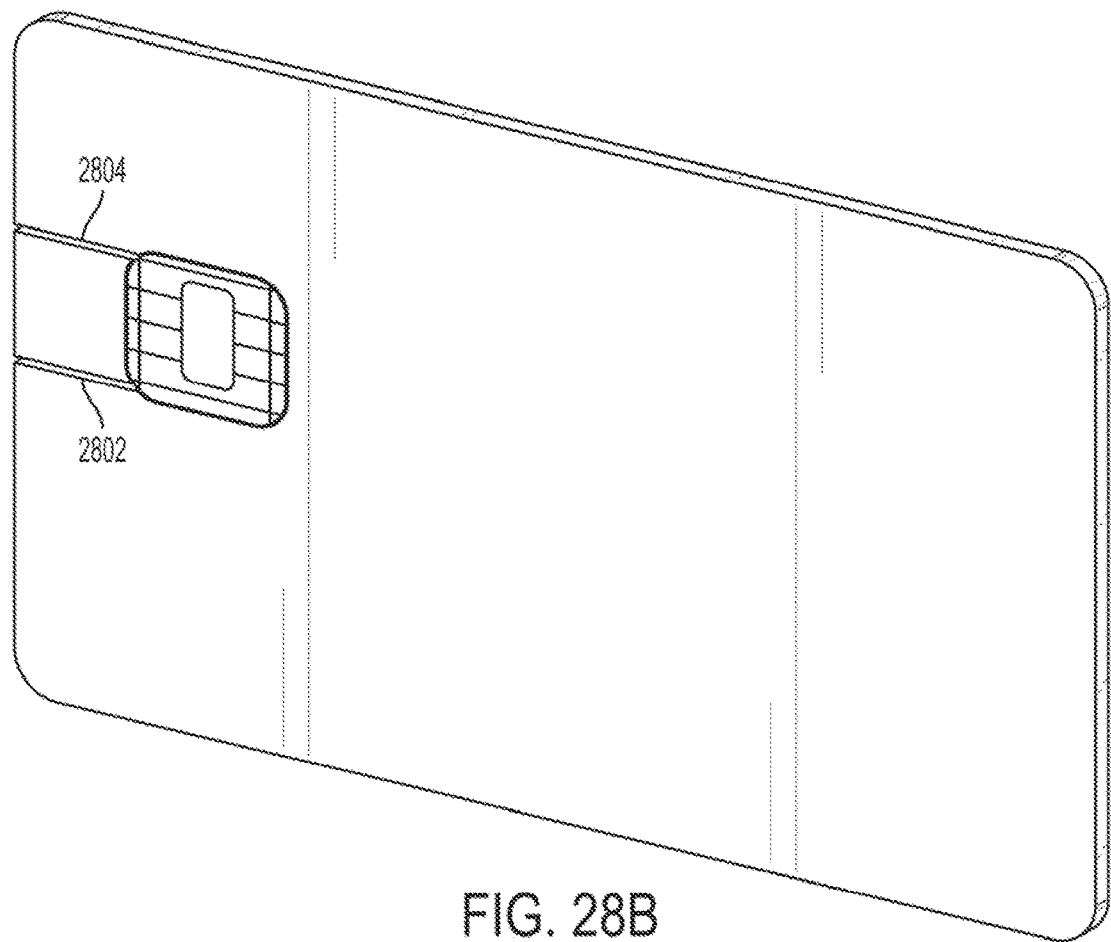
FIGS. 28B-28F are a perspective view (B) and plan view illustrations of the front surface (C), top side (D), left side (E), and back surface (F), respectively, of an exemplary card having the discontinuity depicted in FIG. 28A.
Figure 28C:
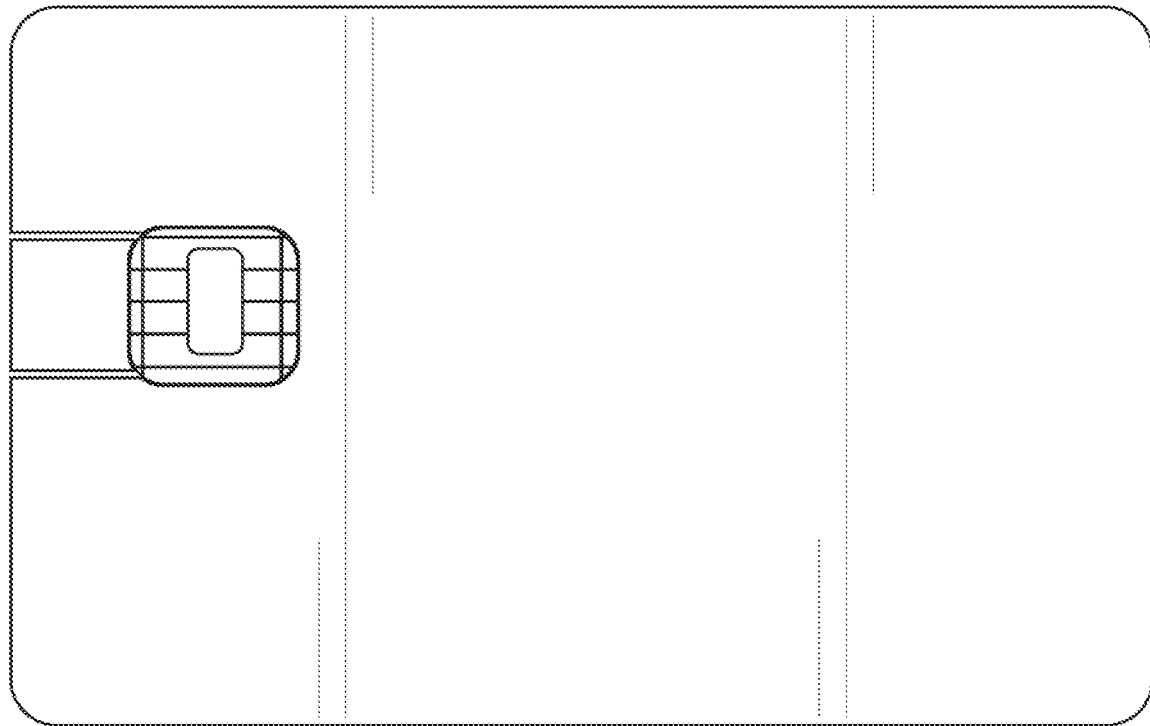
Figure 28D:
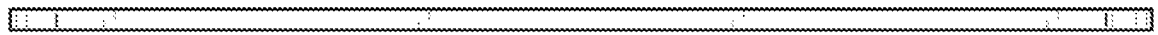
Figure 28E:
Figure 28F:
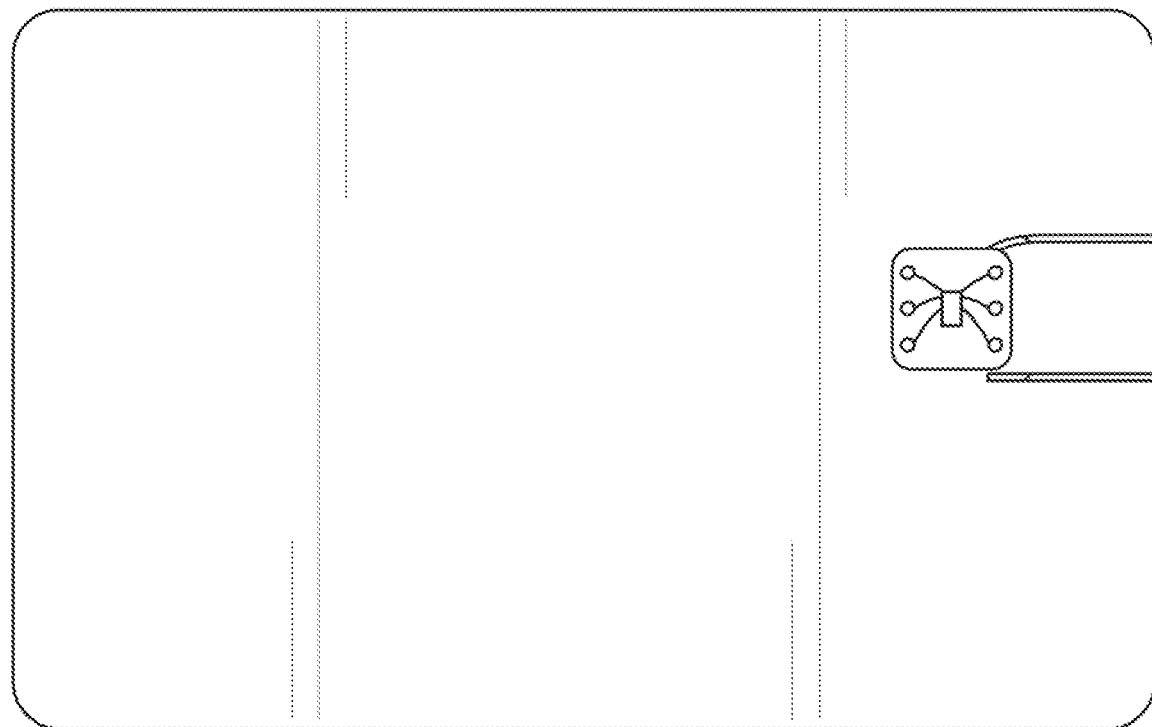
Figure 29A:
FIG. 29A is a schematic view illustration of a machine tool path for an exemplary discontinuity relative to boundaries of upper and lower portions of the transponder chip opening for another exemplary card embodiment.
Figure 29B:
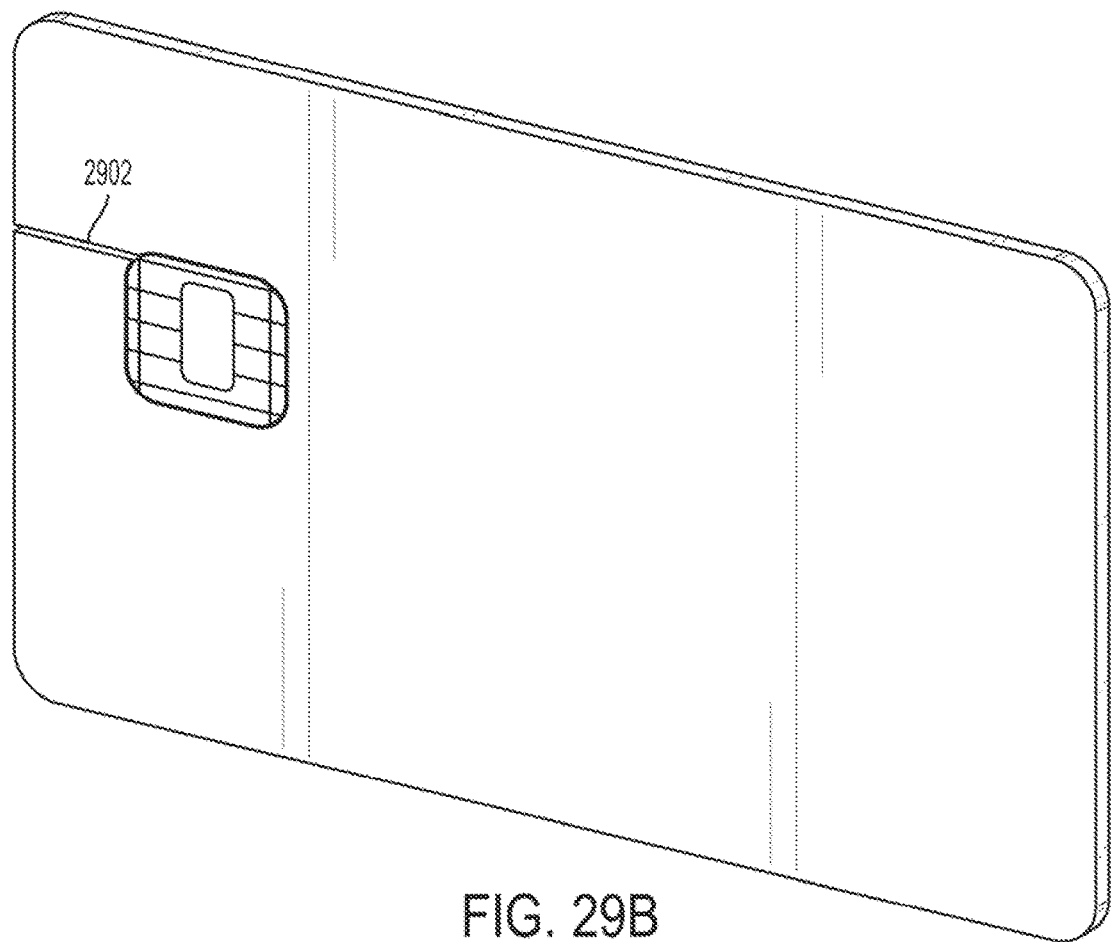
FIGS. 29B-29F are a perspective view (B) and plan view illustrations of the front surface (C), top side (D), left side (E), and back surface (F), respectively, of an exemplary card having the discontinuity depicted in FIG. 29A.
Figure 29C:
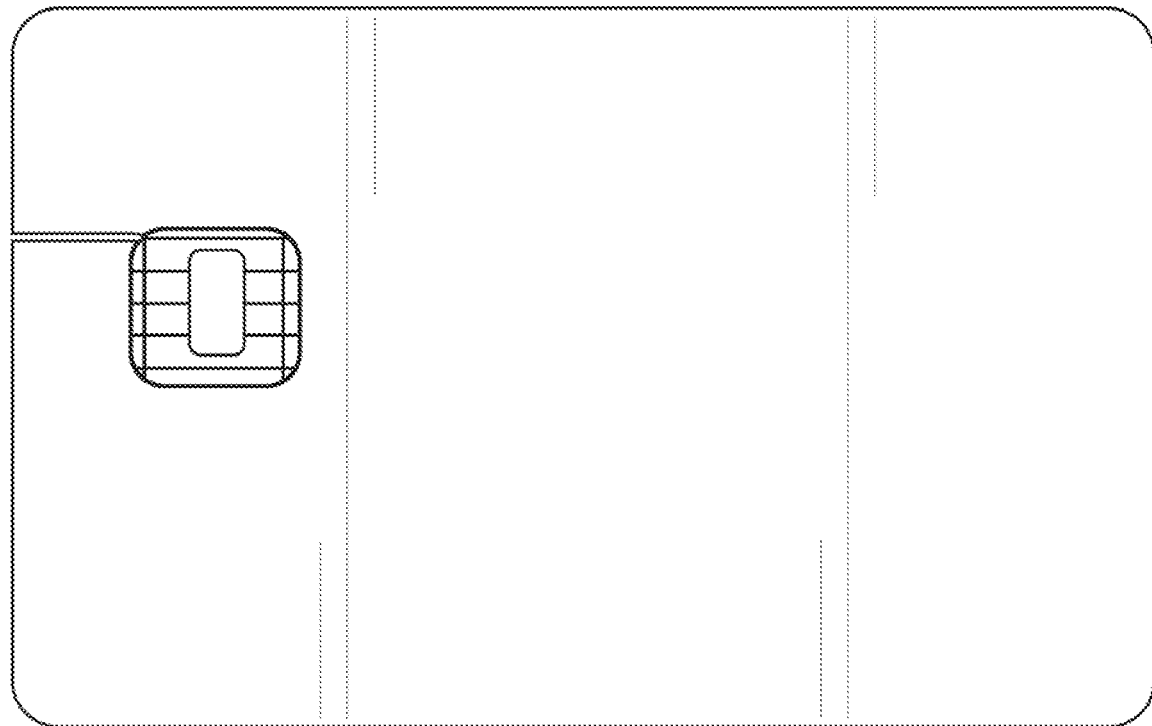
Figure 29D:
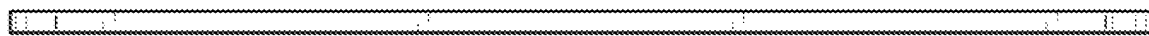
Figure 29E:
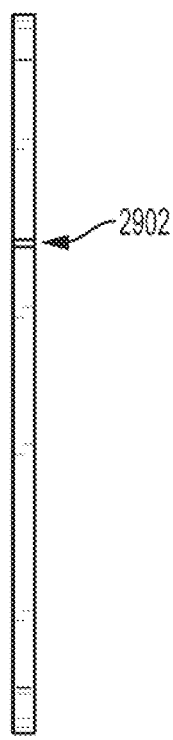
Figure 29F:
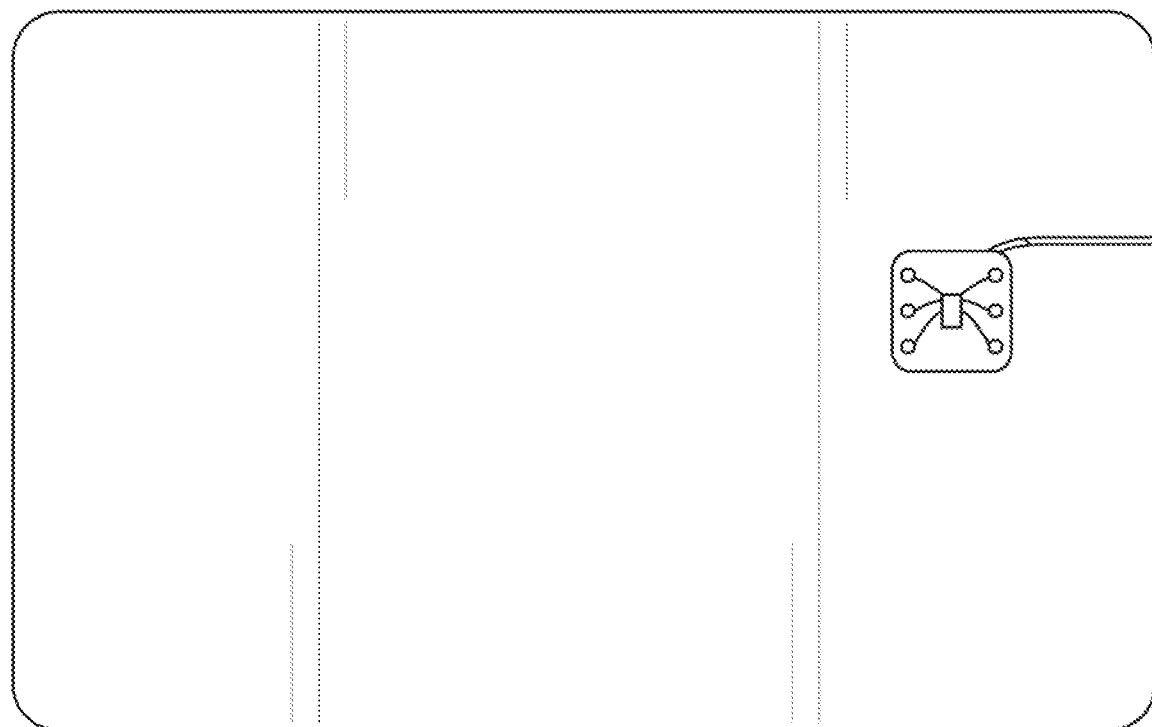

In still other discontinuity embodiments, the card may comprise a plurality of discontinuities, such as in the embodiments depicted in FIGS. 25A-28A. In all of the embodiments depicted, at least one of the plurality of discontinuities (e.g. 2502, 2602, 2702, 2802) has a length equal to a shortest length from the opening to the periphery of the card, and at least two of the plurality of discontinuities (e.g. 2502 and 2504, 2602 and 2604, etc.) are parallel to one another. In some embodiments, such as depicted in FIG. 25A, fewer than all of the plurality of discontinuities may extend from the periphery to the opening, meaning that one or more discontinuities (e.g. 2506) may extend from only the periphery of the card or the periphery of the opening, but not to both and/or one or more discontinuities (e.g. 2508, 2509, 2510) may not extend to either the periphery of the card or the periphery of the opening. In multiple-discontinuity embodiments, the presence of multiple discontinuities spreads the stress associated with flexure across multiple locations, minimizing the stress whitening attributable to any one discontinuity. In the embodiments depicted with multiple slits extending from the card periphery to the opening, metal areas disposed between such slits are held in place by the overlying and underlying non-metal layers of the card.

In a method for making a transaction card as described herein, the method comprising the steps of (a) providing a metal layer having an front surface and a back surface; (b) creating an opening in the metal layer sized to accommodate a transponder chip module, having the features described herein, (c) creating a discontinuity in the metal layer as described herein, and (d) disposing the transponder chip module in the opening. As described above, the step of creating the discontinuity may precede the step of creating the opening for the transponder chip module.

As described above, the method may comprise at least partially filling the gap defined by the discontinuity with a non-metal material, such as ceramic. The method may also further comprise disposing at least one non-metal layer on the front surface or the back surface of the metal layer, such as by adhesively bonding the non-metal layer to the metal layer, or by spray coating a ceramic layer onto the metal layer. In some embodiments, the non-metal layer comprises a ceramic layer having a color, in which the method further comprises using a laser to create one or more permanent markings on the ceramic layer having a different color than the ceramic layer color, as described in more detail with respect to FIG. 33 later herein. In some embodiments, the permanent markings in the ceramic may arise from a chemical change of a pigment within the ceramic composition, or the permanent markings may arise from removing an overlying ceramic layer to reveal an underlying layer having a different color. The underlying layer with the different color may comprise an underlying ceramic layer, if multiple layers of ceramic are provided. For example, it has been found that for certain types of cured ceramic spray coatings comprised of ceramic microparticles containing, e.g., zirconia dioxide, aluminum disilicide, pigment, and a curable resin binder suspended in a carrier solution, a white colored base ceramic layer having a white pigment therein may have better adhesion than a layer having a colored pigment, and therefore a first, white layer may be disposed underneath a second, non-white layer of ceramic. Or, multiple ceramic layers may be used for aesthetic purposes. In other embodiments, the exposed underlying layer having the different color may be the metal layer. In still other embodiments, a composite metal core may facilitate the appearance of different colors depending upon the depth of the engravings. The engraving may be performed by any method, such as a chemical or mechanical method, and is not limited to laser marking. Finally, grooves in the ceramic may be filled with another substance, such as metal. For example, a ceramic-coated steel card may have laser engraved grooves in the ceramic coating that penetrate to the metal, and then a noble or precious metal, such as gold, silver, platinum, or the like, may be electroplated into the groove as a filler.

The various configurations comprising the ceramic layers as described herein are not limited to card embodiments having a discontinuity in the metal layer as described herein. Although the ceramic layer may comprise one or more layers of a ceramic coating applied directly to the metal and cured, other methods of providing the ceramic layer may include adhering a freestanding monolithic ceramic layer to the metal layer or disposing a ceramic coating on a substrate, and then adhering the ceramic-coated substrate to the metal layer. In another method, a ceramic layer may be created by tapecasting and adhered to the body.

Cards with slit geometries as shown and claimed herein have functional advantages over cards with straight slit geometries or other geometries of the prior art, per the examples noted herein. While all of the discontinuity designs may have functional advantages over prior art designs, some more than others, and all or most may have relatively similar production costs, some may be considered more aesthetically pleasing than others and thus may be favored purely for aesthetic reasons. Thus, certain features of the discontinuities in the metal layers disclosed herein may be selected for ornamental design and are not dictated by practical function. Accordingly, design elements of each may be varied and selected while maintaining functionality, such that a variety of ornamental configurations are available with substantially the same function or performance. As non-limiting examples, the exact contours of the discontinuity, such as the number of steps or zig zags, rise or run of steps, curved or non-curved changes in direction, degree of curvature or changes in direction, precise locations of the origin, terminus, and any inflection points, and the number of discontinuities in embodiments with a plurality of discontinuity, may be varied to provide different ornamental appearances while maintaining substantially the same functionality. The ornamental design of the metal layer may be protected separately in one or more U.S. design patent applications.

The use of alternative slit designs enable a traditional metal or ceramic-coated metal card to overcome potential weaknesses at the slit, which allow the card to maintain the traditional metal feel and sound. Another option for reinforcing the card is to use a self-supporting layer on the back of the card, such as an FR4 material (a thermoset laminate made with epoxy resin and woven fiberglass) or polyimide. Printed layers, such as for the various indicia, magnetic stripe, etc., may be assembled with the FR4 layer or printed directly on the FR4 layer. For example, in one embodiment depicted generally in FIG. 32, a relatively thin (e.g. 0.009 inches thick) stainless steel substrate 1100 may be used with an FR4 backing layer 1300. In another embodiment, an 18 mil stainless steel layer may have on its back side a 4 mil FR4 layer (attached to the steel layer with a 2 mil adhesive layer), a 5 mil printed sheet on the back of the FR4 layer (attached via another 2 mil adhesive layer), and a 2 mil overlay layer comprising the magnetic stripe laminated to the back side of the print sheet layer. The print sheet and mag stripe overlay layers are the layers vulnerable to stress whitening, which the reinforcing layer helps to prevent. While reinforced backing may enable the weakness of the slit to be overcome sufficiently without a need to use one of the other slit designs described herein, embodiments combining both an FR4 (or other self-supporting) layer and one of the slit geometries depicted herein may also be provided. Preferable self-supporting layers have a rigidity of 80 MPa·m$^3$ to 40 GPa·m$^3$.

Thus, referring now to FIG. 32, there is shown a cross-sectional illustration of an exemplary card embodiment 1000, showing the metal layer 1100, which may be any metal layer as described herein, with or without a slit, and having a stepped opening 1005 therein, including an opening upper portion 1010, the opening lower portion 1012. Also illustrated in FIG. 32 are a front layer 1200 and a back layer 1300. Layer 1200 has an opening 1205 that matches (i.e. is coextensive with) opening upper portion 1010, so that the contacts of a transponder module disposed in the opening in the metal card will sit relatively flush with the upper surface of layer 1200. The thicknesses of the layers depicted in any of the drawings herein are not to scale. In some embodiments, the front layer as depicted in FIG. 32 may represent a plurality of layers, the back layer as depicted may represent a plurality of layers, the metal layer as depicted may represent a plurality of layers, or any combination thereof. Layers 1200 and 1300 are both optional. In one embodiment, layer 1200 may comprise a 9 mil PVC or PVC/PEEK composite layer on the front of a 10 mil metal layer and a 10 mil PVC layer on the back of the metal layer. The front and back layers may each be adhered to the metal layer with 2 mil adhesive layers, such as a polyester substrate having EEA adhesive on both sides, as is well known in the art. Some embodiments may have only a front layer or a back layer, but not both, and some metal card products may have no additional layers other than a coating to promote printability on the metal. For example, the card may comprise a printable metal such as printable stainless steel having a coating at least on its front face that improves acceptance of printing inks on the stainless steel surface. The coating may comprise, for example, a polyester based coating receptive to UV curable screen and inkjet inks or solvent or oxidation printing.

It should be understood that one manufacturer may provide the metal layer as an intermediate to a finisher that may add additional layers as part of later processing. In one embodiment, as described herein, front layer 1200 comprises a ceramic layer (applied to the metal layer by any of the methods described herein) and back layer comprises a plastic layer. In another embodiment described herein, back layer 1200 may be a self-supporting layer, such as a layer made from FR4.

Figure 33:
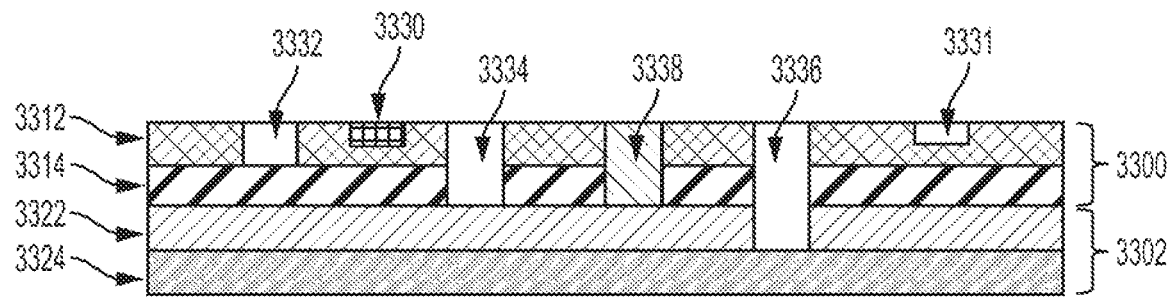
FIG. 33 is a cross sectional illustration of an exemplary card embodiment showing a surface coating with various exemplary markings and engravings.

As illustrated in FIG. 33, in some embodiments, a ceramic layer 3300 on a metal layer 3302 may comprise at least two ceramic layers 3312 and 3314, each layer having a different color. Similarly, metal layer 3302 may comprise at least two metal layers 3322, 3324, and the two metal layers may be different metals having different colors. Creating a design in the ceramic layer may comprise making laser markings 3330 that change a color in the ceramic layer by permanently chemically changing a pigment in the ceramic layer, or by removing a portion of the ceramic to make a groove. Such a groove may be a superficial groove, such as groove 3331 that does not penetrate the upper layer to reveal underlying layers, or may be a groove that reveals an underlying layers. Grooves may be created with laser, mechanical, or chemical methods known in the art. Grooves that reveal an underlying layer may include grooves 3332 that remove one ceramic layer 3312 to reveal another ceramic layer 3314, grooves 3334 that remove all ceramic layers 3312 and 3314 to reveal an upper metal layer 3322, and grooves 3336 that remove all the ceramic layers 3312, 3314 and the upper metal layer 3322 to expose an underlying metal layer 3324. Still another design technique may include creating a groove (such as any of the groove embodiments described above) and then filling that groove in the ceramic with another material, such as an electroplated metal 3338, which may be a different metal than one or both of the other metal layer or layers. For filling a groove by electroplating, the initial groove is preferably a groove 3334 or 3336 that removes the ceramic down to a metal layer. Although presented in a single embodiment for illustrative purposes only, each of the various grooves and marking techniques may be practiced alone or in any combination with others described herein. And although described in combination with the various embodiments disclosed herein for reinforcing a slit card design, the various techniques for creating decorations in a ceramic card are not limited to such embodiments.

Yet another embodiment of strengthening a section of a card having a discontinuity comprises providing a supporting tab overlying and/or underlying the discontinuity, such as for card 3500 depicted in FIGS. 35A-E. In an exemplary embodiment, such as for a "full metal" card, having no co-extensive layers on the top or back surface of the card (except, optionally, a coating to promote printing), pockets 3510, 3512 around the opening 3520 for the module (not shown) are recessed in the axis on both sides of the card. Pockets 3510, 3512 on opposite sides of the card, both of which of which have an area that is less than the area of the metal layer, are depicted as the same size as one another in the figures, but can be different sizes. Non-metal inserts 3540, 3550, such as ceramic or plastic, are placed into the pockets 3510, 3512. In a similar design for a "hybrid/veneer card" (having one or more non-metal layers on the back side of the metal layer, typically coextensive with the metal layer), a pocket and corresponding insert may be provided only in the front. Front insert 3540 has a hole 3545 to accommodate the module and expose the contact portion of the module on the top surface of the card. The use of an insert construction, such as is disclosed herein, may avoid the need to provide a stepped pocket for the transponder module in the metal layer, as the thicknesses of the pockets on either side may be selected so that the "lip" (larger periphery portion) of the module (not shown) rests on the shelf created by the card body and the portion on the back of the module protrudes through the hole 3520 in card body and stops short of the inner surface of the rear insert 3550. Artwork may be applied to the inserts by laser or any means known in the art.

It should be understood that any of the methods disclosed herein for strengthening an area around a discontinuity of a card (specific single slit geometries, multiple-slit geometries, reinforcing layer(s), or reinforcing pocket insert) may be practiced alone or in combination with one another.

Any other methods of creating designs or providing indicia on card as are well known in the art may also be provided, including providing a signature block, a magnetic stripe, a hologram, branding indicia, personalization information, and the like.

EXAMPLES

Exemplary slit design embodiments as depicted herein showed less ink cracking substrate stress whitening after short dimension bending (bending parallel to the long edges) than other cards, when subjected to a Dynamic Bending Stress Test (ref ISO/IEC 10373-1:2006). Various embodiments were tested up to 500 Flex Test Cycles at a rate of 30 cycles/minute per axis.

| Design (by reference to FIG. # where depicted) | Bend Cycles Across Short Axis Before Stress Whitening Induced |
|---|---|
| Linear near center of chip cavity | Immediate |
| FIG. 29 | <50 |
| FIG. 1 | >50 |
| FIG. 23 | >250 |

| Design (by reference to FIG. # where depicted) | Bend Cycles Across Short Axis Before Stress Whitening Induced |
| --- | --- |
| FIG. 19 | >250 |
| FIG. 9 | >500 |
| FIG. 15 | >500 |

Although the invention is illustrated and described herein with reference to specific embodiments, the invention is not intended to be limited to the details shown. Rather, various modifications may be made in the details within the scope and range of equivalents of the claims and without departing from the invention.

Furthermore, although the discontinuity geometries shown herein have functional advantages over prior art geometries, it should be understood that there are potentially an infinite variety of geometries available, and that those depicted herein are merely a small subset of the myriad geometries available that conform to the claims. Among the myriad geometries available, including the myriad variations of a particular geometry, which may exhibit suitable performance and function, there may be certain designs that are preferred for purely aesthetic reasons. Accordingly, inclusion of any specific design herein representative of a particular geometry is not an indication that the specific design is functionally better than an alternative design of a similar or even a different geometry, except as specifically noted. Similarly, to the extent a pattern with multiple changes of direction may have certain advantages, the number of directional changes after a threshold number may be selected primarily for aesthetic reasons. Accordingly, the description herein is provided without prejudice to any number of design patent applications relating to the specific designs presented herein. Features shown in solid lines in the utility patent drawings herein are without prejudice to showing the same in dashed lines to signify their non-inclusion within the scope of the design patent claims. In particular, one or more features visible on the back surfaces of the metal layer embodiments depicted herein may or may not be visible in a completed card, because of one or more overlying layers and thus may be depicted in dashed lines when depicting claimed design attributes, to show that such features are not claimed. Similarly, the details of the transponder module contacts are not a claimed aspect of the invention, and may be depicted in dashed lines in any drawing depicting claimed design attributes.

Although certain embodiments with multiple changes of direction have been depicted, it should be understood that embodiments with fewer or more changes of direction are also possible. Similarly, while certain embodiments depict locations of the origin O and terminus T in specific locations for a particular style of discontinuity, it should be understood that the locations of each may be varied along the periphery of the card or the periphery of the opening in the card.

What is claimed:

1. A transaction card having a card periphery defined by a plurality of sides, including first and second parallel short sides and first and second parallel long sides, the short sides relatively shorter than the long sides, the card comprising:
a plurality of metal layers, each metal layer having a front surface and a back surface; and
an opening in at least one of the plurality of metal layers, the opening sized to accommodate a transponder chip module, the opening having a first edge parallel and relatively closest to the first short side of the card periphery and aligned with a first section of the card periphery, a second edge parallel and relatively closest to the first long side of the card periphery, a third edge parallel and relatively closest to the second long side of the card periphery, the first edge relatively closer to the short side of the card periphery than the second edge is to the long side of the card periphery, and the second edge relatively closer to the first long side of the card periphery than the third edge is to the second long side of the card periphery, the edges of the opening defining corners; and
a discontinuity in at least a first metal layer in the plurality of metal layers, the discontinuity comprising a gap in the metal layer extending from the front surface to the back surface, the discontinuity defining a path from an origin at the card periphery and terminating at a terminus in the opening, wherein one of the terminus or the origin are located relatively closer to a line defined by the first long side of the card periphery than the other, and the path has a length greater than a shortest distance from the terminus to the side of the card periphery containing the origin, wherein the short side of the card periphery has a region aligned with the first edge of the opening, and the origin is located on the card periphery outside the aligned region;
wherein at least a portion of the discontinuity in the first metal layer aligns with a non-discontinuous region of a second metal layer.

2. The transaction card of claim 1, wherein at least one metal layer in the plurality of metal layers other than the first metal layer also comprises a discontinuity.

3. The transaction card of claim 1, wherein the path comprises at least two changes in direction of 90 degrees or more.

4. The transaction card of claim 3, wherein at least a portion of the path of the discontinuity defines a stairstep geometry comprising more than two changes in direction of 90 degrees.

5. The transaction card of claim 1, wherein the path of the discontinuity has at least one section of curved geometry.

6. The transaction card of claim 5, wherein the path of the discontinuity has one or more changes in direction greater than or equal to 90 degrees, wherein at least one change in direction has a curved geometry.

7. The transaction card of claim 1, wherein the discontinuity extends from the first short side of the card periphery to the second edge of the opening.

8. The transaction card of claim 1, wherein the discontinuity extends from the first long side or the second long side of the card periphery to the opening.

9. The transaction card of claim 1, further comprising the transponder chip module disposed in the opening, wherein one or more of the plurality of metal layers comprises a booster antenna or amplifier for the transponder chip module.

10. The transaction card of claim 1, further comprising a first non-metal layer disposed on a surface of the first metal layer.

11. The transaction card of claim 10, wherein the non-metal layer comprises a plastic layer.

12. The transaction card of claim 10, wherein the non-metal layer comprises a ceramic layer.

13. The transaction card of claim 12, wherein the ceramic layer comprises a ceramic coating and gap defined by the discontinuity is at least partially filled with the ceramic coating.

14. The transaction card of claim 10, further comprising a second non-metal layer disposed on a surface of the second metal layer.

15. The transaction card of claim 14, wherein the first non-metal layer comprises a ceramic layer and the second non-metal layer comprises a plastic layer.

16. The transaction card of claim 10, wherein the first non-metal layer comprises a self-supporting layer.

17. The transaction card of claim 16, wherein the self-supporting layer comprises polyimide or a fiberglass reinforced layer comprising an epoxy.

18. The transaction card of claim 1, wherein the first metal layer defines a first area and comprises a pocket defining a second area smaller than the first area, further comprising a non-metal insert disposed in the pocket.

19. The transaction card of claim 1, wherein the at least one discontinuity in the first metal layer comprises a groove that visibly reveals the second metal layer from an outer surface of the transaction card.

20. The transaction card of claim 19, wherein the second metal layer has a different color than the first metal layer, the second metal layer comprises a different metal than the first metal layer, or a combination thereof.

21. The transaction card of claim 1, wherein the terminus is located on the first edge at a point non-equidistant from the second edge and the third edge or on the second edge or third edge at a point non-equidistant from the first edge and a fourth edge opposite the first edge.

22. The transaction card of claim 1, further comprising a non-metal material disposed in the gap defined by the discontinuity.

23. The transaction card of claim 22, further comprising a non-metal layer disposed on at least one surface of the first metal layer, in which the non-metal layer at least partially fills the gap defined by the discontinuity.

* * * * *